(12) United States Patent
Ban et al.

(10) Patent No.: US 8,019,571 B2
(45) Date of Patent: Sep. 13, 2011

(54) ABNORMALITY PROCESSING SYSTEM

(75) Inventors: Yasuhiro Ban, Nara (JP); Nobuaki Murabayashi, Osaka (JP); Wataru Uchiyama, Osaka (JP)

(73) Assignee: Panasonic Corporation, Osaka (JP)

( * ) Notice: Subject to any disclaimer, the term of this patent is extended or adjusted under 35 U.S.C. 154(b) by 997 days.

(21) Appl. No.: 10/558,817

(22) PCT Filed: May 24, 2004

(86) PCT No.: PCT/JP2004/007416
§ 371 (c)(1),
(2), (4) Date: May 2, 2006

(87) PCT Pub. No.: WO2004/107071
PCT Pub. Date: Dec. 9, 2004

(65) Prior Publication Data
US 2007/0118638 A1      May 24, 2007

(30) Foreign Application Priority Data

May 29, 2003    (JP) .................................. 2003-152502
May 29, 2003    (JP) .................................. 2003-152503
Sep. 10, 2003   (JP) .................................. 2003-318026

(51) Int. Cl.
*G06F 11/00* (2006.01)
(52) U.S. Cl. ..................................................... 702/188
(58) Field of Classification Search ................... 702/188
See application file for complete search history.

(56) References Cited

U.S. PATENT DOCUMENTS 6,697,695 B1      2/2004   Kurihara et al.

2002/0022991 A1*   2/2002   Sharood et al. ................. 705/14
2002/0032491 A1*   3/2002   Imamura et al. ................ 700/79

FOREIGN PATENT DOCUMENTS

| JP | 8-305526 | 11/1996 |
|----|----------|---------|
| JP | 11-305828 | 11/1999 |
| JP | 2001-195124 | 7/2001 |
| JP | 2002-43219 | 2/2002 |
| JP | 2002-062934 | 2/2002 |
| JP | 2002-327649 | 11/2002 |
| JP | 2003-085316 | 3/2003 |
| JP | 2003-122426 | 4/2003 |

OTHER PUBLICATIONS

English Language Abstract of JP 2001-195124.
English Language Abstract of JP 2003-085316.
English Language Abstract of JP 2003-122426.
English Language Abstract of JP 2002-062934.
English Language Abstract of JP 2002-327649.

* cited by examiner

*Primary Examiner* — Aditya Bhat
(74) *Attorney, Agent, or Firm* — Greenblum & Bernstein, P.L.C.

(57) ABSTRACT

A system, device, method, and program for informing abnormality, providing a user with abnormality information of equipment in an easy-to-understand manner so that convenience is enhanced. When abnormality occurs in equipment including home electric appliances, abnormality information indicating abnormality is transmitted to a server through an information terminal, and based on a reply from the server, contents of the abnormality are displayed on the terminal. When the abnormality is eliminated, the abnormality display is removed or display on a monitor, etc. are made to inform the elimination of the abnormality.

6 Claims, 72 Drawing Sheets

Fig. 3

\<Anomaly information\>
　　\<Manufacture's name\> AB Industry \</Manufacture's name\>
　　\<Model number\> AH-542-P \</Model number\>
　　\<Version\> 1.55 \</Version\>
　　\<Serial number\> 105574 \</Serial number\>
　　\<Anomaly number\> 748FE7C5 \</Anomaly number\>
\</Anomaly information\>

Fig. 4

```
<Anomaly information>
  <Language> JP </Language>
  <Information terminal ID> 120240207 </Information terminal ID>
  <Manufacture's name> AB Industry </Manufacture's name>
  <Model number> AH-542-P </Model number>
  <Version> 1.55 </Version>
  <Serial number> 105574 </Serial number>
  <Anomaly number> 748FE7C5 </Anomaly number>
</Anomaly information>
```

Fig. 6

```
<Detail of anomaly>
   <Manufacture's name> AB Industry </Manufacture's name>
   <Model number> AH-542-P </Model number>
   <Serial number> 105574 </Serial number>
   <Anomaly number> 748FE7C5 </Anomaly number>
   <Explanation> Door open for more than five minutes. </Explanation>
</Detail of anomaly>
```

Fig. 7

| Manufacture's name | Model number | Serial number | Explanation of Apparatus |
|---|---|---|---|
| AB Industry | AH-542-P | 105574 | Refrigerator in the kitchen |
| NC Electric | BQ-84-5 | 5745 | Television in the living-room |
| ⋮ | ⋮ | ⋮ | ⋮ |

Fig. 12

| Manufacture's name | Model number | Version | Anomaly number | Explanation identifier |
|---|---|---|---|---|
| AB Industry | AH-542-P | 1.55 | 748FF7C5 | AB-54-875-55 |
| ⋮ | ⋮ | ⋮ | ⋮ | ⋮ |

1201

| Explanation identifier | Language | Explanation |
|---|---|---|
| AB-54-875-55 | JP | Door open for more than five minutes. |
| ⋮ | ⋮ | ⋮ |

| Manufacture's name | Model number | Version | Anomaly number | Language | Explanation | Notification |
|---|---|---|---|---|---|---|
| AB Industry | AH-542-P | 1.55 | 748FE7C5 | JP | Door open for more than five minutes | YES |
| AB Industry | AH-542-P | 1.55 | 748CE000 | JP | Temporary voltage drop | NO |
| ⋮ | ⋮ | ⋮ | ⋮ | ⋮ | ⋮ | ⋮ |

```
<Details of anomaly>
   <Manufacture's name> AB Industry </Manufacture's name>
   <Model number> AH-542-P </Model number>
   <Serial number> 105574 </Serial number>
   <Anomaly number> 748CE000 </Anomaly number>
   <Explanation> Temporary voltage drop </Explanation>
   <Notification not executed/>
</Details of anomaly>
```

Fig. 23

```
<Reset information >
    <Manufacture's name> AB Industry </Manufacture's name>
    <Model number> AH-542-P </Model number>
    <Serial number> 105574 </Serial number>
</Reset information >
```

Fig. 34

| Present time | 12:41 PM |
| Temperature | 20°C |

Fig. 41

```
<Recovery instruction>
    <Manufacture's name> R company </Manufacture's name>
    <Model number> R-GM-565 </Model number>
    <Serial number> 284729 </Serial number>
</Recovery instruction>
```

| Anomaly name |
|---|
| Serious anomalies |
| H03 Anomaly of disconnection of communication line |
|  |
| Minor anomalies |
| U01 Anomaly in water supply |
| U02 Anomaly in open lid |
| U02 Anomaly in open lid |
| U03 Anomaly in adjustment of unbalanced cloths |
| U02 Anomaly in open lid |
| U03 Anomaly in adjustment of unbalanced cloths |
| U02 Anomaly in open lid |

6201 — Serious anomalies
6202 — Minor anomalies

Fig. 69
(a)
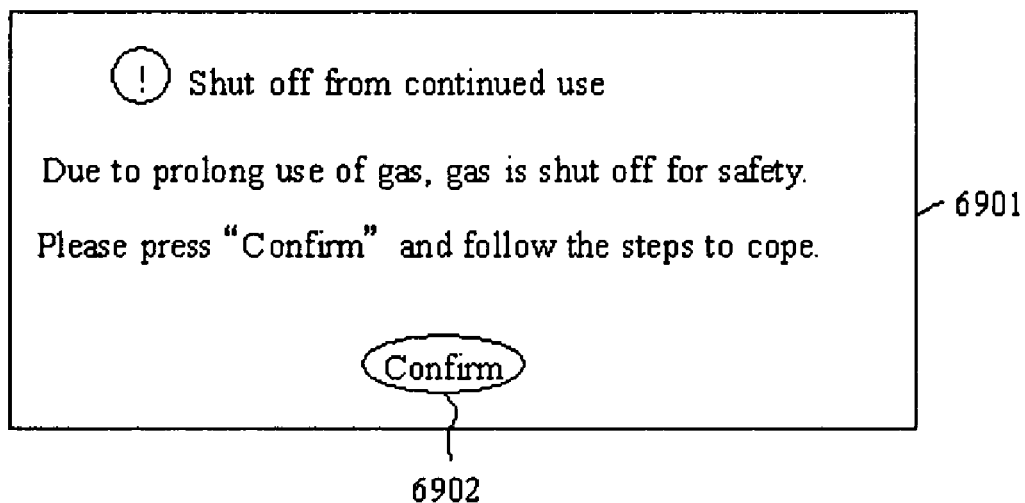
(b)
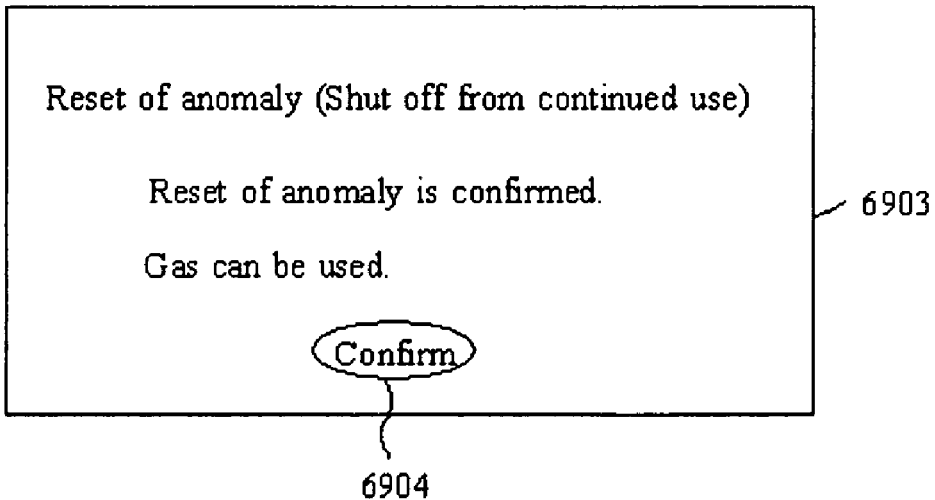

ABNORMALITY PROCESSING SYSTEM

BACKGROUND OF THE INVENTION

1. Field of the Invention

The present invention relates to an information terminal, which communicates with an apparatus including a home appliance and equipment, a server, which communicates with the information terminal, a system for carrying out notification of anomaly, which comprises the information terminal and the server, a method for processing anomaly, and a program for processing anomaly.

2. Description of the Related Art

In recent years, a system, by which home appliances are connected via a home network, and the home network and the Internet are connected via a gateway, has been suggested. Examples of a communication medium utilized for the home network include wireless LAN (Local Area Network) by utilizing IEEE802.11b, etc., Bluetooth®, power line communication, or specified low power wireless communication. Moreover, it has become possible to check or to control the home appliances from outside by a personal computer or a mobile phone.

In addition, as disclosed in Japanese Patent Publication No. 2001-195124, in a system for displaying an event, such as an anomaly of an apparatus or information thereon, a new event or a highly important event by priority are displayed. Furthermore, as anomaly monitoring, when an event occurs, notification to a mobile, mail, speaker, etc., is carried out as a notification method other than by screen-display according to the existence or non-existence of a user and priority.

However, in said prior art, it becomes possible to provide notification in an eye-catching form by changing the method for carrying out notification of an anomaly according to the importance of events; it is possible only to provide notification of the details of an anomaly, which has been configured to the monitoring apparatus. In addition, since specialized knowledge is necessary to modify the configuration, in the case of a system for home use, such as a network connected by a home appliance (a home appliance connectable to the network), it requires effort and cost by a user or service person. In addition, in case of a system for home use, which is not a system with a massive data storage means such as in a general system, the data storage means thereof is limited, both cost-wise and physically, it is difficult to have all of the coping methods associated with much of the anomaly information. In addition, in cases where a contact address or corresponding parts, etc. are changed, and the coping method thereto is changed, it is difficult to support.

In addition, in the system for home use, etc., a minor anomaly may be caused by incorrect use or condition, and such minor anomaly is reset as soon as the condition is improved. However, in the conventional configuration, even if the condition is corrected, the anomaly remains indicated, or to be notified, so that the user cannot know whether the anomaly is resolved, which becomes unsettling.

For example, in case of the system for home use, which works together with a gas apparatus such as a gas meter, a gas water heater, a hot plate, a gas hot-water heater, a gas dryer, a gas air conditioner etc., in the nature of a gas apparatus anomaly requires a user to confirm a safe enough condition to restart using gas. However, in the conventional configuration, the anomaly is notified and can be checked; even if the anomaly is resolved, the anomaly remains to be indicated, or to be notified, so that the user cannot know whether or not the anomaly is resolved, which becomes unsettling.

SUMMARY OF THE INVENTION

The present invention resolves the above deficiencies and provides details of an anomaly, which occurs in a home appliance and equipment, and an coping method thereto to a user in a user-friendly way. At the same time, it is an objective of the present invention to enable easy modification of the details of the anomaly and coping method thereto to be provided, moreover, to make recovery from the anomaly noticeable to a user by removing an anomaly indication or by displaying an anomaly reset indication when a notification of reset information is received from said apparatus for carrying out notification of the anomaly.

In order to resolve the above deficiencies, according to the present invention, a system comprises an information terminal, which communicates with a home appliance or equipment, manages and controls said apparatus, wherein said information terminal communicates with a server via a communication network and provides notification of anomaly information about the home appliance or equipment.

Also, in cases where an anomaly occurs in the home appliance or equipment, notification of the anomaly information is sent to the server via the information terminal, the server transmits the details of the anomaly and the coping method thereto to the information terminal by referring to the anomaly number attached to said anomaly information, and the transmitted details of the anomaly and coping method thereto are displayed on the display unit of the information terminal.

This makes it possible to judge the anomaly information of the apparatus by the server and transmit the detailed coping method thereto, thereby enabling provision of details of the anomaly and/or coping method thereto corresponding to many apparatuses to a user and modification of the configuration of the anomaly and the coping method thereto only by modification in the server.

In addition, in order to resolve the above deficiencies, according to the present invention, if the anomaly occurs in the apparatus, including home appliances and equipment, and is notified to the information terminal, a screen-display indicating said details of anomaly is displayed by a pop-up, or if the reset information is provided from the home appliance or equipment, which has provided notification of said anomaly, to the information terminal, said pop-up screen is removed, or a recovery from the anomaly is indicated.

Therefore, the reset information is provided from the apparatus, which has provided notification of said anomaly to the information terminal; said pop-up screen is removed, or a recovery from the anomaly is indicated, thereby making the reset of anomaly noticeable to a user and improving user-friendliness.

As a result, according to the present invention, the anomaly occurring in the home appliances and equipment etc. is determined by the server, and the details of the anomaly and/or the coping method thereto is provided, thereby enabling response to many apparatuses moreover, even if new installation of an apparatus or update of a control program for an apparatus is done, it is possible to respond by changing a server.

Furthermore, the details of the anomaly and/or the coping method thereto corresponding to the anomaly occurring in the apparatus are displayed by a pop-up, and in cases where the anomaly of the apparatus is corrected, the pop-up is removed, or the recovery from the anomaly is displayed; thereby making the reset of the anomaly noticeable to the user, and thus improving user-friendliness.

BRIEF DESCRIPTION OF THE DRAWINGS

FIG. 3 is an illustration of anomaly information.

FIG. 4 is an illustration of anomaly information.

FIG. 6 is an illustration of a reply to anomaly information.

FIG. 7 is an illustration of a table for storing apparatus information.

FIG. 12 is an illustration of a table storing details of said anomaly and/or coping method thereto relating to anomaly information.

FIG. 15 is an illustration of a table storing information as to whether or not a notification is executed.

FIG. 16 is an illustration of an instruction to not execute a reply notification.

FIG. 23 is an illustration of reset information.

FIG. 34 is an illustration of a display in cases where a predetermined period of time has lapsed.

FIG. 41 is an illustration of a recovery instruction.

FIG. 62 is an illustration of a history of anomaly managed by an information terminal of the example of the present invention.

FIG. 69 is an illustration of a panel of display of a gas anomaly and a panel of removal of a gas anomaly of the example of the present invention.

BEST MODE FOR CARRYING OUT THE INVENTION

Hereinafter, the best mode for carrying out the invention will be described as the embodiments and the examples referring drawings. The present invention is not to be limited to the above embodiments and examples and able to be embodied in various forms without departing from the scope thereof.

The First Embodiment

Figure 1:
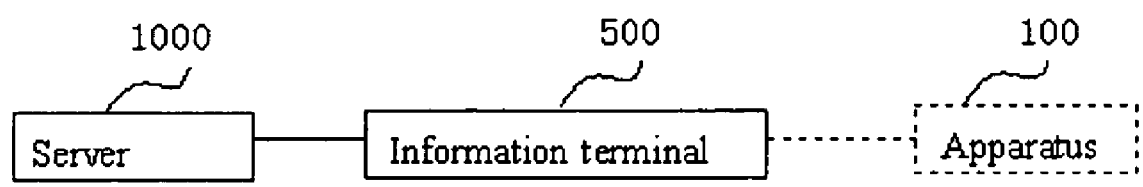
FIG. 1 is a schematic diagram of the system for processing anomaly of the first embodiment of the present invention.

FIG. 1 is a schematic diagram of the system for processing anomaly of the first embodiment of the present invention. The system for processing anomaly comprises an information terminal 500 and a server 1000. The information terminal 500 is a terminal for communicating with the apparatus 100, receiving and processing the anomaly information indicating an anomaly of the apparatus 100. Moreover, the server 1000 receives the anomaly information via said information terminal and causes said information terminal to execute processing based on the anomaly information.

Note that a concept of the "apparatus" in the present invention includes home appliances or equipment. Examples of home appliances or equipment include a washing machine, a microwave, a water heater, and remote-controller thereof, a refrigerator, an air conditioner, a water heater, a system by utilizing hot water, a dryer, a dishwasher, a dish dryer, a cleaner, a hot plate, an IH (Induction Heater) apparatus, a rice cooker, a toilet seat with warm-water bidet, an electronic lock, various security sensors (a human sensor and an anti-crime sensor), a home server, a television, video equipment, a DVD (Digital Versatile Disc) apparatus, a personal computer, a PDA (Personal Digital Assistant), an elevator, an escalator, an ventilator, a heat exchanger, a co-generator, and kitchen equipment.

In the present invention, communication is possible between a server and an information terminal, and between an information terminal and an apparatus. For example, between a server and an information terminal, there is a communication network typified by the Internet, and the information terminal may be connected to the communication network via telephone line or fiber-optic. Moreover, the information terminal and the apparatus are communicable by utilizing, for example, wireless LAN, specified low power wireless communication, or power line communication (e.g., ECHONET®).

Note that, in FIG. 1, although an information terminal and an apparatus seem to have one to one correspondence, normally, one information terminal is communicable with a plurality of apparatuses. Moreover, the server and the information terminal do not necessarily have one-to-one correspondence, and one server may be communicable with a plurality of information terminals or one information terminal may be communicable with a plurality of servers. For example, a server is installed for respective apparatus manufactures, and an information terminal may transmit anomaly information to a server corresponding to a manufacture of an apparatus, which transmits the anomaly information.

Figure 2:
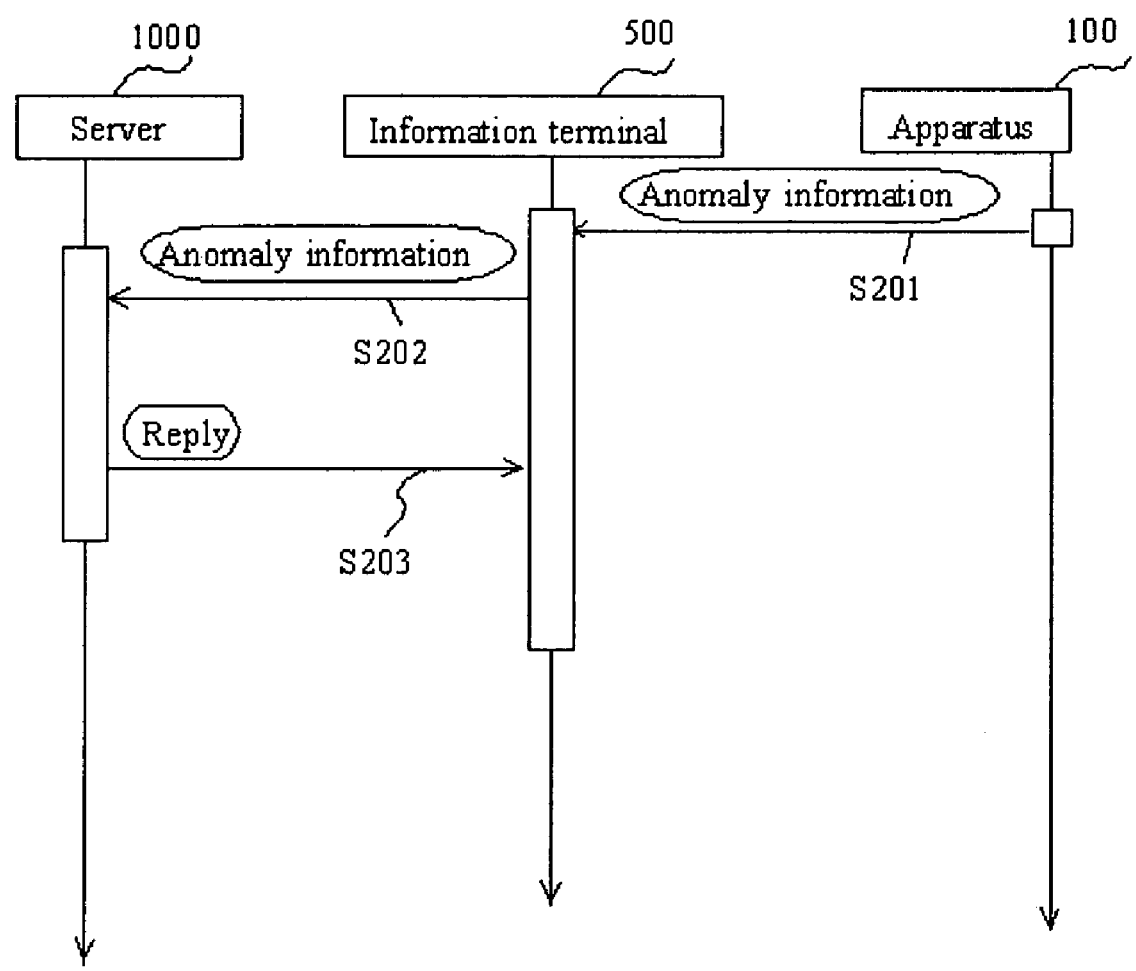
FIG. 2 is a sequential diagram of operations of the system for processing an anomaly of the first embodiment of the present invention.

FIG. 2 is a sequential diagram of operations of the system for processing anomaly information of the first embodiment of the present invention. For example, it is assumed that an anomaly occurs in the apparatus 100 in step S201, and anomaly information indicating the anomaly is transmitted to the information terminal 500.

FIG. 3 is an illustration of anomaly information. In FIG. 3, anomaly information is expressed by XML (eXtensible Markup Language). However, anomaly information is able to be expressed in optional forms, and XML is just one example. The anomaly information illustrated in FIG. 3 indicates that the anomaly indicated by 748FE7C5 occurred to an apparatus, which has been manufactured by AB Industries and of which model number is AH-542-P, version is 1.55, and serial number is 105574. Note that, a version number may indicate, for example, a version of a program controlling an apparatus, (It may be called "firmware" by the apparatus.) If the version number corresponds to the version of the program, the apparatus as a physical object is specified by the manufacturer's name, the model number, and the serial number.

The information terminal, which has received the anomaly information, transmits the anomaly information to the server 1000 in step S202 (the step of transmitting anomaly information). Note that, anomaly information transmitted by the information terminal may be identical with the anomaly information received by the information terminal or may be processed.

FIG. 4 is an illustration of the anomaly information, which is transmitted to a server by an information terminal. In this case, the transmitted anomaly information is different from the anomaly information received by the information terminal. Therefore, "<language>jp</language><information terminal ID>120240207</information terminal ID>" is added to the anomaly information received by the information terminal. The "jp" indicates that details of the reply are to be expressed in Japanese. By specifying language, the present invention becomes usable all over the world. "120240207" is an identification number of the information terminal. By adding the identification number of the information terminal, it becomes possible to know on the server side, etc., as to the identity of the information terminal, which is installed in relation to a location in which an apparatus with an anomaly is located.

In step S202, the server receives transmitted anomaly information (the step of receiving anomaly information by server).

In step S203, the server, which has received the anomaly information, replies details of the anomaly and/or coping method thereto to the information terminal based on the received anomaly information (the step of replying). The information terminal provides notification of the details of anomaly and/or coping method thereto based on the reply (the step of carrying out notification).

Figure 5:
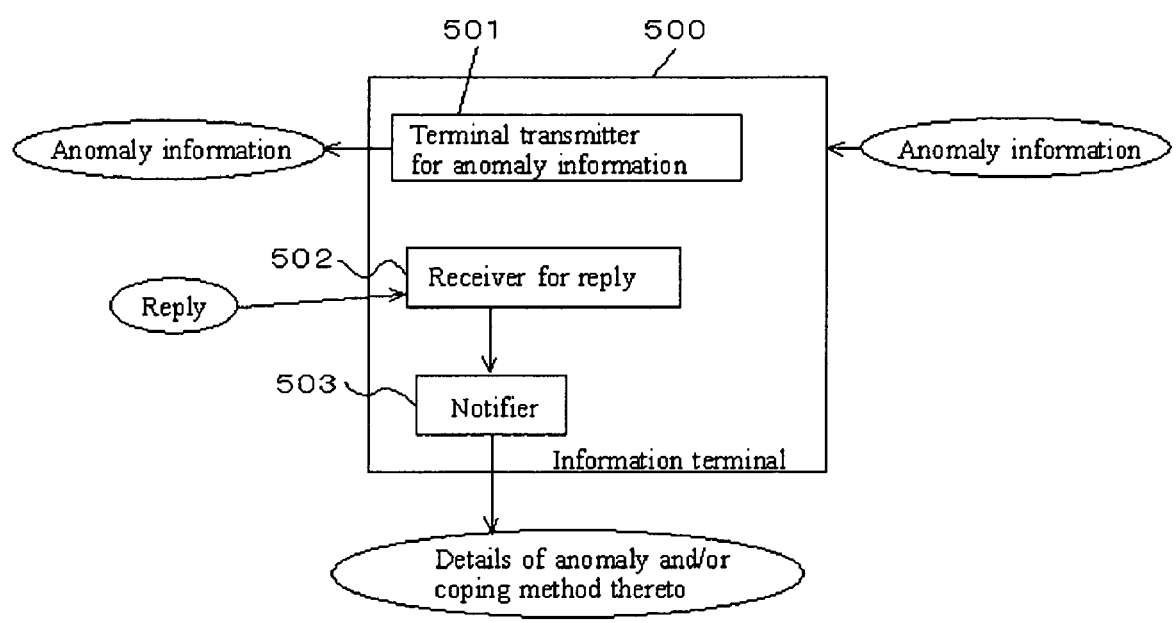
FIG. 5 is a functional block diagram of an information terminal of the first embodiment of the present invention.

FIG. 5 is a functional block diagram of an information terminal of the first embodiment. The information terminal 500 comprises a terminal transmitter for anomaly information 501, a reception unit for replay 502, and a notifier 503.

Note that, the information terminal of the first embodiment is able to be constituted by hardware, software, or both hardware and software.

An example for implementing an information terminal using a computer includes a hardware comprising a CPU, a memory, a bus, an interface, peripheral equipment, etc., and a program executable on the above hardware. Moreover, such programs may be recorded on a medium.

The "terminal transmitter for anomaly information" 501 transmits the received anomaly information to the server. As described above, the anomaly information to be transmitted may be identical with the received anomaly information or may be processed. The transmission of the anomaly information may be executed by utilizing existing protocol such as HTTP (HyperText Transfer Protocol) or SMTP (Simple Mail Transfer Protocol), or by utilizing a unique protocol.

The "receiver for reply" 502 receives a reply to the transmitted anomaly information from a server. For example, the reply may be in HTTP or other protocols.

FIG. 6 is an illustration of the reply to the transmitted anomaly information. In the header portion, the manufacturer's name, the model number, and the serial number, for specifying the apparatus, as well as the anomaly number, are arranged in order to indicate the reply to which apparatus, in which the anomaly has occurred; and in the latter portion, a string, which indicates either or both of the details of the anomaly and the coping method thereof, is arranged between "<explanation>" and "</explanation>".

The "notifier" 503 provides notification of one or both of the details of the anomaly and/or coping method thereto based on the reply. "Provides notification of" refers to notification to people around. For example, if a display is available, a display is used, or if a speaker is available, notification is performed by sound. Note that, the notifier may display a string between "<explanation>" and "</explanation>" in the reply illustrated in FIG. 6, however, in cases where there are a plurality of apparatuses, it becomes unclear to which apparatus the indication corresponds. Therefore, the manufacturer's name, the model number, and the serial number of the apparatus, and an installation location thereof may be correlated and stored, thereby displaying the installation location of the apparatus, etc., by acquiring from the manufacturer's name, the model number, and the serial number of the apparatus, which are included in the reply.

FIG. 7 is an illustration of a table, in which the manufacturer's name, the model number, the serial number of the apparatus and the explanation of the apparatus indicating the installation location of the apparatus, etc., are correlated. The notifier may display an explanation of an apparatus with a string between "<explanation>" and "</explanation>" by referring to the table of FIG. 7 from the manufacturer's name, the model number, and the serial number of the apparatus, which are included in the reply.

Figure 8:
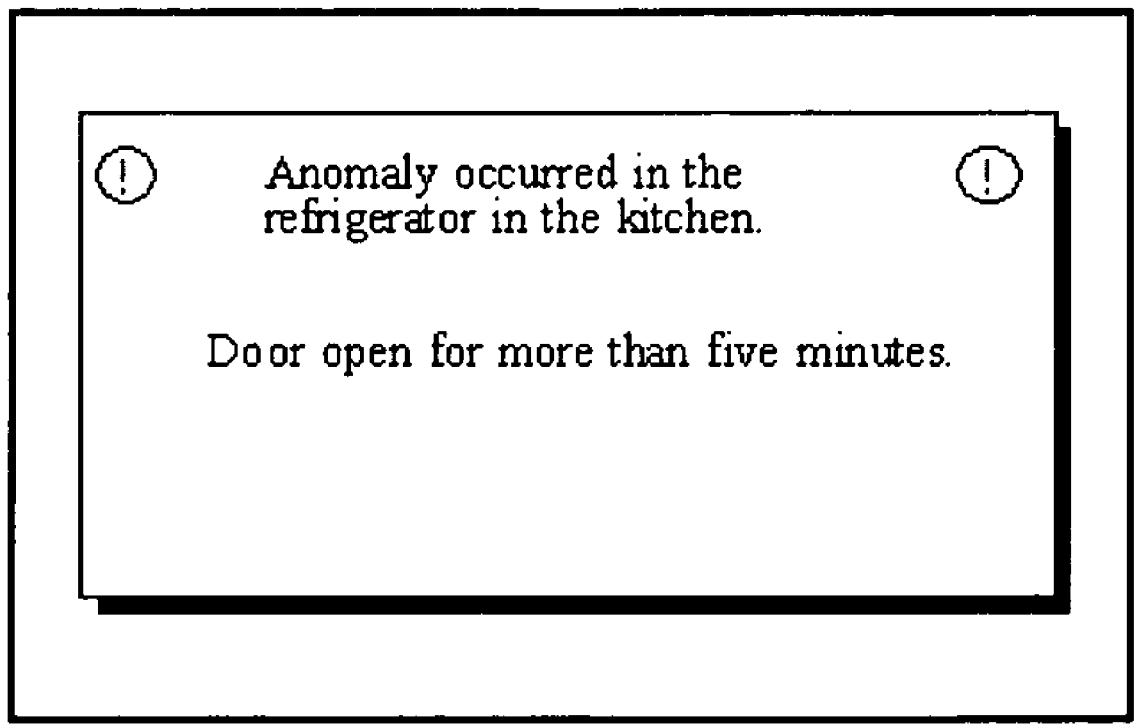
FIG. 8 is an illustration of a notification.

FIG. 8 is an illustration of a notification by the notifier 503. In this case, the notification is executed by display. By receiving the reply illustrated in FIG. 6 and by referring to the table illustrated in FIG. 7, it becomes clear that the anomaly has occurred in the refrigerator in the kitchen, thereby indicating "Anomaly has occurred in the refrigerator in the kitchen" and the string between "<explanation>" and "</explanation>" in the next line.

Thus, in a notification by the notifier, information received from a server and information stored in an information terminal may be synthesized and displayed. Examples of information stored in an information terminal include a background image of the display, information of the font relating to a string displayed with information received from a server in order to get people's attention, and an image of icon. Moreover, a string or an image, which are indicated when disconnection with a server is caused by line disturbance, may be stored. Thus, by separating information transmitted from the server from information stored in the information terminal, it becomes possible to decrease the amount of information stored in the information terminal, thereby making a large storage area in an information terminal unnecessary.

Note that information to be stored in the information terminal is classified into information to be updated and information not to be updated. The information to be updated corresponds to information, which is installable from the exterior of the information terminal such as the server, for example, information such as a program downloadable from the server. Moreover, examples of the information to be updated include information of an image to be displayed as a background etc., menu information for displaying a menu, and control sequence information for controlling the apparatus etc. The information is stored in a rewritable storage area. Meanwhile, the information not to be updated corresponds to information, which is not installable from the exterior of the information terminal, for example, information or programs to be initially provided to an information terminal, and a basic program for operation of the apparatus. These are stored in a non-rewritable storage area, or in a rewritable storage area, which is non-volatile even when power is not supplied to the information terminal, for example, ROM (Read Only Memory) or flash memory.

Note that, in the reply of FIG. 7, an anomaly number is included between "<anomaly number>" and "</anomaly number>". The information terminal is able to prepare the case of disconnection with a server etc. by correlating the anomaly number with the string between "<explanation>" and "</explanation>" with respect to each apparatus. Therefore, in case of disconnection with the server, if the anomaly number and the string are stored, one or both of the details and coping method thereof become able to be displayed based on the above memory.

Figure 9:
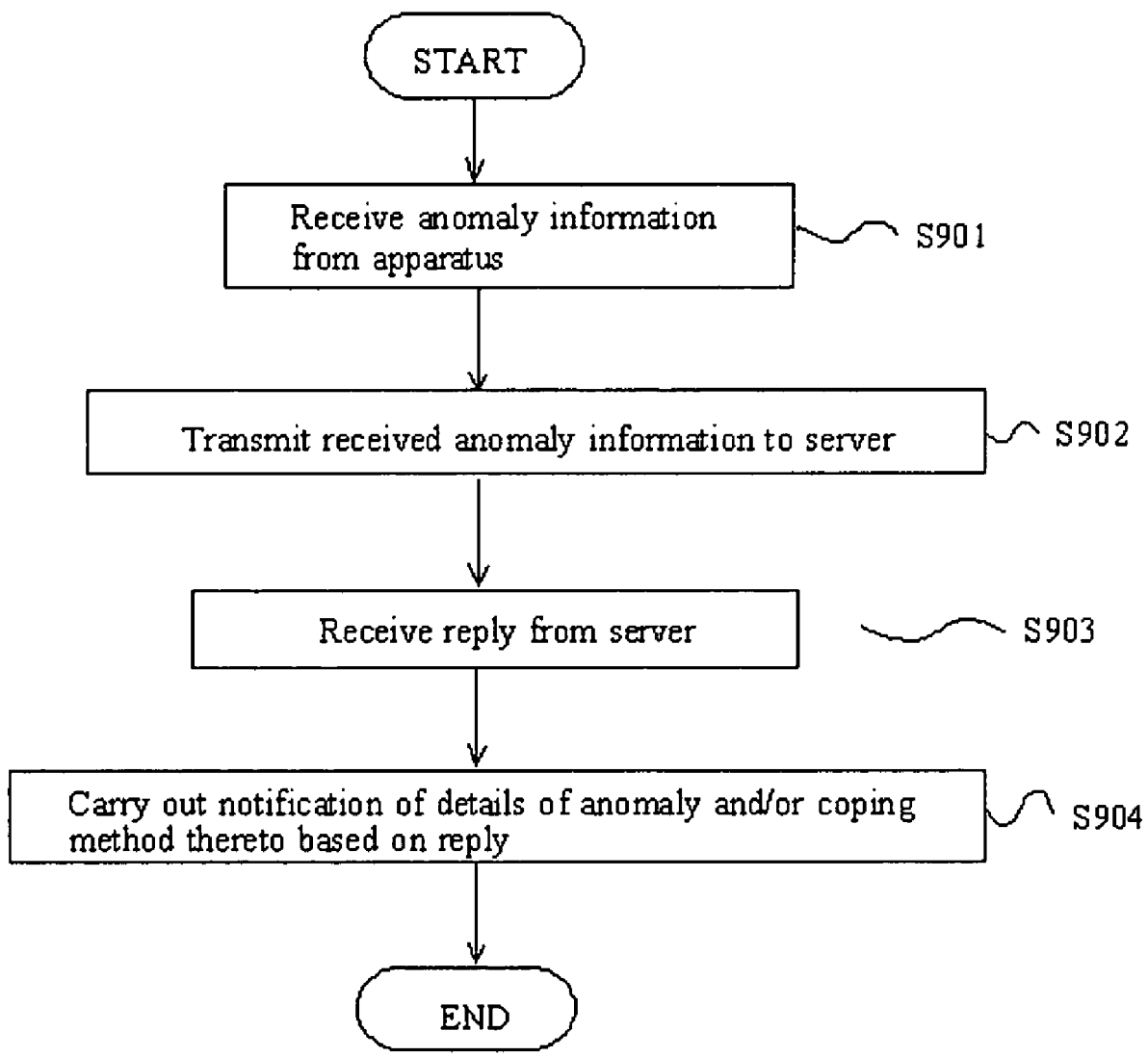
FIG. 9 is a flow chart of an information terminal processing of the first embodiment of the present invention.

FIG. 9 is a flow chart of processing of an information terminal. The information terminal executes the processing of the flow chart in FIG. 9 with respect to each transmission of anomaly information from the apparatus. In step S901, anomaly information is transmitted from the apparatus (the step of receiving anomaly information). In step S902, the received anomaly information is transmitted to the server (the step of transmitting anomaly information). In step S903, the reply is received from the server (the step of receiving reply). In step S904, the details and/or the coping method to the anomaly is provided based on the reply (the step of carrying out notification).

Note that the flow chart of FIG. 9 may be regarded as a flow chart for processing of a program for implementing an information terminal of the first embodiment by a computer (i.e., a terminal processing program).

Figure 10:
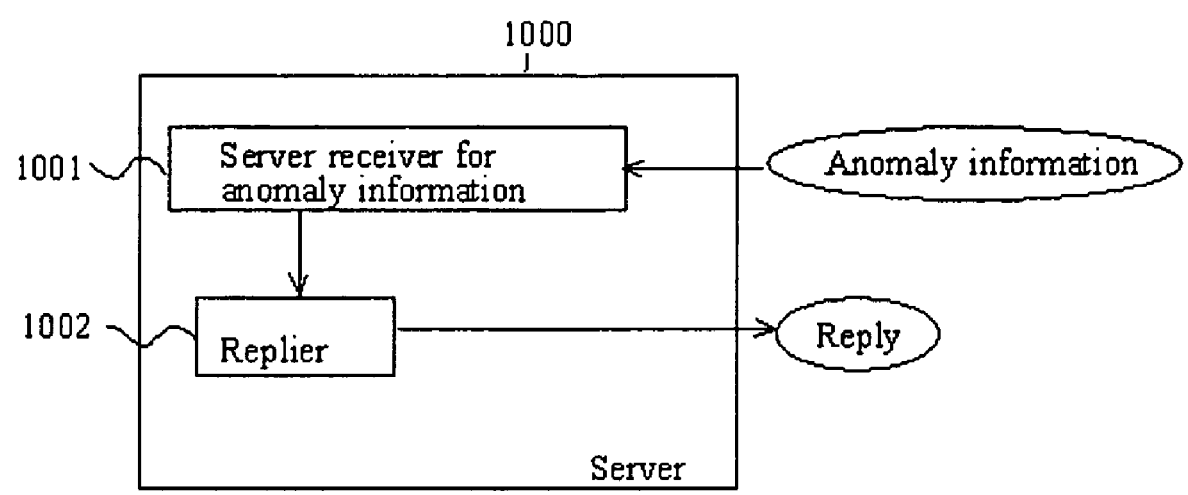
FIG. 10 is a functional block diagram of a server of the first embodiment of the present invention.

FIG. 10 is a functional block diagram of a server of the first embodiment. The server 1000 comprises the server receiver for anomaly information 1001 and the replier 1002.

Note that the server of the first embodiment may be constituted by any of hardware, program (software), or both of the hardware and the program. Examples of elements for implementing a server, in case of utilizing a computer, are the hardware comprising CPU (Central Processing unit), memory, bus, interface etc., and the program executable on the hardware. Moreover, such program may be stored in a medium.

The "server receiver for anomaly information" 1001 receives the anomaly information transmitted from the information terminal. This reception is executed according to the protocol defined with the information terminal.

The "replier" 1002 replies with the details and/or the coping method to the anomaly to the information terminal based on the received anomaly information. This reply is also executed according to the protocol defined with respect to the information terminal. Moreover, it is necessary to generate a reply from anomaly information upon replying. For example, a server may store a table, in which the anomaly and the details and/or the coping method to the anomaly are correlated, and by referring this table, may generate a reply to the anomaly information.

Figure 11:
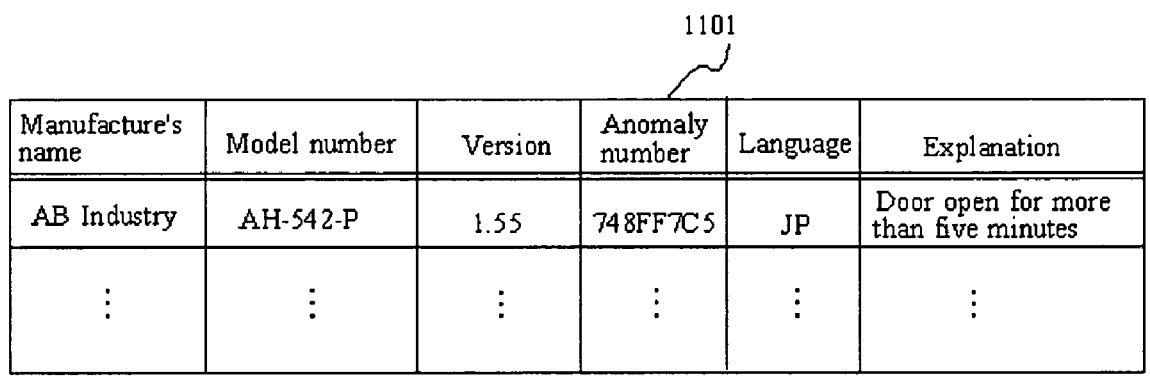
FIG. 11 is an illustration of a table storing details of said anomaly and/or coping method thereto relating to anomaly information.

FIG. 11 is an illustration of a table, in which the manufacturer's name, model number, version, and language are correlated to details of the anomaly and/or coping method thereto. In the "explanation" column of the table of FIG. 11, a string indicating the details of the anomaly and/or the coping method thereto is stored. The server can acquire the details of the anomaly and/or the coping method thereto, which are included in the reply, by referring to this table.

Note that, in the case of a plurality of languages, it is preferable to divide the table of FIG. 11 into two tables because the manufacturer's name, the model number, the version, and the contents of the column of anomaly information are redundantly stored.

FIG. 12 is an illustration of two tables into which the table of FIG. 11 may be divided. In the table 1201, the manufacturer's name, the model number, the version, and the anomaly number and the explanation identifier are correlated and the values thereof are stored. The explanation identifier is an identifier assigned to the details of anomaly and/or the coping method thereto. In the table 1202, the explanation identifier, the language, and the explanation are correlated and the values thereof are stored. By dividing the table as described, it becomes possible to reduce the size of necessary storage area for the table. Moreover, in the case of a new language, it requires only to add data to the table 1202, which is smaller than the table 1101, thereby decreasing workload.

Figure 13:
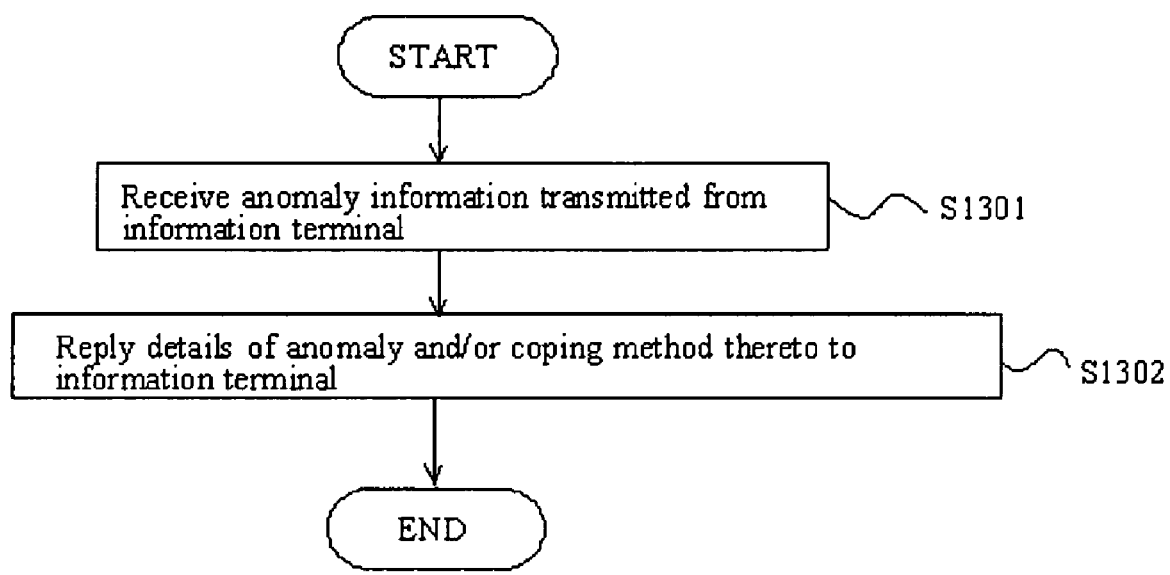
FIG. 13 is a flow chart of a server processing of the first embodiment of the present invention.

FIG. 13 is a flow chart of a server processing of the first embodiment. Each time the information terminal transmits the anomaly information and the anomaly information reaches to the server, the server executes the processing of the flow chart of FIG. 13. In step S1301, the anomaly information transmitted from the information terminal is received (the step of receiving anomaly information by server). In step S1302, the details of the anomaly and/or the coping method thereto is provided to the information terminal based on the received anomaly information (the step of replying).

Note that the flow chart of FIG. 13 may be regarded as a flow chart of processing of a program for implementing a server of the first embodiment by a computer (i.e., a server processing program).

According to the first embodiment, the server judges information of an anomaly occurring in the apparatus including home appliances and equipment, and transmits the details of the anomaly and/or the coping method thereto, so that it becomes possible to provide a detailed coping method corresponding to many appliances, etc., and to modify assignment of the anomaly information or coping method by changing memory details of the server. Specifically, in cases where a program for controlling the apparatus is changed and new mode or error is installed, it becomes possible to provide the details of the anomaly and/or the coping method thereto by updating memory details of the server. Moreover, by managing statistics information about the anomaly information, etc., on server side, in cases where the identical anomaly information is repeatedly received from a specific information terminal, it becomes possible to determine that the anomaly has occurred in the apparatus locating the home or facility, in which the specific information terminal is installed, and to dispatch a service person to the home or the facility.

As described hereinabove, in the first embodiment, the system for processing anomaly according to claim 1 is mainly disclosed. Hence, the system for processing anomaly comprising:

an information terminal, which communicates with an apparatus of a home appliance or facility equipment, and thereby receives and processes anomaly information indicating an anomaly of said apparatus; and a server, which receives the anomaly information via a communication network and said information terminal, and causes said information terminal to perform processing based on the anomaly information, wherein said information terminal comprises:

a terminal transmitter for anomaly information, which transmits the anomaly information so received to said server;

a receiver for reply, which receives a reply to the transmitted anomaly information from said server, and a notifier, which provides notification of details of said anomaly and/or coping method thereto based on said reply, wherein said server comprises:

a server receiver for anomaly information, which receives the anomaly information so transmitted from said information terminal, and a replier, which replies with the details of the anomaly and/or the coping method thereto to the information terminal based on said anomaly information so received, is mainly disclosed.

Moreover, in the first embodiment, the information terminal according to claim 3 is mainly disclosed. Hence, the information terminal, which communicates with an apparatus of a home appliance or a facility equipment and thereby receives anomaly information indicating an anomaly of said apparatus, and which transmits the anomaly information so received to a server for processing, wherein said information terminal comprises:

a terminal transmitter for anomaly information, which transmits the anomaly information so received to said server, a receiver for reply, which receives a reply to the transmitted anomaly information from said server, and a notifier, which provides notification of details of said anomaly and/or coping method thereto based on said reply, is mainly disclosed.

Moreover, in the first embodiment, the server is mainly disclosed. Hence, the server, which communicates with an information terminal, which in turn communicates with an apparatus of a home appliance or facility equipment and thereby receives anomaly information indicating an anomaly of said apparatus, wherein said server comprises:

a server receiver for anomaly information, which receives the anomaly information transmitted from said information terminal, and a replier, which replies with the details of the anomaly and/or the coping method thereto to the information terminal based on said anomaly information so received, is mainly disclosed.

Moreover, in the first embodiment, an operation method for the system for processing an anomaly is mainly disclosed. Hence, the method of operating a system for processing an anomaly, in which said system comprises:

an information terminal, which communicates with an apparatus of a home appliance or facility equipment, and thereby receives for processing anomaly information indicating an anomaly of said apparatus; and a server, which receives the anomaly information via a communication network and said information terminal, and causes said information terminal to perform processing based on the anomaly information, wherein said method of operating a system for processing for anomaly comprises:

a step of transmitting anomaly information, which transmits the anomaly information received by said information terminal to said server, a step of receiving anomaly information by server, in which said server receives the anomaly information transmitted by said step of transmitting anomaly information, a step of replying, in which said server replies with details of anomaly and/or coping method thereto to the information terminal based on said anomaly information received by said step of receiving anomaly information by server, and a step of carrying out notification, in which said information terminal provides notification of the details of anomaly and/or the coping method thereto based on the reply provided by said step of replying, is mainly disclosed.

Moreover, in the first embodiment, the terminal processing program is mainly disclosed. Hence, the terminal processing program executable by a computer, which communicates with an apparatus of a home appliance or facility equipment and thereby receives anomaly information indicating an anomaly of said apparatus, and which transmits the anomaly information so received to a server for processing, wherein said terminal processing program executes on a computer:

a step of transmitting anomaly information by terminal, which transmits the anomaly information so received to said server, a step of receiving reply, which receives a reply to the transmitted anomaly information from said server, and a step of carrying out notification, which provides notification of details of said anomaly and/or coping method thereto based on said reply, is mainly disclosed.

Moreover, in the first embodiment, the server processing program is mainly disclosed. Hence, the server processing program executable by a computer, which communicates with an information terminal, which in turn communicates with an apparatus of a home appliance or facility equipment and thereby receives anomaly information indicating an anomaly of said apparatus, wherein said server processing program executes on a computer:

a step of receiving anomaly information by server, which receives the anomaly information transmitted from said information terminal, and a step of replying, which replies with details of the anomaly and/or coping method thereto to the information terminal based on said received anomaly information, is mainly disclosed.

Furthermore, according to the first embodiment, as described in the first example, it becomes possible to provide a system for carrying out notification of an anomaly, a method for carrying out notification of an anomaly, and an apparatus for carrying out notification of an anomaly.

Therefore, it becomes possible to provide:

the system for carrying out notification of an anomaly, which is a system comprising an information terminal, which communicates with a home appliance or equipment, manages and controls said apparatus, wherein said information terminal communicates with a server via a communication network and performs notification of anomaly information about the home appliance or equipment; wherein in cases where the anomaly occurs in the home appliance or equipment, the anomaly information is provided to the server via the information terminal, the server transmits the details of the anomaly and the coping method thereto to the information terminal by referring to the anomaly number attached to said anomaly information, and the details of the anomaly and the coping method thereto are displayed on the display unit of the information terminal.

In addition, it becomes possible to provide:

the method for carrying out notification of anomaly, which is a method for carrying out notification of anomaly by a system comprising an information terminal, which communicates with a home appliance or equipment, manages and controls said apparatus, wherein said information terminal communicates with a server via communication network and provides notification of anomaly information about the home appliance or equipment, comprising:

a step of carrying out notification of the anomaly information to the server via the information terminal in cases where the anomaly occurs in the home appliance or equipment, a step of transmitting details of the anomaly and the coping method thereto from the server to the information terminal by referring to the anomaly number attached to said anomaly information, and a step of displaying said transmitted the details of the anomaly and the coping method thereto on a display unit of the information terminal.

In addition, it becomes possible to provide the apparatus for carrying out notification of anomaly information, which is an apparatus comprising an information terminal, which communicates with a home appliance or equipment, manages and controls said apparatus, wherein said information terminal communicates with a server via a communication network and performs notification of anomaly information about the home appliance or equipment; wherein in cases where the anomaly occurs in the home appliance or equipment, the anomaly information is provided to the server via the information terminal, the server transmits details of the anomaly and the coping method thereto by an anomaly number attached to said anomaly information, and the information terminal displays details of the anomaly and the coping method thereto on the display unit thereof.

For the above purpose, the terminal transmitter for anomaly information 501 transmits the anomaly information received by the information terminal 500, thereby providing notification of the anomaly to the server via the information terminal. Moreover, the server 1000, which has received the anomaly information, extracts an anomaly number from the anomaly information illustrated in FIG. 4, and transmits the details of the anomaly and the coping method thereto illustrated in FIG. 6 to the information terminal, and the information terminal 500 displays the details of the anomaly and the coping method thereto as illustrated in FIG. 8.

The Second Embodiment

As the second embodiment of the present invention, the system for processing anomaly, wherein a server determines whether or not it is necessary to display details of the anomaly and/or coping method thereto to an information terminal, will be described.

Figure 14:
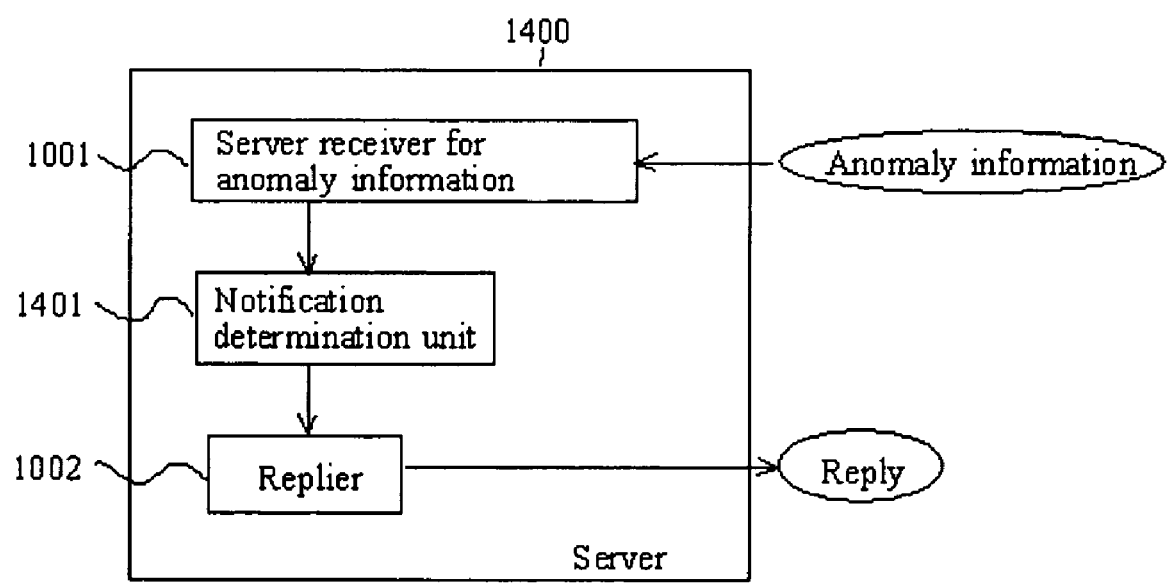
FIG. 14 is a functional block diagram of a server of the second embodiment of the present invention.

FIG. 14 is a functional block diagram of the server of the system for processing anomaly of the second embodiment. The server 1400 comprises the server receiver for anomaly information 1001, the notification determination unit 1401, and the replaying unit 1002. Hence, the server of the second embodiment has the configuration of the server of the first embodiment including the notification determination unit 1401.

Note that the same reference numbers as the first embodiment are used for the server receiver for anomaly information and the replier. In this regard, the definitions thereof are the same, but in actuality in cases of manufacturing the same, the make-up of such may be different. The same applies to the reference numbers in other drawings referred to in the specification herein The "notification determination unit for anomaly information" 1401 determines whether the notification by the information terminal is executed based on the anomaly information received by the server receiver for anomaly information. For example, a column storing the value, which indicates whether or not the notification by the information terminal is executed, is added to the table 1101 illustrated in FIG. 11, and it is determined based on the value stored in the column whether or not the notification by the information terminal is executed.

FIG. 15 is an illustration of the table 1501, to which the column storing a value indicating whether or not the notification by the information terminal is executed, is added. If "YES" is stored as the value in the "notification" column, it means that the information terminal is to be caused to execute notification. If "NO" is stored, it means that it is not necessary to cause the information terminal to execute notification.

In the second embodiment, the replier replies with an instruction to not execute notification to the information terminal in substitution for the details of the anomaly and the coping method thereto in cases where the determination result of the notification determination unit 1401 indicates that the information terminal is not to be caused to execute the notification.

FIG. 16 is an illustration of the instruction to not execute notification as the reply. In this case, by arranging "<notification not executed/>" before "</details of anomaly>", it is expressed that this reply is an instruction to not execute notification.

Figure 17:
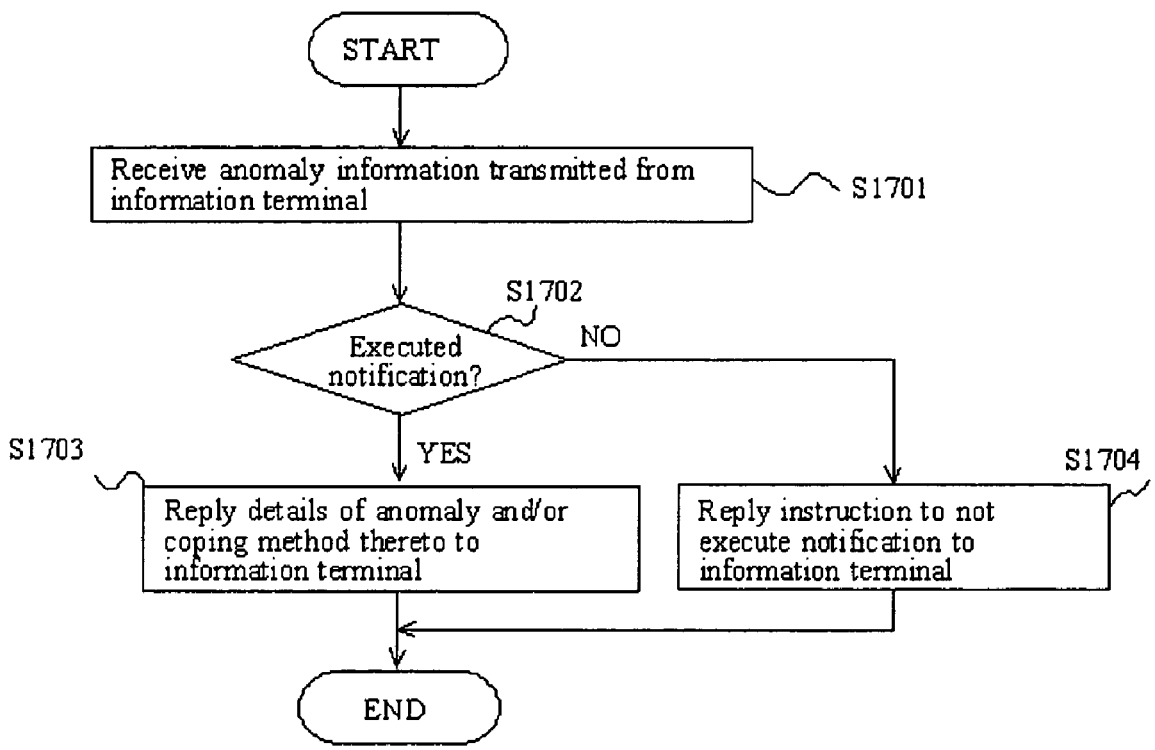
FIG. 17 is a flow chart of a server processing of the system for processing anomaly of the second embodiment of the present invention.

FIG. 17 is a flow chart of processing of the server of the system for processing anomaly of the second embodiment. This flow chart is executed in substitution for the processing of the flow chart of FIG. 14. In step S1701, the anomaly information transmitted from the information terminal is received. In step S1702, it is determined whether or not the notification is executed by the information terminal. For example, the determination is made by referring to the table 1501 and by acquiring the value of the "notification" column. If it is determined to cause the information terminal to execute notification, the processing of step S1703 is executed, or if not, step S1704 is executed. In step S1703, the details of the anomaly and/or the coping method thereto is provided to the information terminal. This is the same as step S1302. In step S1704, the instruction to not execute notification is provided to the information terminal.

Note that the flow chart of FIG. 17 may be regarded as a flow chart of processing of a program for implementing an information terminal of the second embodiment by a computer (i.e. a server processing program).

According to the second embodiment, by determining notification of anomaly by the server, it becomes possible to switch display or non-display of the details of the anomaly and/or the coping method thereto by the information terminal, thereby improving functionality of service. In addition, it becomes possible to cause the information terminal to transmit information, which is unnecessary to be notified, thereby storing information including anomaly information of various details.

As described hereinabove, in the second embodiment, the system for processing anomaly is mainly disclosed. Hence, The system for processing anomaly, wherein said server comprises:

a notification determination unit, which determines as to whether or not to execute notification by the information terminal based on the anomaly information received by said server receiver for anomaly information, and said replier, which replies with an instruction to not execute notification, which is information indicating that the notification is not executed, to said information terminal in lieu of the details of anomaly and/or the coping method thereto, when a result of determination by said notification determination unit is to the effect that the notification is not to be executed, is mainly disclosed.

Note that, according to the second embodiment, as described in the first example, for example, it becomes possible to provide the following method for carrying out notification of an anomaly and an apparatus for carrying out notification of the anomaly.

Therefore, the method for carrying out notification of an anomaly and the apparatus thereof, as described in the first embodiment below, wherein the server, which has received the anomaly information, comprises:

a step of determining and processing details of the anomaly by an anomaly number, and a step of transmitting details of the anomaly and/or a coping method thereto, which are displayed at an information terminal, or information of non-display in the case of non-display, depending on a result of the determination.

In addition, it becomes possible to provide an apparatus for carrying out notification of anomaly of the first embodiment, wherein the server, which has received the anomaly information, determines and processes details of the anomaly by an anomaly number, and depending on a result of the determination, transmits details of the anomaly and/or a coping method thereto, which are displayed at an information terminal, or if not displayed, transmits the information of non-display, and the information terminal performs display of anomaly information according to the received information.

For the above purpose, the server 1400 of the second embodiment comprises the notification determination unit 1401.

The Third Embodiment

Figure 18:
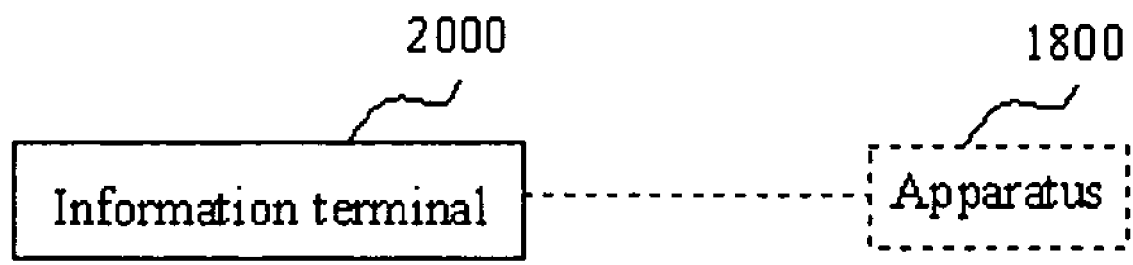
FIG. 18 is a schematic diagram of an appearance of an information terminal of the third embodiment of the present invention.

FIG. 18 is a schematic diagram of the appearance of the information terminal of the third embodiment of the present invention. The information terminal 2000 of the third embodiment communicates with the apparatus 1800 and processes anomaly information, which is information indicating an anomaly of said apparatus.

Figure 19:
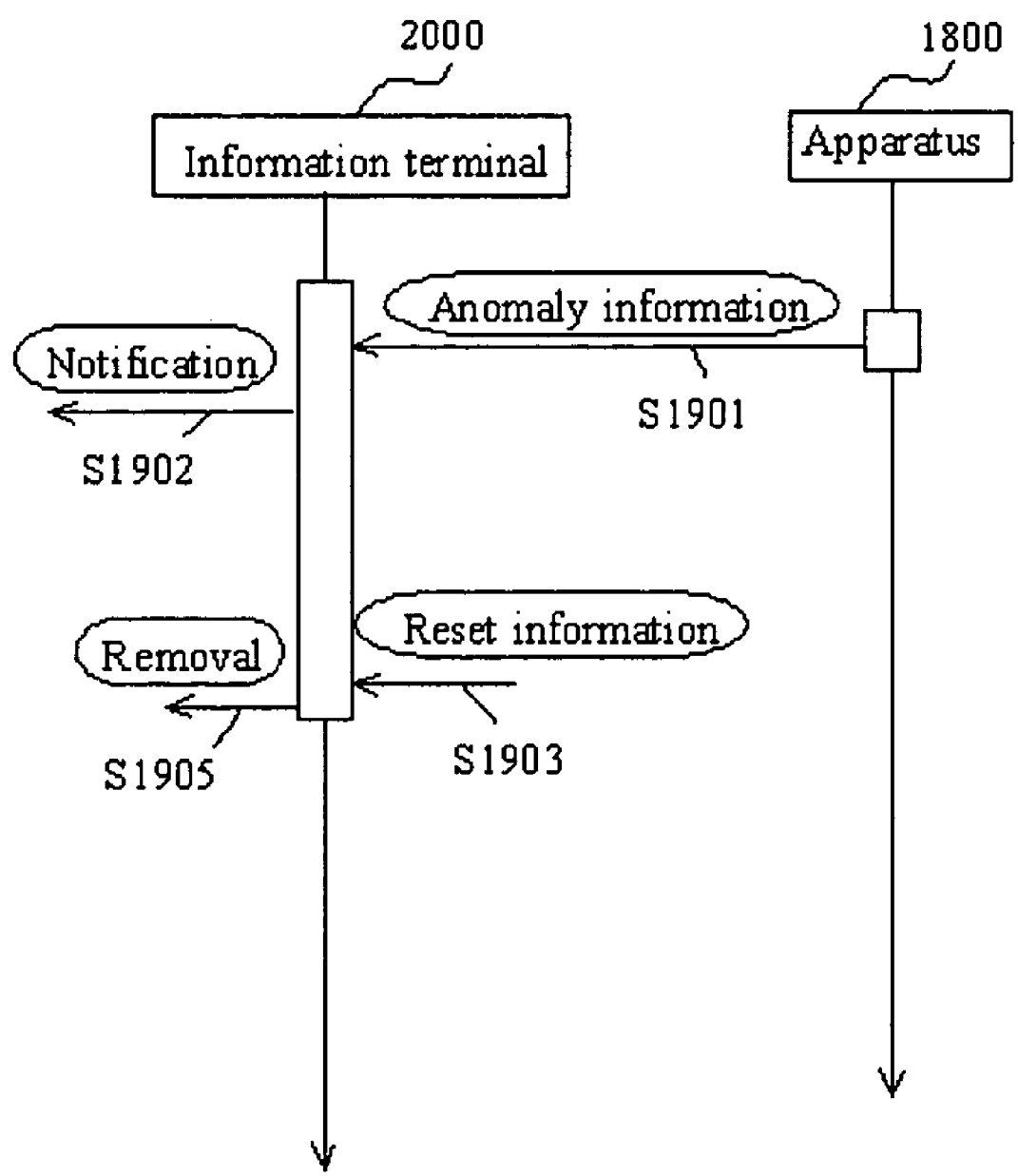
FIG. 19 is a sequential diagram of processing of an information terminal of the third embodiment of the present invention.

FIG. 19 is a sequential diagram of processing of the information terminal 2000 of the third embodiment. In step S1901, it is assumed that an anomaly occurred in the apparatus 1800, and the anomaly information indicating the anomaly is transmitted to the information terminal 2000. The information terminal 2000, which has received the anomaly information, in step S1902, indicates details of the anomaly and/or coping method thereto on a display etc. based on the anomaly information. After that, in step S1903, the information terminal receives reset information, which indicates that the apparatus 1800 has recovered from the anomaly; and in step S1904, the display of the details of the anomaly and/or the coping method thereto is removed. This makes it possible to prevent that the details of the anomaly and/or the coping method thereto to remain displayed even after the apparatus 1800 has recovered from the anomaly, so that the user is able to know whether the apparatus 1800 has recovered.

Note that the reset information received by step S1903 may be transmitted by the apparatus 1800, or may be transmitted by another apparatus such as a server, which is able to monitor operation of an apparatus, or to operate the apparatus 1800 by remote-control.

Figure 20:
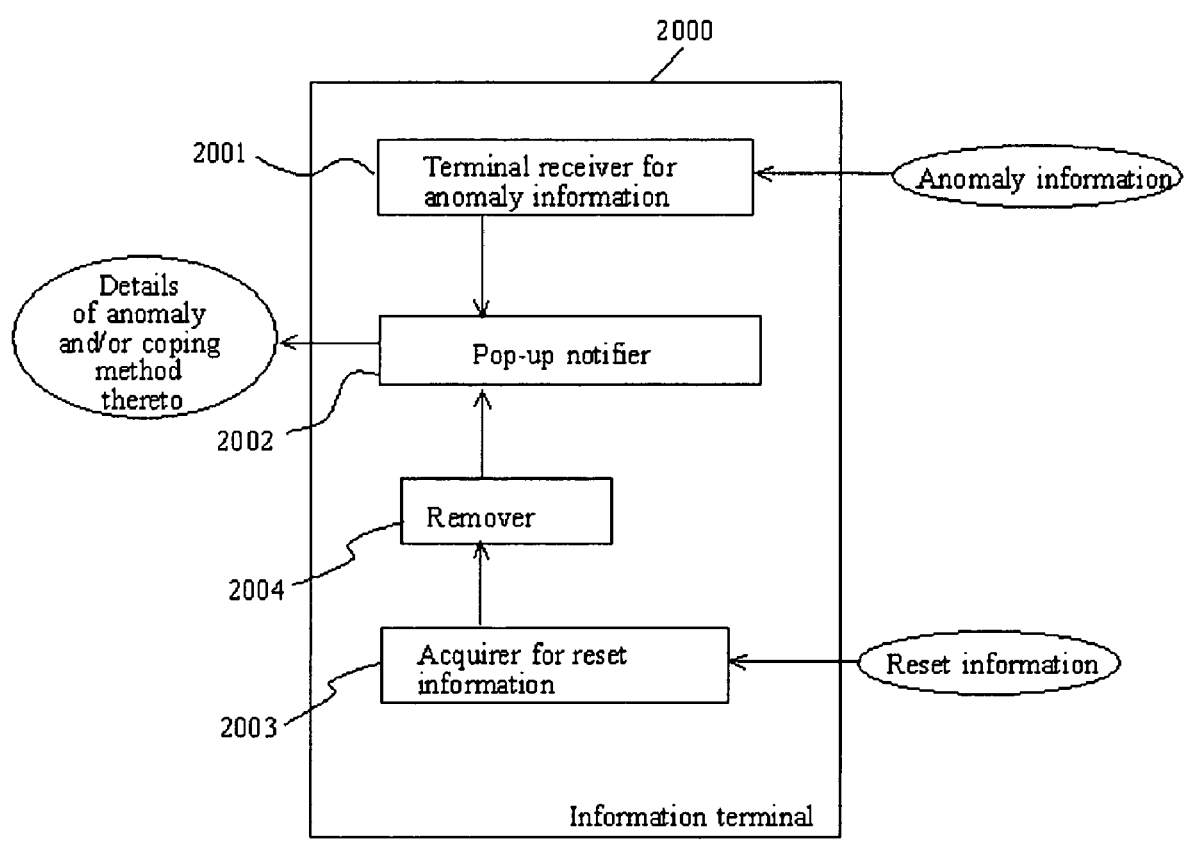
FIG. 20 is a functional block diagram of an information terminal of the third embodiment of the present invention.

FIG. 20 is a functional block diagram of the information terminal of the third embodiment of the present invention. The information terminal 2000 comprises the terminal receiver for anomaly information 2001, the pop-up notifier 2002, the acquirer for reset information 2003, and the remover 2004.

Note that the server of the third embodiment is able to be constituted by any of hardware, program (software), or both the hardware and the program. Examples of elements for implementing a server, in case of utilizing a computer, the hardware comprising CPU, memory, bus, interface etc., and the program executable on the hardware. Moreover, such program may be stored in a medium.

The "terminal receiver for anomaly information" 2001 receives anomaly information from the apparatus. For example, the anomaly information illustrated in FIG. 3 may be received by the terminal receiver for anomaly information 2001 under the condition, in which communication between the information terminal and the apparatus by utilizing wireless LAN, specified low power wireless communication, or power line communication etc. is possible, by utilizing the above communication means.

The "pop-up display" 2002 displays details of the anomaly and/or coping method thereto by a pop-up, based on said anomaly information, and provides notification. For example, the anomaly information and the details of anomaly and/or the coping method thereto are correlated and stored in the information terminal, and by utilizing the memory, the details of the anomaly and/or the coping method thereto are displayed. Meanwhile, as described in the first and the second embodiment, the anomaly information may be transmitted to a server, and based on the replay thereto, the details of the anomaly and/or the coping method thereto may be displayed. In addition, the "pop-up" means that the display is viewable by a person, who has watched the display without attention. For example, it displays a window for displaying the details of the anomaly and/or the coping method thereto by overlapping the normal display. Note that the above display may be a display mounted on the other apparatus communicable with the information terminal. For example, in cases where the information terminal is communicable with a TV receiver, the details of the anomaly and/or the coping method thereto may be displayed by overlapping the TV program received by the TV receiver or picture of a video-playing at that time.

In addition, while the pop-up is displayed, the other functions of the apparatus, on which the pop-up is displayed, may be non-usable as long as the anomaly, which has caused the pop-up, is unresolved. This prevents the user from diverting attention to other thing, thereby reducing occurrence of accident.

Figure 21:
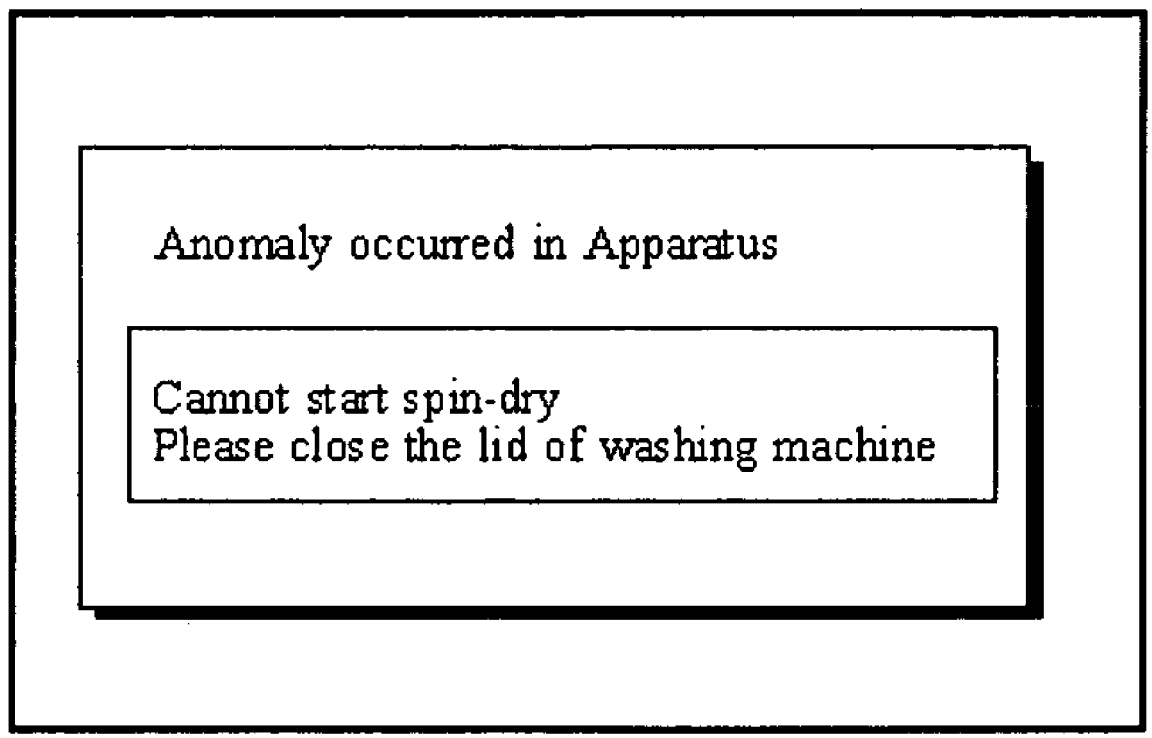
FIG. 21 is an illustration of a pop-up display.

FIG. 21 is an illustration of the pop-up. As shown in FIG. 21, in order to increase visual effect, it may include a shadow as if the window appears above the display. Note that, as shown in FIG. 21, when the widow is displayed for the pop-up, the information terminal may manage an identifier of the window for the pop-up corresponding to the anomaly information from the apparatus.

Figure 22:
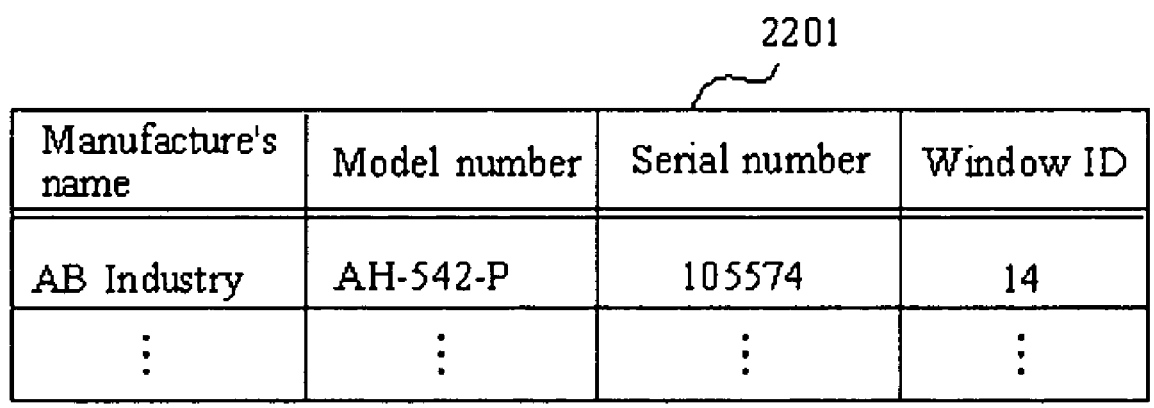
FIG. 22 is an illustration of a table for managing an identifier of a window for a pop-up display.

FIG. 22 is an illustration for managing the identifier of the window. The table 2201 manages the display of a pop-up by a window ID (i.e. the identifier of the window) corresponding to the anomaly information from an apparatus.

The "acquirer for reset information" 2003 acquires reset information. The "reset information" corresponds to information, which indicates that an apparatus has recovered from the anomaly. As described above, for example, the reset information transmitted from the apparatus, which has recovered from the anomaly, may be received. Moreover, the reset information may be transmitted from a server etc., which is able to operate the apparatus by remote-control. Furthermore, the reset information may be acquired by a service person, etc., who confirms that the apparatus has recovered from the anomaly, and operates a button etc. of the information terminal.

FIG. 23 is an illustration of the reset information, which includes the manufacturer's name of the apparatus recovered from the anomaly, the model number thereof, the serial number (production number) thereof, and indicates which apparatus has recovered from the anomaly.

The "remover" 2004 removes the pop-up by the pop-up notifier 2002 based on the reset information, and therefore puts the display into the state, in which the pop-up is not displayed. For example, in cases where the window ID for the pop-up is managed by the table 2201, and the reset information of FIG. 23 is acquired, the table 2201 is searched by referring to the reset information, the value of 14 is acquired as the window ID, and the window identified by the window ID is removed.

Figure 24:
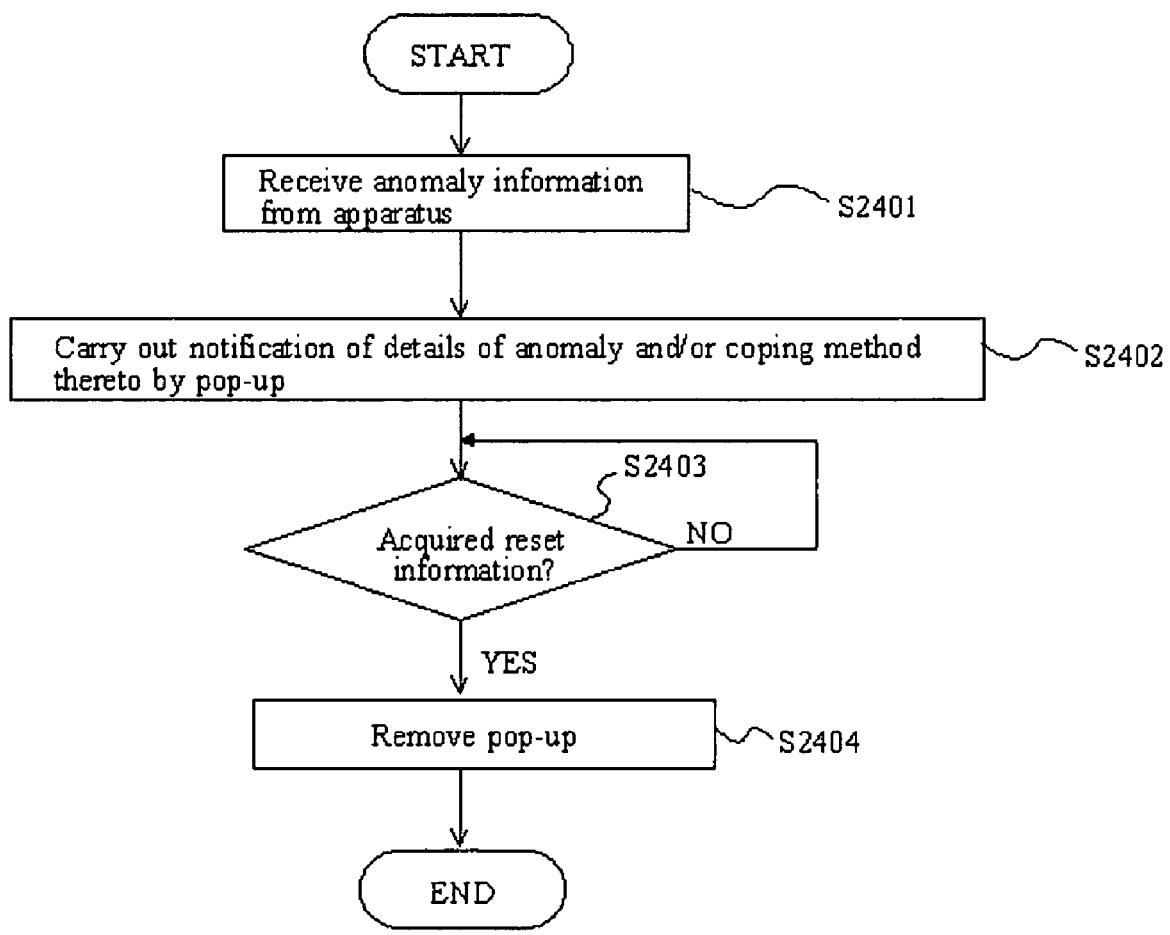
FIG. 24 is a flow chart of processing of an information terminal of the third embodiment of the present invention.

FIG. 24 is a flow chart explaining the processing of the information terminal of the third embodiment. When the apparatus transmits the anomaly information, and the information terminal becomes able to receive the anomaly information; the information terminal executes the processing of the flow chart of FIG. 24. In step S2401, the anomaly information is received from the apparatus (the step of receiving anomaly information). In step S2402, the details of the anomaly and/or the coping method thereto are displayed by pop-up and notified (the pop-up notification step). In step S2403, acquisition of the reset information is awaited. If the reset information is acquired by the step of acquiring reset information, the processing of step S2404 is executed. In step S2404, the pop-up is removed (the step of removing).

Note that the flow chart illustrated in FIG. 24 can be regarded as a flow chart of a program (i.e., terminal processing program) for implementing the information terminal of the third embodiment by a computer. Moreover, the flow chart illustrated in FIG. 24 may be regarded as a flow chart of a method (i.e., a method for carrying out notification of anomaly), which is used by the information processing terminal or the terminal processing program of the third embodiment.

According to the third embodiment, the pop-up is removed based on the reset information, so that it is possible to indicate recovery from the anomaly to the user, thereby improving user-friendliness.

As described hereinabove, in the third embodiment, the information terminal is mainly disclosed. Hence, the information terminal, which communicates with an apparatus of a home appliance or facility equipment and thereby carries out processing for anomaly information indicating an anomaly of said apparatus, wherein said information terminal comprises:

a terminal receiver for anomaly information, which receives anomaly information from said apparatus, a pop-up notifier, which provides notification by displaying details of an anomaly and/or a coping method thereto on a pop-up on a display based on said anomaly information, an acquirer for reset information, which acquires reset information indicating that said apparatus has recovered from the anomaly, and a remover, which removes the pop-up displayed by said pop-up notifier based on said reset information, is mainly disclosed.

Moreover, in the third embodiment, the method for carrying out notification of anomaly information is mainly disclosed. Hence, the method of carrying out notification of anomaly, which comprises:

a step of receiving anomaly information, which receives the anomaly information indicating an anomaly of a apparatus of a home appliance or facility equipment, a pop-up notification step, which displays a pop-up of details of anomaly and/or coping method thereto based on the anomaly information received by said step of receiving anomaly information, a step of acquiring reset information, which receives reset information indicating that said apparatus has recovered from anomaly, and a step of removing, which removes the pop-up of said pop-up notification step based on the reset information acquired by said step of acquiring reset information, is mainly disclosed.

Furthermore, in the third embodiment, the terminal processing program is mainly disclosed. Hence, the terminal processing program executable by a computer, which communicates with an apparatus of a home appliance or facility equipment and thereby carries out processing for anomaly information indicating an anomaly of said apparatus, wherein said terminal processing program executes on a computer:

a step of receiving anomaly information by terminal, which receives anomaly information from said apparatus, a pop-up notification step, which provides notification by displaying details of anomaly and/or coping method thereto on a pop-up on a display based on said anomaly information, a step of acquiring reset information, which acquires reset information indicating that said apparatus has recovered from the anomaly, and a step of removing, which removes the pop-up displayed by said pop-up notification step based on said reset information, is mainly disclosed.

Note that, according to the third embodiment, as described in the second and third example, it becomes possible to provide the system for carrying out notification of anomaly and the apparatus for carrying out notification of anomaly as follows.

Therefore, it becomes possible to provide:

a system for carrying out notification of anomaly, which is the system comprising an information terminal, which communicates with a home appliance or equipment, manages and controls said apparatus, wherein said information terminal provides notification of anomaly, which has occurred in said home appliance or equipment; wherein in cases where the anomaly occurs in the home appliance or equipment, and the anomaly information is provided to the information terminal, a display indicating said details of the anomaly is displayed by pop-up, and in cases where the reset information is provided by the appliance or equipment, which has provided the notification of said anomaly, to the information terminal, said pop-up is removed.

In addition, it becomes possible to provide an apparatus for carrying out notification of the anomaly comprising:

a display unit, which communicates with the appliance or equipment and provides notification of the anomaly, which has occurred in said apparatus, and a processor for anomaly information, which displays a pop-up of the details of the anomaly on the display unit upon receiving the anomaly; wherein while the anomaly occurs and the pop-up is displayed, if the reset information from the apparatus, which has provided the notification of the anomaly, is received, the pop-up is removed.

For the above purpose, referring to the information terminal 2000 of the third embodiment, (a) if the anomaly information is received, the pop-up notifier 2002 displays the pop-up of the details of anomaly and/or the coping method thereto, and (b) if the reset information is received, the remover 2004 removes the pop-up.

The Fourth Embodiment

The fourth embodiment of the present invention is almost same as the third embodiment. Note that the processing after the reset information is received is different, and in the fourth embodiment, there is a notification to the effect that the apparatus has recovered from the anomaly.

Figure 25:
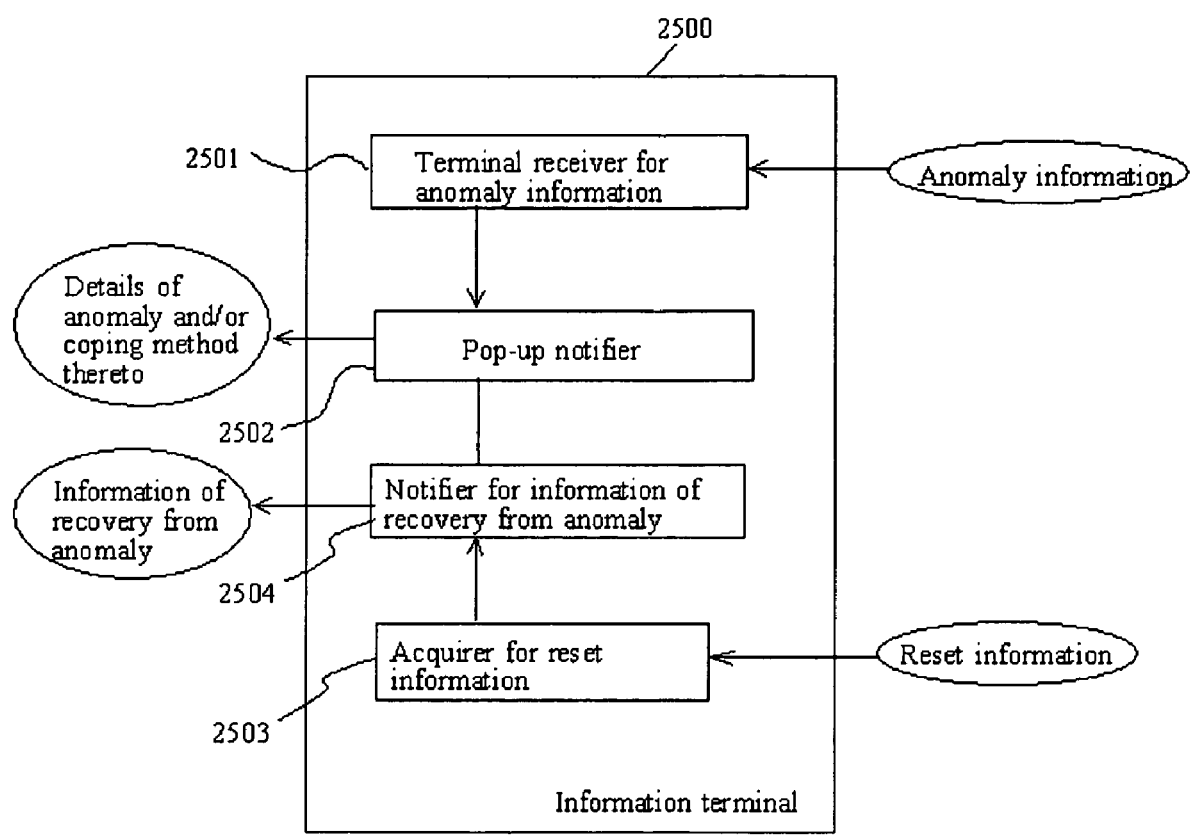
FIG. 25 is a functional block diagram of an information terminal of the fourth embodiment of the present invention.

FIG. 25 is a functional block diagram of an information terminal of the fourth embodiment. The information terminal 2500 comprises the terminal receiver for anomaly information 2501, the pop-up notifier 2502, the acquirer for reset information 2503, and the notifier for information of recovery from anomaly 2504.

Since the terminal receiver for anomaly information 2501, the pop-up notifier 2502, and the acquirer for reset information 2503 are the same as the terminal receiver for anomaly information 2001, the pop-up notifier 2001, the acquirer for reset information 2003, the descriptions thereof are not repeated.

The "notifier for information of recovery from anomaly" 2504 provides notification of the information of recovery from the anomaly based on the reset information. The "information of recovery from anomaly" corresponds to information, which indicates that an apparatus has recovered from an anomaly.

Figure 26:
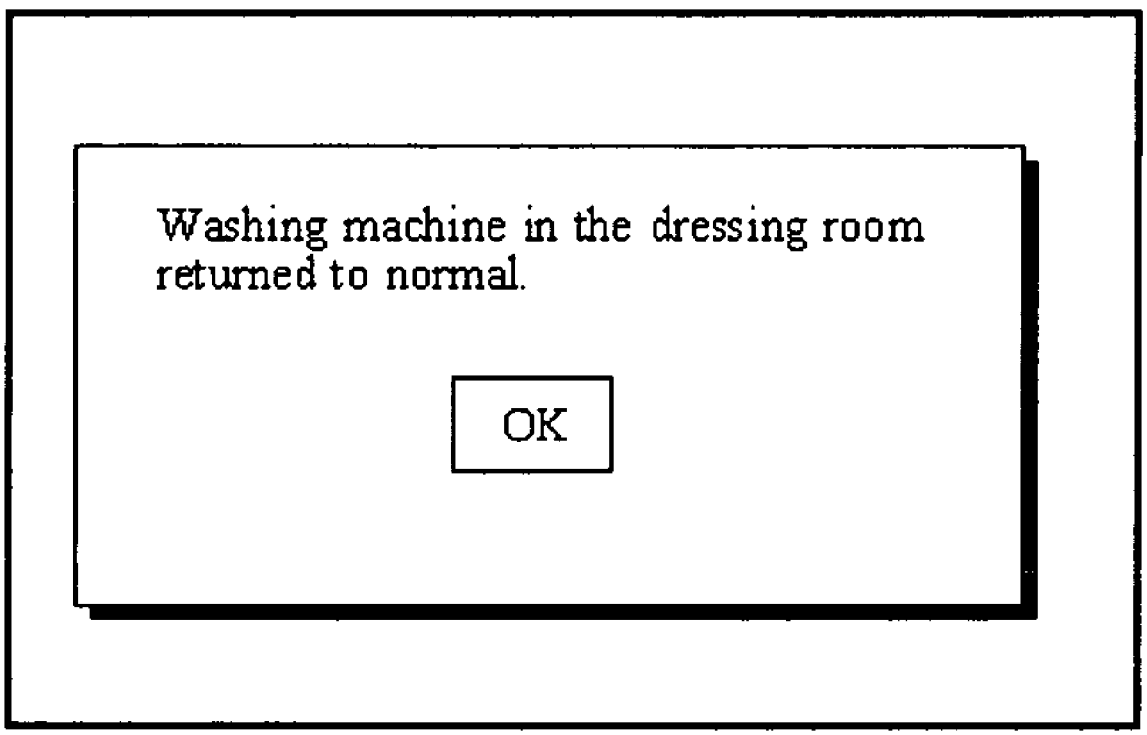
FIG. 26 is an illustration of a display of information of recovery from anomaly.

FIG. 26 is an illustration showing that the information of recovery from anomaly is provided by being displayed on the window. In FIG. 26, before the information of recovery from the anomaly is displayed, the details of the anomaly and/or the coping method thereto are displayed in the window, and the information of recovery from anomaly may be displayed by utilizing the window. Alternatively, the window indicating the details of the anomaly and/or the coping method thereto may be removed and the window for indicating the details of the anomaly and/or the coping method thereto may be generated and displayed. Note that, in FIG. 26, the window, in which the details of the anomaly and/or the coping method thereto are displayed, may be removed by the user who presses the "OK" button.

Note that, the notification of the information of recovery from anomaly may be provided not only by appealing to the eye, but also by voice or by vibration of a vibration device, etc.

Figure 27:
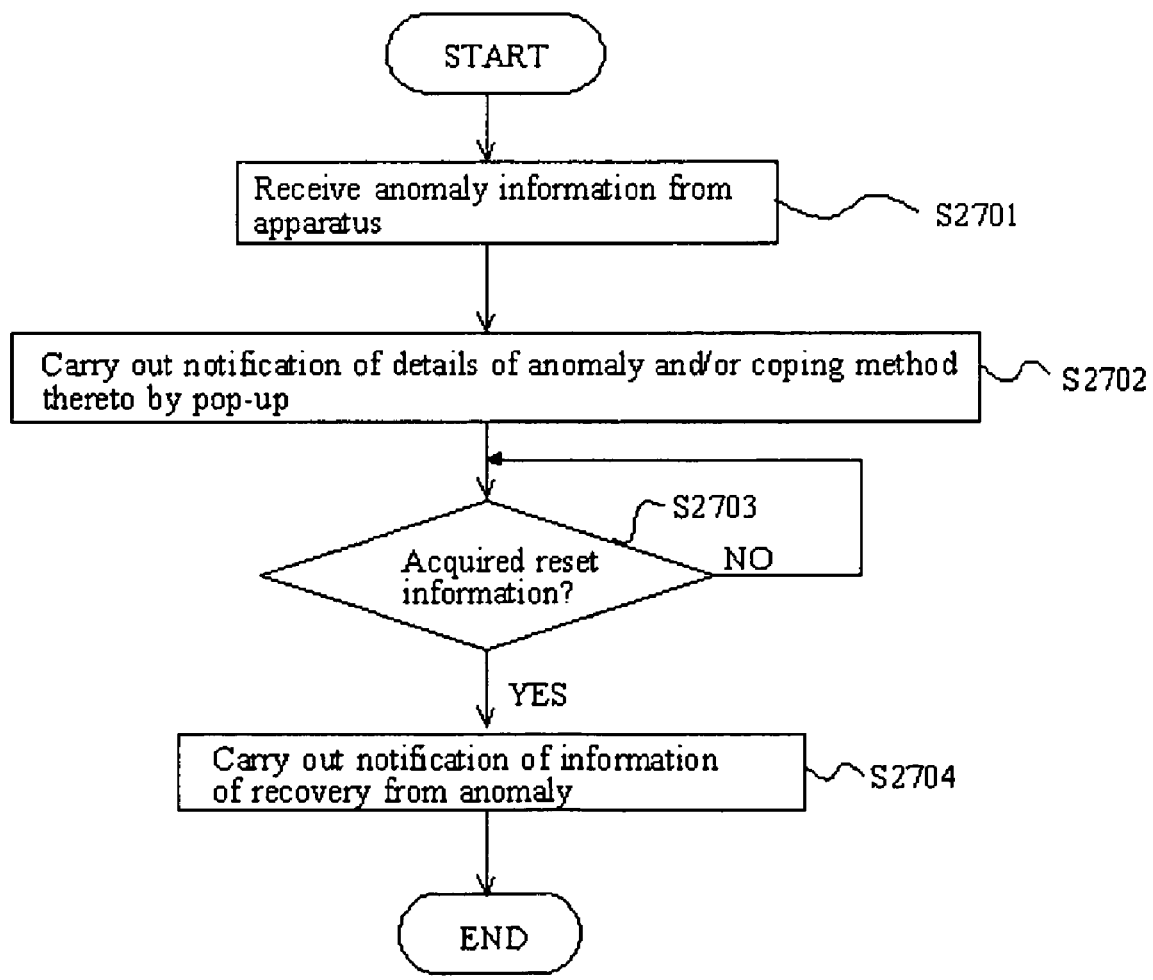
FIG. 27 is a flow chart of an information terminal of the fourth embodiment of the present invention.

FIG. 27 is a flow chart of processing of the information terminal of the fourth embodiment. If the apparatus transmits the anomaly information, and the information terminal becomes able to receive the anomaly information, the information terminal executes the processing of the flow chart of FIG. 27. In step S2701, the anomaly information is received from the apparatus (the step of receiving anomaly information). In step S2702, the details of the anomaly and/or the coping method thereto are displayed by pop-up and notified (the pop-up notification step). In step S2703, acquisition of the reset information is awaited. If the reset information is acquires by the step of acquiring reset information, the processing of step S2704 is executed. In step S2404, the information of recovery from anomaly is provided (the step of carrying out notification information of recovery from anomaly).

Note that the flow chart illustrated in FIG. 27 can be regarded as a flow chart of a program (i.e., terminal processing program) for implementing the information terminal of the fourth embodiment by a computer. Moreover, the flow chart illustrated in FIG. 27 may be regarded as a flow chart of a method (i.e., a method for carrying out notification of anomaly), which is used by the information terminal or the terminal processing program of the fourth embodiment.

According to the fourth embodiment, the information of recovery from anomaly is provided based on the reset information, so that it becomes possible to indicate the recovery from the anomaly to the user, thereby improving user-friendliness.

As described hereinabove, in the fourth embodiment, the information terminal is mainly disclosed. Hence, the information terminal, which communicates with an apparatus of a home appliance or facility equipment and thereby carries out processing for anomaly information indicating an anomaly of said apparatus, wherein said information terminal comprises:

a terminal receiver for anomaly information, which receives the anomaly information from said apparatus, a pop-up notifier, which provides notification by displaying details of anomaly and/or coping method thereto on a pop-up on a display based on said anomaly information, an acquirer for reset information, which acquires reset information indicating that said apparatus has recovered from the anomaly, and a notifier for information of recovery from anomaly, which provides notification of information of recovery from anomaly indicating a recovery from the anomaly based on said reset information, is mainly disclosed.

Moreover, in the fourth embodiment, the method for carrying out notification of anomaly information is mainly disclosed. Hence, the method of carrying out notification of anomaly, which comprises:

a step of receiving anomaly information, which receives the anomaly information indicating an anomaly of an apparatus of a home appliance or a facility equipment, a pop-up notification step, which displays a pop-up of details of anomaly and/or coping method thereto based on the anomaly information received by step of receiving anomaly information, a step of acquiring reset information, which receives reset information indicating that said apparatus has recovered from the anomaly, and a step of carrying out notification of recovery from anomaly, which carries out notification of information indicating a recovery from the anomaly based on the reset information acquired by said step of acquiring reset information, is mainly disclosed.

Furthermore, in the fourth embodiment, the terminal processing program is mainly disclosed. Hence, the terminal processing program executable on a computer, which communicates with an apparatus of a home appliance or facility equipment and thereby carries out processing for anomaly information indicating an anomaly of said apparatus, wherein said terminal processing program executes on a computer:

a step of receiving anomaly information by terminal, which receives the anomaly information from said apparatus, a pop-up notification step, which carries out notification by displaying details of anomaly and/or coping method thereto on a pop-up on a display based on said anomaly information, a step of acquiring reset information, which acquires reset information indicating that said apparatus has recovered from the anomaly, and a step of carrying out notification of information of recovery from anomaly, which provides notification of information of recovery from anomaly indicating a recovery from the anomaly based on said reset information, is mainly disclosed.

Note that, according to the fourth embodiment, as described in the third example, by utilizing a gas apparatus as the apparatus, it is possible to provide a system for carrying out notification of a gas anomaly, an apparatus for carrying out notification of a gas anomaly, and the method for carrying out notification of a gas anomaly, as follows.

Therefore, it becomes possible to provide:

a system for carrying out notification of a gas anomaly, which is a system comprising an information terminal, which communicates with a gas apparatus, manages and controls said gas apparatus, wherein said information terminal provides notification of the anomaly, which has occurred in the gas apparatus; wherein in cases where the anomaly occurs in the gas apparatus, and the anomaly information is provided to the information terminal, a display indicating said details of the anomaly is displayed by pop-up, and in cases where the reset information is provided by the gas apparatus, which has provided notification of said anomaly, to the information terminal, details of said pop-up are changed to a display indicating reset of the anomaly.

In addition, it becomes possible to provide an apparatus for carrying out notification of a gas anomaly, which is an information terminal comprising:

a communicator, which communicates management information and control information with the gas apparatus, a processor for anomaly information, which receives the anomaly information about the gas apparatus and executes displaying a screen or removing a screen according to the details thereof, and a display unit, which displays said anomaly information; wherein in cases where the anomaly occurs in the gas apparatus, and notification is provided to the information terminal, the display indicating said details of the anomaly is displayed on said display unit by pop-up, and in cases where the reset information is provided by the gas apparatus, which has provided notification of said anomaly, to the information terminal, details of said pop-up are changed to a display indicating reset of the anomaly.

In addition, it becomes possible to provide a method for carrying out notification of an anomaly comprising:

a step of transmitting anomaly information to an information terminal upon occurrence of anomaly in a gas apparatus, a step of displaying pop-up of details of anomaly on the display unit of the information terminal upon receiving anomaly information, and a step of changing details of the pop-up to a display indicating reset of the anomaly when reset information is provided to the information terminal by the gas apparatus, which has provided notification of said anomaly.

For the above purpose, refer to the information terminal 2500 of the fourth embodiment, (a) in cases where the anomaly information is received, the pop-up notifier 2502 displays the details of the anomaly and/or a coping method thereto by pop-up, and (b) in cases where the reset information is received, the notifier for information of recovery from anomaly 2501 provides notification of the information of recovery from the anomaly.

The Fifth Embodiment

As the fifth embodiment of the present invention, the information terminal, which communicates with the home appliance and/or equipment, and processes anomaly information, which indicates anomaly of said apparatus, etc., will be described.

Figure 28:
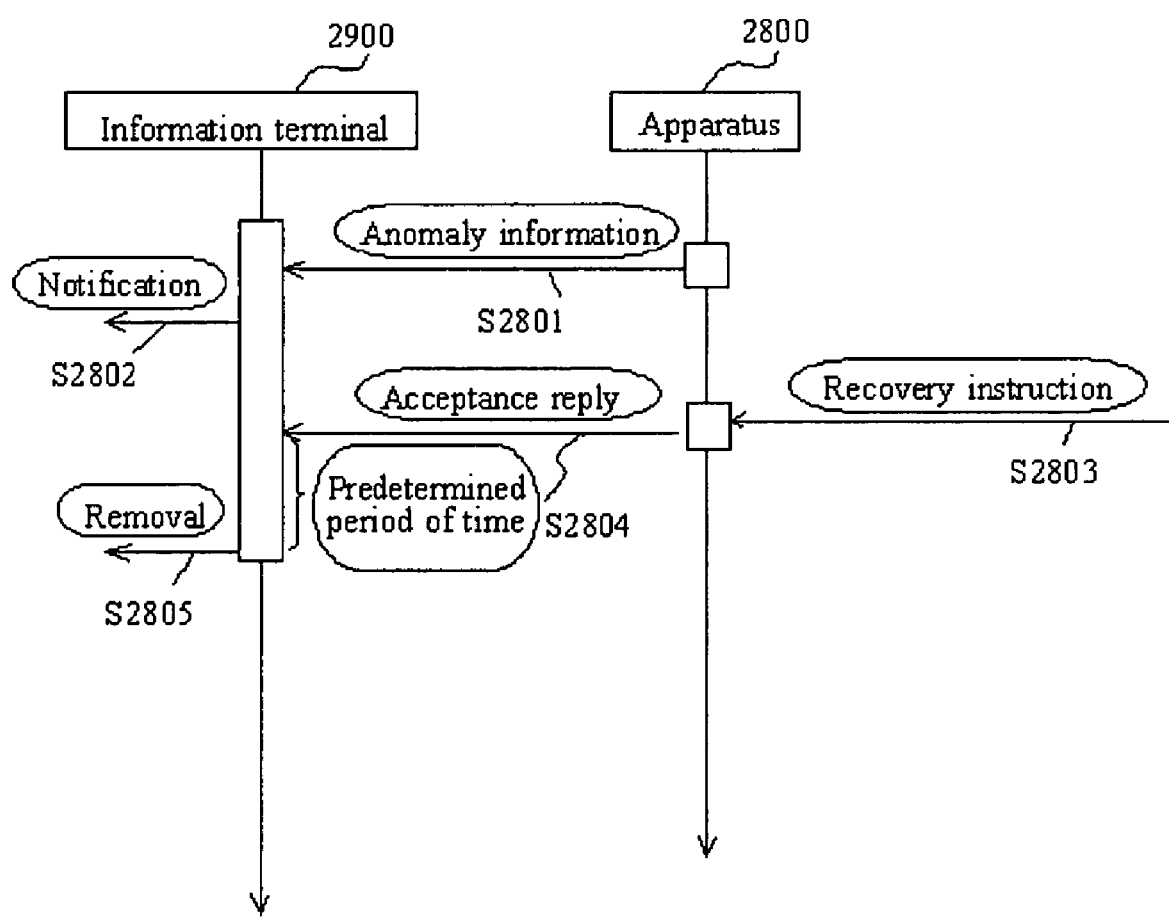
FIG. 28 is a sequential diagram of processing of the fifth embodiment of the present invention.

FIG. 28 is a sequential diagram of explaining a scheme of processing of the fifth embodiment. In step S2801, it is assumed that an anomaly has occurred in the apparatus 2800, the apparatus 2800 transmits the anomaly information, and the information terminal 2900 receives the anomaly information. And in the S2802, notification is executed based on the anomaly information. Then, in step S2803, a recovery instruction, which is an instruction on recovery from anomaly, is transmitted to the apparatus 2800, and in step S2804, the information terminal 2900 receives an acceptance reply to the recovery instruction. If a predetermined period of time is exceeded under the state in which the anomaly information remains untransmitted, it is determined that the apparatus 2800 has recovered from the anomaly, and in step S2805, the details of notification executed in step S2802 are removed. After step S2804, if the anomaly information is transmitted before the predetermined period of time is exceeded, it is determined that the anomaly still exists, and it is preferable not to execute the removal.

As described above, it becomes possible to apply the present invention to an apparatus, which does not show a recovery from an anomaly, such as some gas meters.

Figure 29:
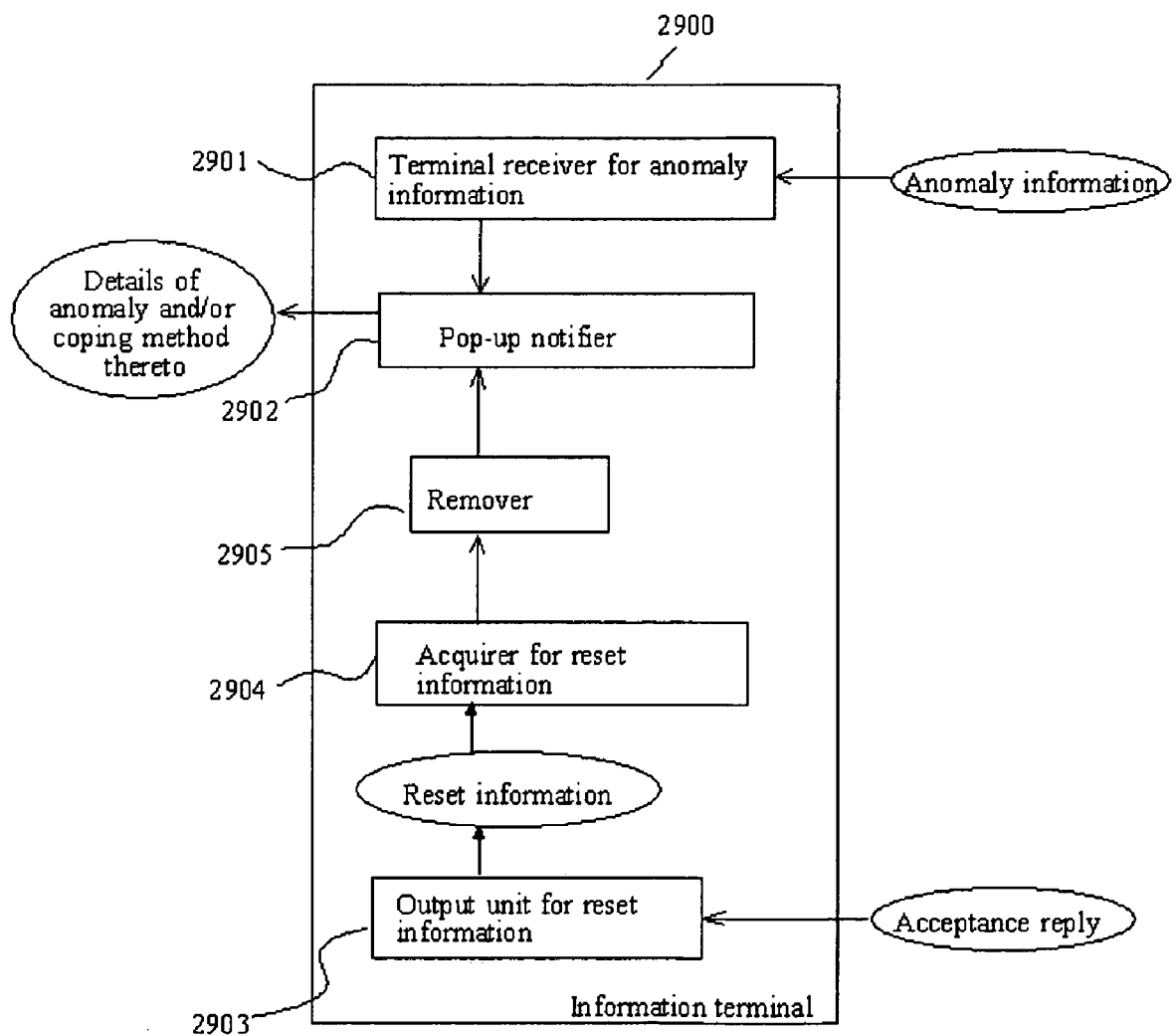
FIG. 29 is a functional block diagram of an information terminal of the fifth embodiment of the present invention.

FIG. 29 is a functional block diagram of the information terminal of the third embodiment of the present invention. The information terminal 2900 comprises the terminal receiver for anomaly information 2901, the pop-up notifier 2902, the output unit for reset information 2903, the acquirer for reset information 2904, and the remover 2905.

Since the terminal receiver for anomaly information 2901, and the pop-up notifier 2902 are the same as the terminal receiver for anomaly information 2001, and the pop-up notifier 2002, which have been described in the third embodiment, the description thereof will not be repeated.

Note that the server of the fifth embodiment is able to be constituted by any of hardware, program (software), or both the hardware and the program. Examples of elements for implementing a server, in case of utilizing a computer, the hardware comprising CPU, memory, bus, interface etc., and the program executable on the hardware. Moreover, such program may be stored in a medium.

The "output unit for reset information" 2903 outputs reset information if a time measured from reception of an acceptance reply as a trigger exceeds a predetermined period of time, wherein the acceptance reply is for a transmission of a recovery instruction to said apparatus, in which the recovery instruction instructs a recovery from the anomaly. Here, the "apparatus" corresponds to the apparatus, which has transmitted the anomaly information. Moreover, the "acceptance reply" corresponds to information, which indicates that the recovery instruction has been received by the apparatus. In cases where the communication with the apparatus is executed by utilizing, for example, TCP (Transmission Control Protocol), the acceptance reply corresponds to an "Ack" packet indicating that a packet for transmitting the recovery instruction is received by the apparatus. For example, the output unit for reset information 2903 activates a timer upon receiving the "Ack" packet, and determines whether or not a predetermined period of time is exceeded. If the predetermined period of time is exceeded, the reset information is outputted.

Note that the recovery instruction may be transmitted from the information terminal to the apparatus by operating the information terminal, may be outputted by an operating button on the apparatus, or may be transmitted from a server, which is able to operate the apparatus by remote-control. In cases where the recovery instruction is transmitted from the server, the recovery instruction may be directly transmitted from the server to the apparatus, or may be transmitted via the information terminal.

The "acquirer for reset information" 2904 acquires the reset information outputted from the output unit for reset information 2903. For example, in cases where the information terminal is mounted by a program, such as an object-oriented program, the reset information transmitted by message passing, etc., is acquired. Alternatively, the data indicating the reset information is assigned to the argument of the function corresponding to the acquirer for reset information 2904, and the function is called.

The "remover" 2905 removes the pop-up displayed by the pop-up notifier 2902 based on the reset information acquired by the acquirer for reset information 2904.

Note that the reset information, which has been outputted by the output unit for reset information 2903 and has been acquired by the acquirer for reset information 2904, may be once outputted to the exterior of the information terminal, and may be provided. For example, in order to notify that the apparatus has recovered, the reset information is transmitted to an external server (e.g., a server, which has transmitted the recovery instruction), and the server may reply the reset information.

Figure 30:
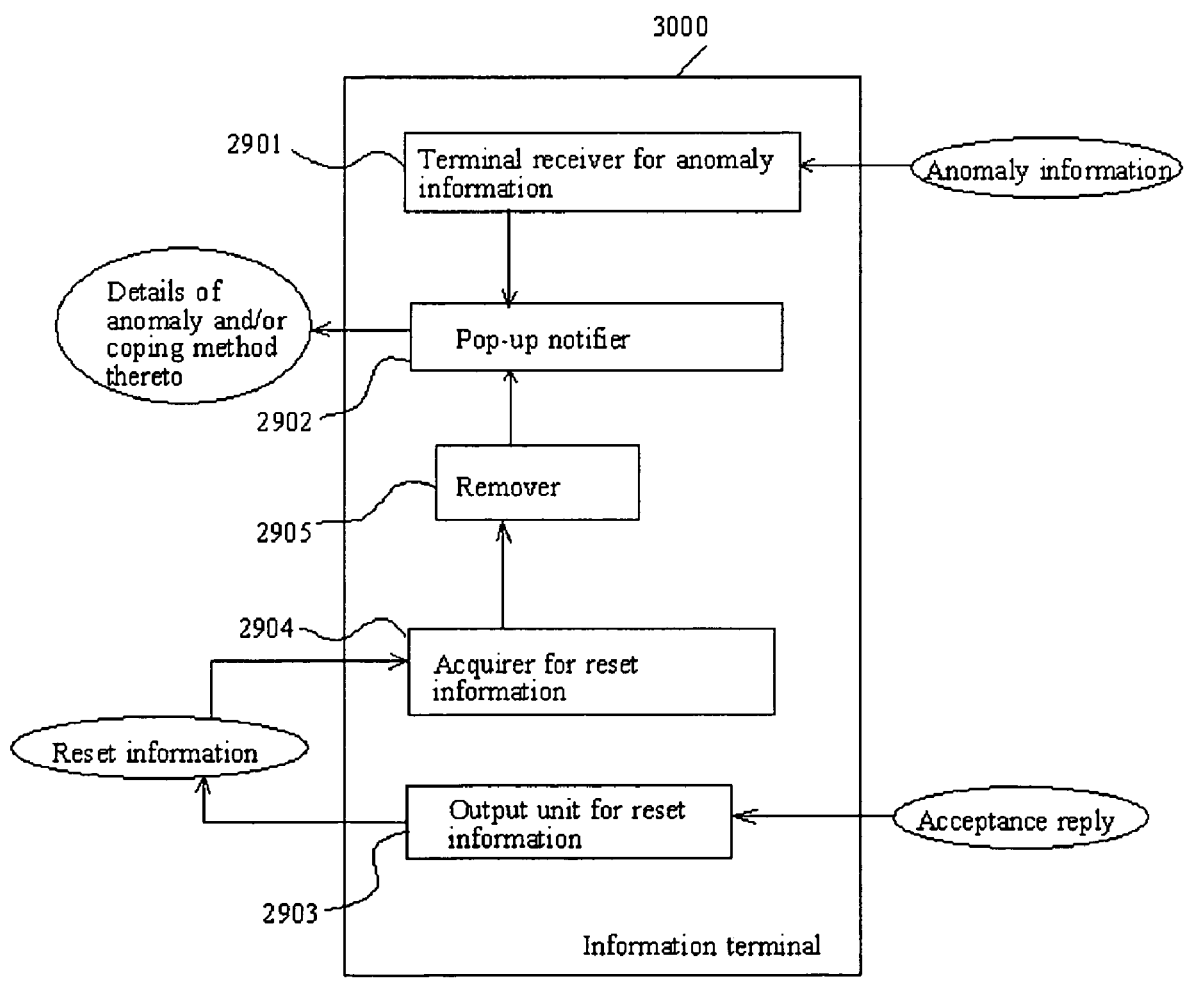
FIG. 30 is a functional block diagram of an information terminal of the fifth embodiment of the present invention.

FIG. 30 is a functional block diagram of an information terminal 3000 in cases where the reset information is once outputted to the exterior of the information terminal, and provided.

Figure 31:
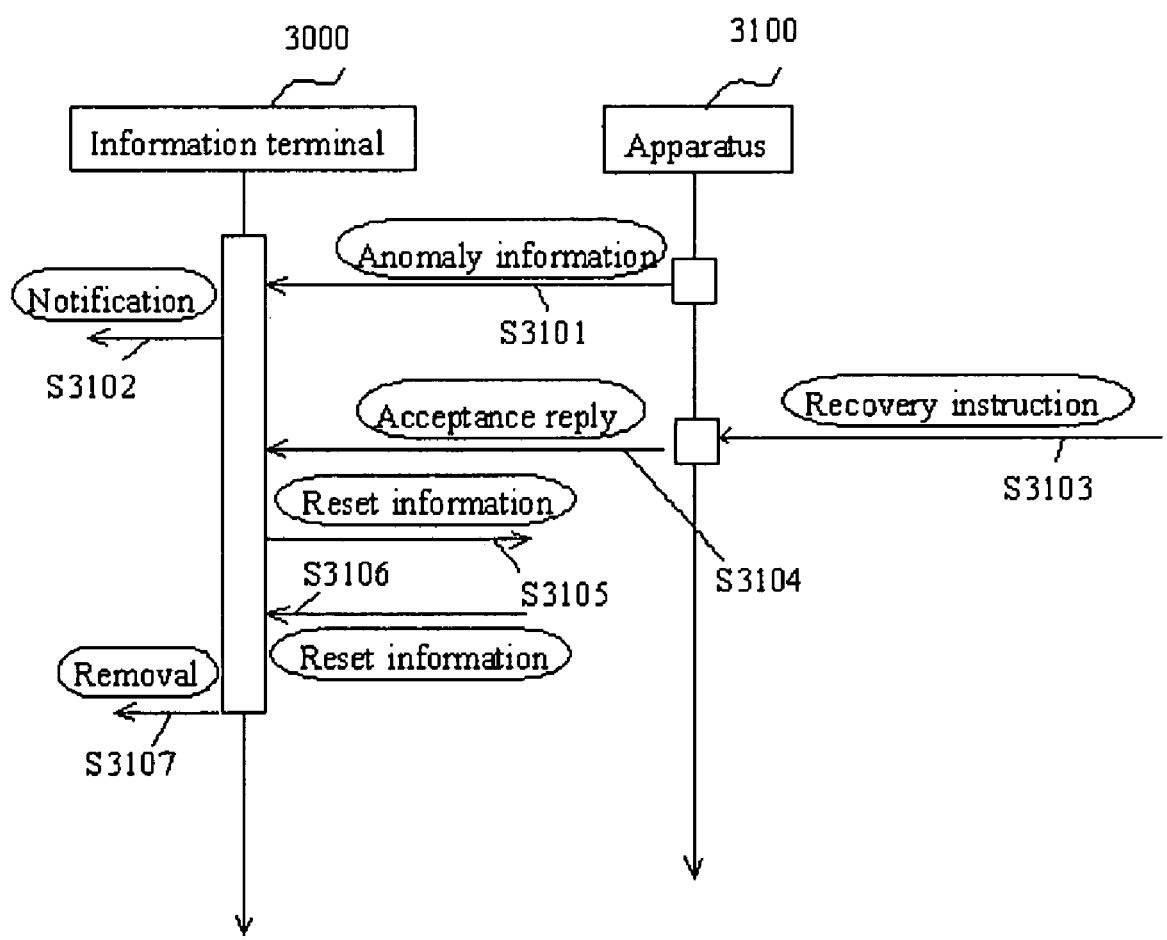
FIG. 31 is a sequential diagram of processing of the fifth embodiment of the present invention.

FIG. 31 is a sequential diagram explaining a scheme of processing of the fifth embodiment in cases where the reset information is once outputted to the exterior of the information terminal 3000, and provided. Step S3101 corresponds to step S2801, step S3102 corresponds to step S2802, step S3103 corresponds to step S2803, and step S3104 corresponds to step S2804. After execution of step S3104, if the predetermined period of time is exceeded, in step S3105, the reset information is outputted to the exterior of the information terminal 3000. In step S3106, the reset information is provided and in step S3107, the details of notification are removed.

Figure 32:
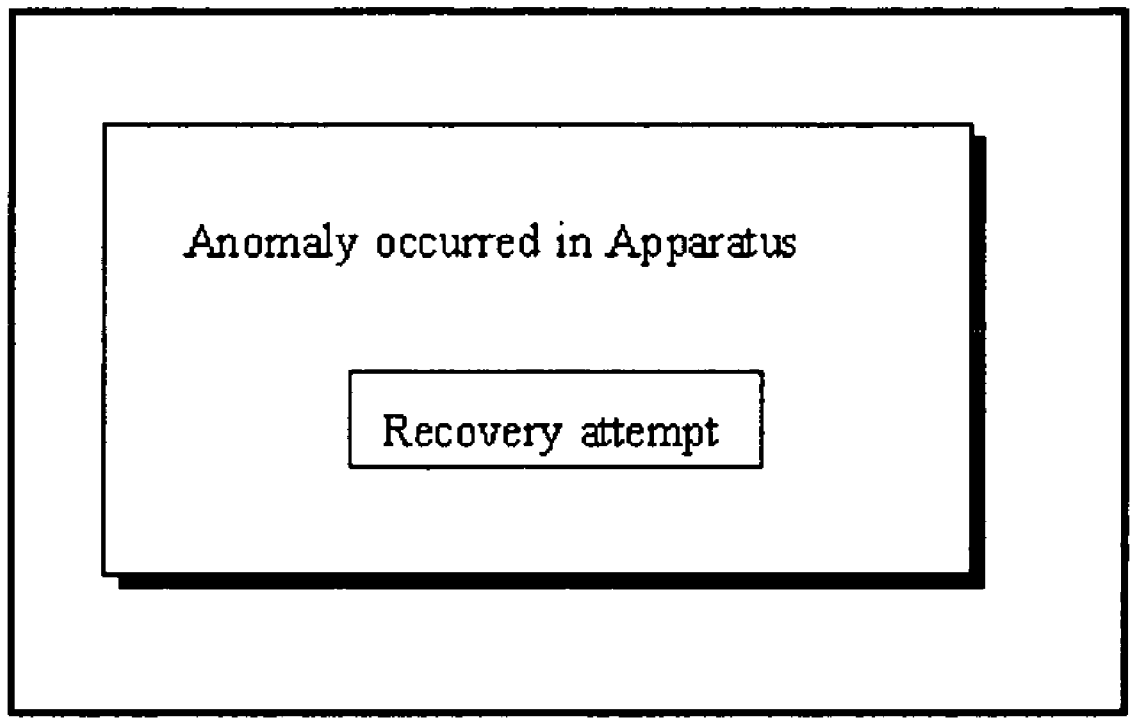
FIG. 32 is an illustration of a pop-up display.

FIG. 32 is an illustration of the pop-up by the pop-up notifier 2902. For example, if a button of "recovery attempt" is pressed, a recovery instruction is transmitted to the apparatus, and if the acceptance reply thereto is received, a timer, etc., is activated and measurement of predetermined period of time is started.

Figure 33:
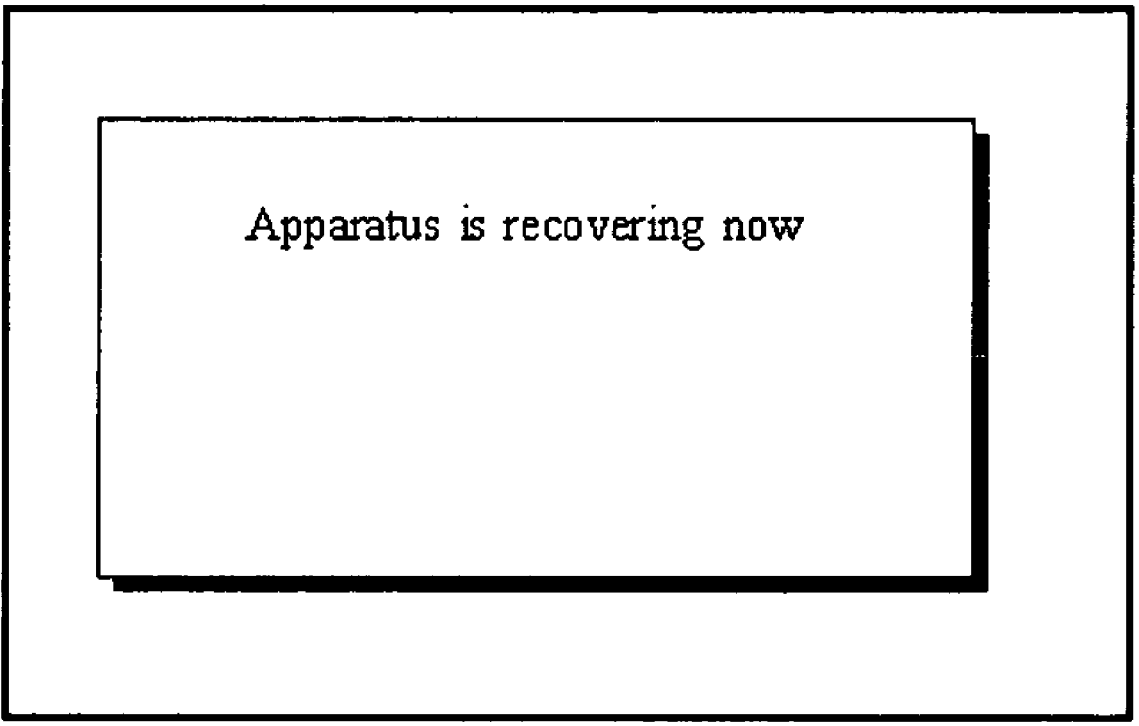
FIG. 33 is an illustration of a pop-up display, which has been changed.

FIG. 33 is an illustration of the display in case where the acceptance reply is received and the timer is activated.

Figure 34:
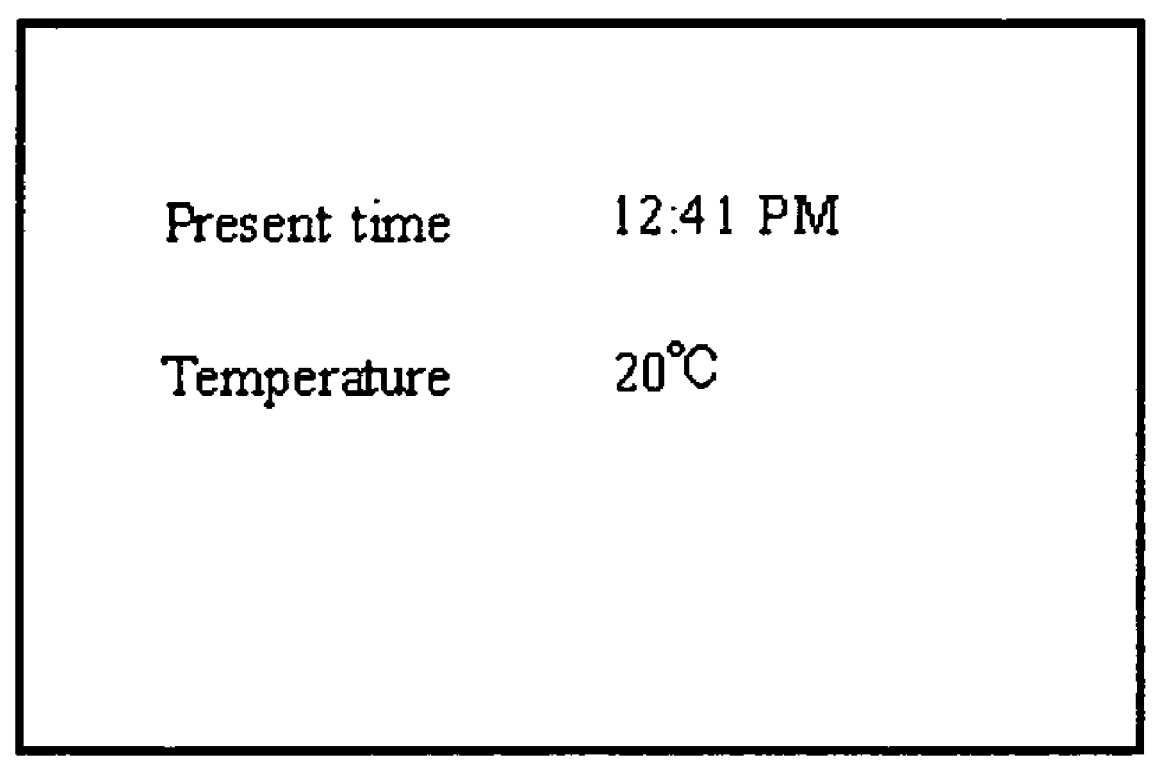

FIG. 34 is an illustration of the display in cases where the anomaly information is not received and predetermined period of time lapses. The window displayed in FIGS. 32 and 33 are removed, and the normal display, for example, current time and temperature are displayed. Note that there are various normal displays. For example, weather forecast, traffic situation, the latest news may be displayed (the same applies to other embodiments).

Figure 35:
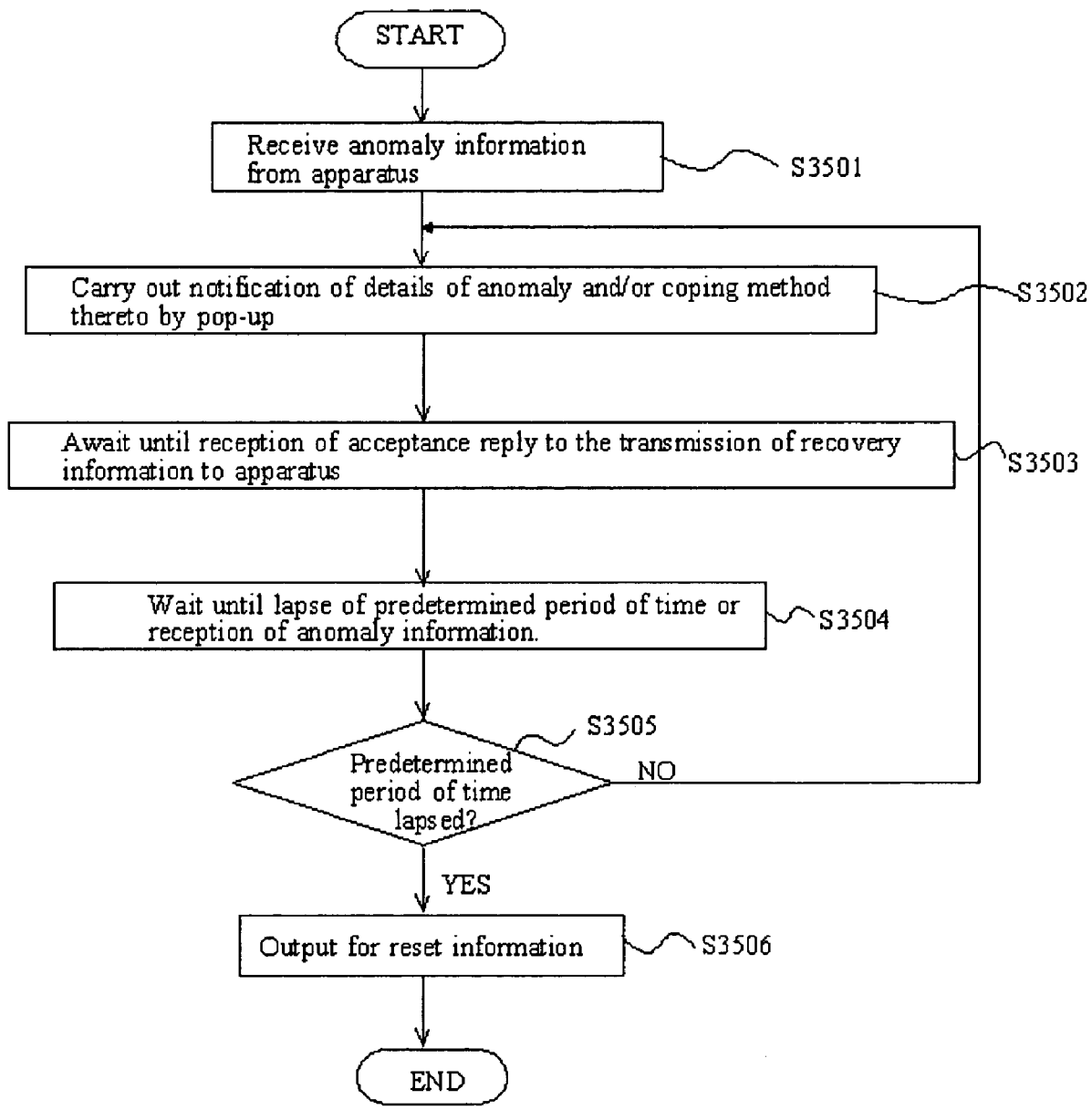
FIG. 35 is a flow chart of an information terminal of the fifth embodiment of the present invention.
Figure 36:
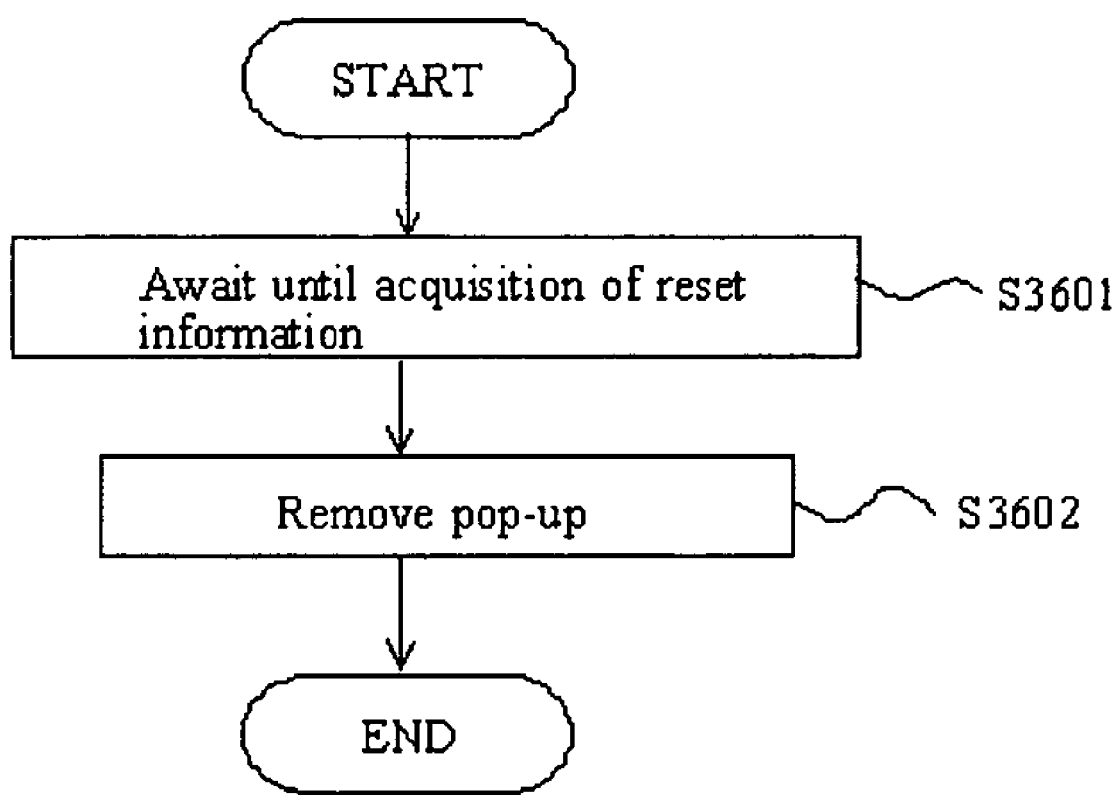
FIG. 36 is a flow chart of an information terminal of the fifth embodiment of the present invention.

FIGS. 35 and 36 are flow charts explaining processing of the information terminals of the fifth embodiment. The information terminal, for example, if the anomaly information becomes receivable, starts processing of FIG. 35, and if the reset information is outputted, starts processing of FIG. 36. Hence, in cases where the information terminal is implemented by the program, two processing, tasks, or sleds etc. for executing processing of FIGS. 35 and 36 may be generated. In step S3501, the anomaly information is received from the apparatus (the step of receiving anomaly information by terminal). In step S3502, the details of the anomaly and/or the coping method thereto is provided by displaying a pop-up (the pop-up notification step). In step S3503, the acceptance reply to the transmission of the recovery instruction to the apparatus is awaited. In step S3504, lapse of predetermined period of time or reception of other anomaly information is awaited. In step S3505, it is determined whether or not a predetermined period of time is exceeded. If not, the anomaly information is received, the control is returned to step S3502, or if so, the control is transfer to step S3506. In step S3506, the reset information is outputted (the step of outputting reset information). In step of S3601, reception of the reset information is awaited. If the reset information is transmitted and acquired (the step of acquiring reset information), in step of S3602, the pop-up is removed (the step of removing).

Note that the flow charts illustrated in FIGS. 35 and 36 can be regarded as a flow chart of a program (i.e., terminal processing program) for implementing the information terminal of the fifth embodiment by a computer. Moreover, the flow charts illustrated in FIGS. 35 and 36 may be regarded as a flow chart of a method (i.e., a method for carrying out notification of anomaly), which is used by the information processing terminal or the terminal processing program of the fifth embodiment.

According to the fifth embodiment, it is possible to apply the present invention to an apparatus, which does not provide notification of the recovery from the anomaly, by determining that the anomaly has been reset if the anomaly has not occurred during a predetermined period of time after acceptance of the recovery instructions by the apparatus; thereby easily showing the reset of the anomaly to the user.

As described hereinabove, in the fifth embodiment, the information terminal is mainly disclosed. Hence, the information terminal, which communicates with an apparatus of a home appliance or facility equipment and thereby carries out processing for anomaly information indicating an anomaly of said apparatus, wherein said information terminal comprises:

a terminal receiver for anomaly information, which receives the anomaly information from said apparatus, a pop-up notifier, which provides notification by displaying details of anomaly and/or coping method thereto on a pop-up on a display based on said anomaly information, an output unit for reset information, which outputs reset information if a time measured from a reception of an acceptance reply as a trigger exceeds a predetermined period of time, wherein the acceptance reply is for a transmission of a recovery instruction to said apparatus, in which the recovery instruction instructs a recovery from the anomaly, an acquirer for reset information, which acquires reset information outputted from said output unit for reset information, and a remover, which removes the pop-up displayed by said pop-up notifier based on the reset information acquired by said acquirer for reset information, is mainly disclosed.

Moreover, in the fifth embodiment, the method of carrying out notification of anomaly is mainly disclosed. Hence, the method of carrying out notification of anomaly, which comprises:

a step of receiving anomaly information, which receives anomaly information indicating an anomaly of an apparatus of a home appliance or facility equipment, a pop-up notification step, which displays a pop-up of details of the anomaly and/or a coping method thereto based on the anomaly information received by said of receiving anomaly information, a step of outputting reset information, which outputs reset information if a time measured from a reception of an acceptance reply as a trigger lapses a predetermined period of time, wherein the acceptance reply is for a transmission of a recovery instruction to said apparatus, in which the recovery instruction instructs a recovery from anomaly, a step of acquiring reset information, which acquires reset information outputted by said step of outputting reset information, and a step of removing, which removes the pop-up of said pop-up notification step based on the reset information acquired by said step of acquiring reset information, is mainly disclosed.

Furthermore, in the fifth embodiment, the terminal processing program is mainly disclosed. Hence, the terminal processing program executable by a computer, which communicates with an apparatus including a home appliance or facility equipment and thereby carries out processing for anomaly information indicating an anomaly of said apparatus, wherein said terminal processing program executes on a computer:

a step of receiving anomaly information by a terminal, which receives the anomaly information from said apparatus, a pop-up notification step, which provides notification by displaying details of the anomaly and/or a coping method thereto on a pop-up on a display based on said anomaly information, a step of transmitting recovery instruction, which transmits an instruction to recover from the anomaly to said apparatus, a step of outputting reset information, which outputs reset information if a time measured from a reception of an acceptance reply as a trigger exceeds a predetermined period of time, wherein the acceptance reply is for a transmission of a recovery instruction to said apparatus, in which the recovery instruction instructs a recovery from the anomaly, a step of acquiring reset information, which acquires reset information outputted from said step of outputting reset information, and a step of removing, which removes the pop-up displayed by said pop-up notification step based on the reset information acquired by said step of acquiring reset information, is mainly disclosed.

Note that, according to the fifth embodiment, as described in the third example, by utilizing a gas apparatus as the apparatus, it becomes possible to provide a system for carrying out notification of a gas anomaly, the apparatus for carrying out notification of a gas anomaly, and a method for carrying out notification of a gas anomaly, as follows.

Therefore, it becomes possible to provide:

a system for carrying out notification of a gas anomaly, which is a system comprising an information terminal, which communicates with a gas apparatus, manages and controls said gas apparatus, wherein said information terminal provides notification of an anomaly, which has occurred in the gas apparatus; wherein in cases where the anomaly occurs in the gas apparatus, and the anomaly information is provided to the information terminal, a display indicating said details of anomaly is displayed by pop-up, an operation for resetting anomaly of the gas apparatus, which has provided the notification of said anomaly, is executed by the information terminal, and if there is no re-notification of the anomaly during a predetermined period of time, said pop-up is removed.

In addition, it becomes possible to provide an apparatus for carrying out notification of a gas anomaly, which is an information terminal comprising:

a communicator, which communicates management information and control information with the gas apparatus, a processor for anomaly information, which receives the anomaly information about the gas apparatus and executes displaying a screen or removing a screen according to the details thereof, a display unit, which displays said anomaly information, and an operation unit for controlling the gas apparatus; wherein in cases where the anomaly occurs in the gas apparatus, and the anomaly is notified to the information terminal, the display indicating said details of anomaly is displayed on said display unit by pop-up, an operation for resetting anomaly to the gas apparatus, which has provided notification of said anomaly, is executed by the information terminal, and if there is no re-notification of the anomaly to the information terminal during a predetermined period of time, said pop-up is removed.

In addition, it becomes possible to provide a method for carrying out notification of anomaly comprising:

a step of transmitting anomaly information to an information terminal upon occurrence of an anomaly in a gas apparatus, a step of displaying a pop-up of details of the anomaly on a display unit of the information terminal upon receiving anomaly information, and a step of operating reset of the anomaly to the gas apparatus, which has provided notification of said anomaly by the information terminal, and a step of removing the details of said pop-up if there is no re-notification of the anomaly to the information terminal during a predetermined period of time.

For the above purpose, refer to the information terminal 2900 of the fifth embodiment, (a) in cases where the anomaly information is received, the pop-up notifier 2902 displays the details of the anomaly and/or the coping method thereto by pop-up, and (b) in cases where a time measured from a reception an acceptance reply as a trigger exceeds a predetermined period of time, the output unit for reset information 2903 outputs the reset information, and the remover 2905 removes the pop-up.

The Sixth Embodiment

The sixth embodiment of the present invention is almost same as the third embodiment. Note that processing after the reset information is acquired is different, and in the sixth embodiment, it is notified that the apparatus has recovered from the anomaly.

Figure 37:
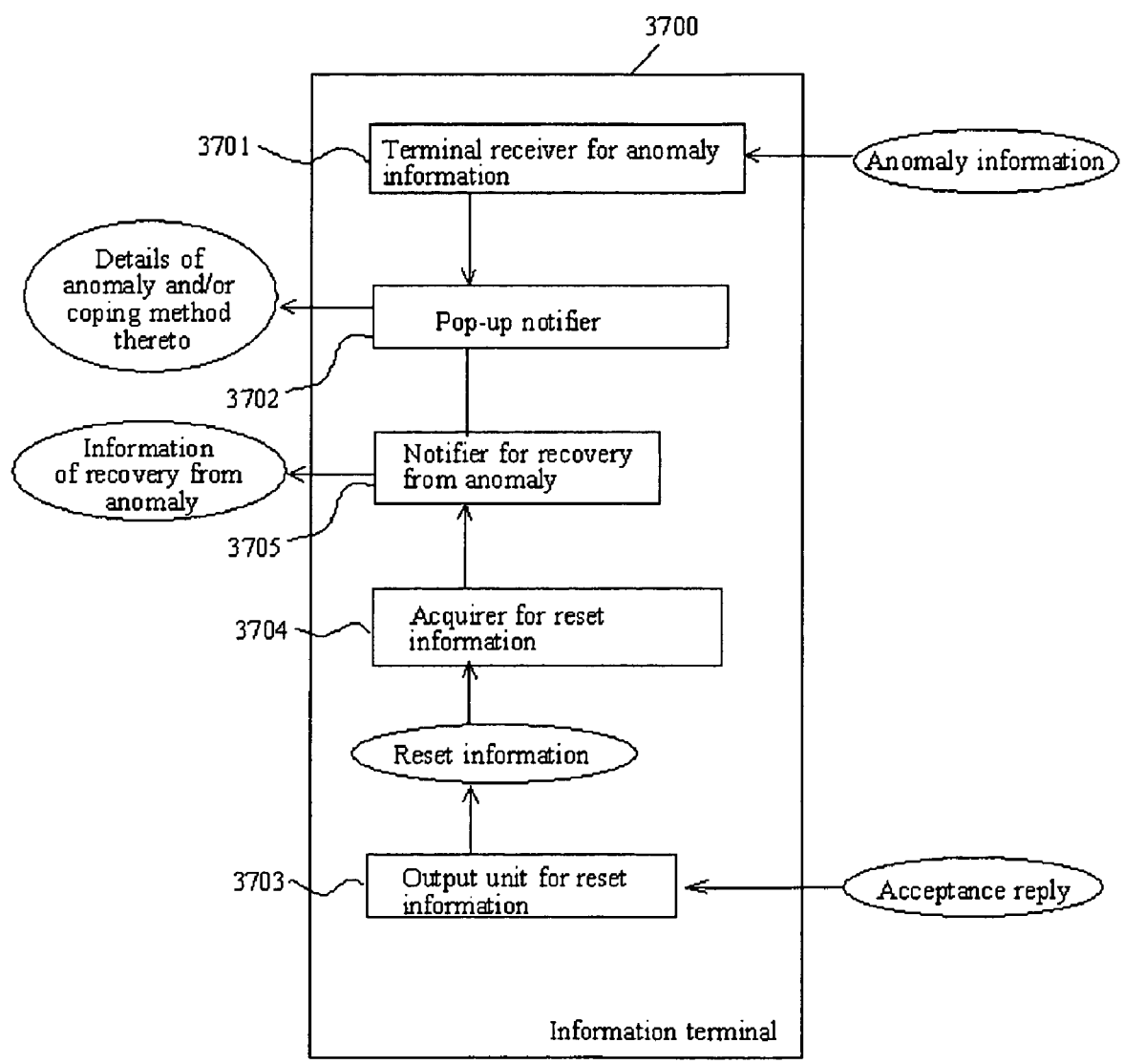
FIG. 37 is a functional block diagram of an information terminal of the sixth embodiment of the present invention.

FIG. 37 is a functional block diagram of an information terminal of the sixth embodiment. The information terminal 3700 comprises the terminal receiver for anomaly information 3701, the pop-up notifier 3702, the output unit for reset information 3703, the acquirer for reset information 3704, and the notifier for information of recovery from anomaly 3705.

Since the terminal receiver for anomaly information 3701, the pop-up notifier 3702, the output unit for reset information 3703, and the acquirer for reset information 3704, of the information terminal 3700 are the same as the terminal receiver for anomaly information 2901, the pop-up notifier 2902, the output unit for reset information 2903, and the acquirer for reset information 2904, of the fifth embodiment; the description thereof will not be repeated.

The "notifier for recovery from anomaly" 3705 provides notification of information of recovery from notification, which indicates that an apparatus has recovered from an anomaly, based on the reset information acquired by the acquirer for reset information 3704. Since the description about the acquirer for reset information 2504 of the fourth embodiment can be applied, the description thereof will not be repeated.

Figure 38:
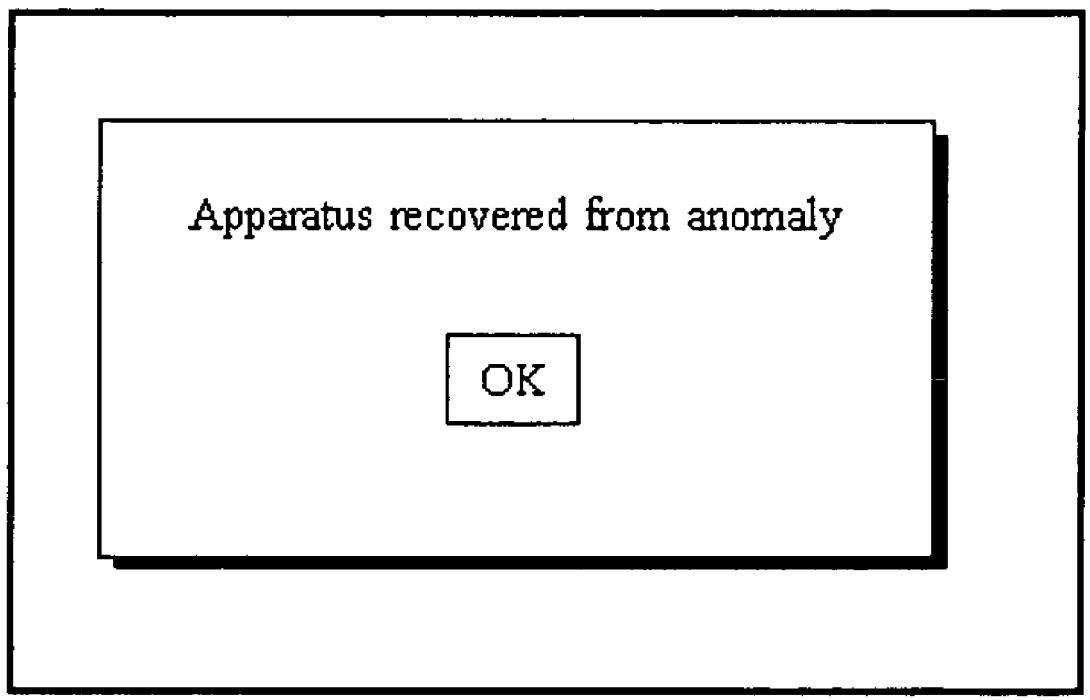
FIG. 38 is an illustration of a display of information of recovery from anomaly.

FIG. 38 is an illustration of the information of recovery from anomaly, which is provided by the notifier for information of recovery from anomaly 3705. By displaying "Apparatus has recovered from anomaly", the information of recovery from anomaly is displayed. After that, for example, by pressing the "OK" button, the display of the information of recovery from anomaly is removed, and display returns to normal.

Figure 39:
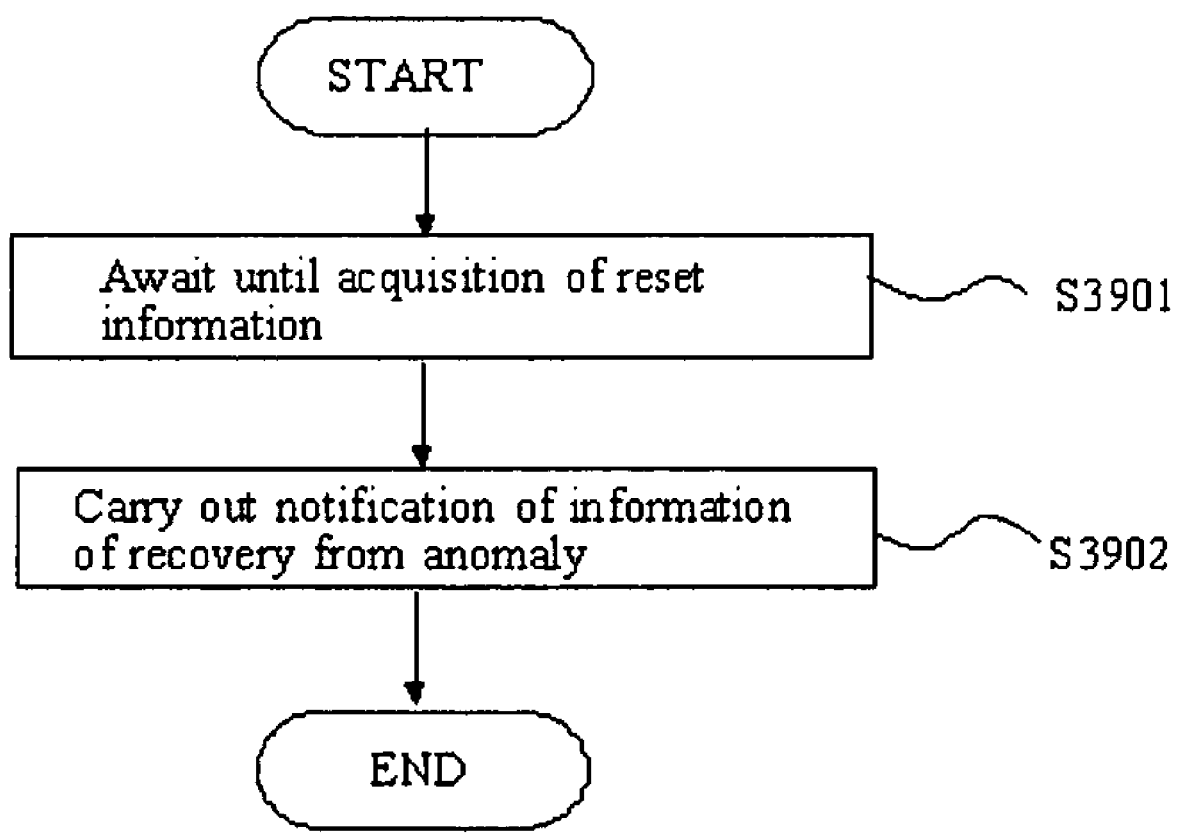
FIG. 39 is a flow chart of an information terminal of the sixth embodiment of the present invention.

FIGS. 35 and 39 are illustration explaining processing of the information terminal of the sixth embodiment. The processing of flow chart of FIG. 39 is executed in substitution for processing of FIG. 36. In step S3901, acquisition of the reset information is awaited. If the reset information is acquired (the step of acquiring reset information), in step S3902, the information of recovery from anomaly is provided (the step of carrying out notification information of recovery from anomaly).

Note that the flow chart illustrated in FIGS. 35 and 36 can be regarded as a flow chart of a program (i.e., terminal processing program) for implementing the information terminal of the fifth embodiment by a computer. Moreover, the flow chart illustrated in FIGS. 35 and 36 may be regarded as a flow chart of a method (i.e., a method for carrying out notification of anomaly), which is used by the information processing terminal or the terminal processing program of the fifth embodiment.

According to the sixth embodiment, it becomes possible to apply the present invention to an apparatus, which does not provide notification of the recovery from the anomaly, by determining that the anomaly has been reset if the anomaly has not occurred during a predetermined period of time after acceptance of the recovery instruction by the apparatus; thereby easily showing the recovery from the anomaly to the user and improving user-friendliness.

As described hereinabove, in the sixth embodiment, the information terminal is mainly disclosed. Hence, the information terminal, which communicates with an apparatus of a home appliance or facility equipment and thereby carries out processing for anomaly information indicating an anomaly of said apparatus, wherein said information terminal comprises:

a terminal receiver for anomaly information, which receives the anomaly information from said apparatus, a pop-up notifier, which provides notification by displaying details of the anomaly and/or a coping method thereto on a pop-up on a display based on said anomaly information, an output unit for reset information, which outputs reset information if a time measured from a reception of an acceptance reply as a trigger exceeds a predetermined period of time, wherein the acceptance reply is for a transmission of a recovery instruction to said apparatus, in which the recovery instruction instructs a recovery from the anomaly, an acquirer for reset information, which acquires reset information outputted from said output unit for reset information, and a notifier of recovery from the anomaly, which provides notification of information of recovery from anomaly indicating that said apparatus has recovered from the anomaly based on the reset information acquired by said acquirer for reset information, is mainly disclosed.

Moreover, in the sixth embodiment, the method for carrying out notification is mainly disclosed. Hence, the method of carrying out notification of anomaly, which comprises:

a step of receiving anomaly information, which receives anomaly information indicating an anomaly of an apparatus of a home appliance or facility equipment, a pop-up notification step, which displays a pop-up of details of anomaly and/or coping method thereto based on the anomaly information received by said step of receiving anomaly information, a step of outputting reset information, which outputs reset information if a time measured from a reception of an acceptance reply as a trigger lapses a predetermined period of time, wherein the acceptance reply is for a transmission of a recovery instruction to said apparatus, in which the recovery instruction instructs a recovery from the anomaly, a step of acquiring reset information, which acquires reset information outputted by said step of outputting reset information, and a step of carrying out notification of a recovery from anomaly, which provides notification of information indicating a recovery from the anomaly based on the reset information acquired by said step of acquiring reset information, is mainly disclosed.

Furthermore, in the sixth embodiment, the terminal processing program is mainly disclosed. Hence, the terminal processing program executable by a computer, which communicates with an apparatus of a home appliance or facility equipment and thereby carries out processing for anomaly information indicating an anomaly of said apparatus, wherein said terminal processing program executes on a computer:

a step of receiving anomaly information by terminal, which receives the anomaly information from said apparatus, a pop-up notification step, which provides notification by displaying details of anomaly and/or coping method thereto on a pop-up on a display based on said anomaly information, a step of transmitting recovery instruction, which transmits an instruction to recover from the anomaly to said apparatus, a step of outputting reset information, which outputs reset information if a time measured from a reception of an acceptance reply as a trigger exceeds a predetermined period of time, wherein the acceptance reply is for a transmission of a recovery instruction to said apparatus, in which the recovery instruction instructs a recovery from the anomaly, a step of acquiring reset information, which acquires reset information outputted by said step of outputting reset information, and a step of carrying out notification of recovery from anomaly, which provides notification of information of recovery from anomaly indicating that said apparatus has recovered from the anomaly based on the reset information acquired by said step of acquiring reset information, is mainly disclosed.

Note that, according to the sixth embodiment, as described in the third example, by utilizing the gas apparatus as an apparatus, it becomes possible to provide the system for carrying out notification of a gas anomaly, the apparatus for carrying out notification of a gas anomaly, and the method for carrying out notification of a gas anomaly, as follows.

Therefore, it becomes possible to provide:

the system for carrying out notification of a gas anomaly, which is a system comprising an information terminal, which communicates with a gas apparatus, manages and controls said gas apparatus, wherein said information terminal provides notification of the anomaly, which has occurred in the gas apparatus; wherein in cases where an anomaly occurs in the gas apparatus, and the anomaly information is provided to the information terminal, a display indicating said details of the anomaly is displayed by pop-up, an operation for resetting anomaly to the gas apparatus, which has provided notification of said anomaly, is executed by the information terminal, and if there is no re-notification of the anomaly during a predetermined period of time, the details of said pop-up are changed to a display indicating reset of the anomaly.

In addition, it becomes possible to provide an apparatus for carrying out notification of a gas anomaly, which is an information terminal comprising:

a communicator, which communicates management information and control information with the gas apparatus, a processor for anomaly information, which receives the anomaly information about the gas apparatus and executes displaying a screen or removing a screen according to the details thereof, a display unit, which displays said anomaly information, and an operation unit for control the gas apparatus; wherein in cases where the anomaly occurs in the gas apparatus, and is notified to the information terminal, the display indicating said details of the anomaly is displayed on said display unit by pop-up, an operation for resetting anomaly to the gas apparatus, which has provided notification of said anomaly, is executed by the information terminal, and if there is no re-notification of the anomaly to the information terminal during a predetermined period of time, the details of said pop-up are changed to a display indicating reset of the anomaly.

In addition, it becomes possible to provide a method for carrying out notification of an anomaly comprising:

a step of transmitting anomaly information to an information terminal upon occurrence of anomaly in a gas apparatus, a step of displaying pop-up of details of the anomaly on the display unit of the information terminal upon receiving anomaly information, and a step of operating reset of the anomaly to the gas apparatus, which has provided notification of said anomaly by the information terminal, and a step of changing the details of said pop-up to a display indicating reset of the anomaly if there is no re-notification of the anomaly to the information terminal during a predetermined period of time.

For the above purpose, refer to the information terminal 3700 of the sixth embodiment, (a) in cases where the anomaly information is received, the pop-up notifier 3702 displays the details of anomaly and/or the coping method thereto by pop-up, and (b) in cases where a time measured from a reception an acceptance reply as a trigger exceeds a predetermined period of time, the output unit for reset information 3703 outputs the reset information, and the notifier for recovery from anomaly 3705 provides notification of the information of recovery from the anomaly.

The Seventh Embodiment

The seventh embodiment of the present invention is any one of the third to sixth embodiment, wherein the recovery instruction is transmitted from the server, which is communicable with the information terminal, the recovery instruction is received by the information terminal, and the information terminal transmits the anomaly information to the apparatus, which has transmitted the anomaly information. Hence, in the seventh embodiment, it becomes possible to recover the apparatus by remote-control from the server via the information terminal.

Figure 40:
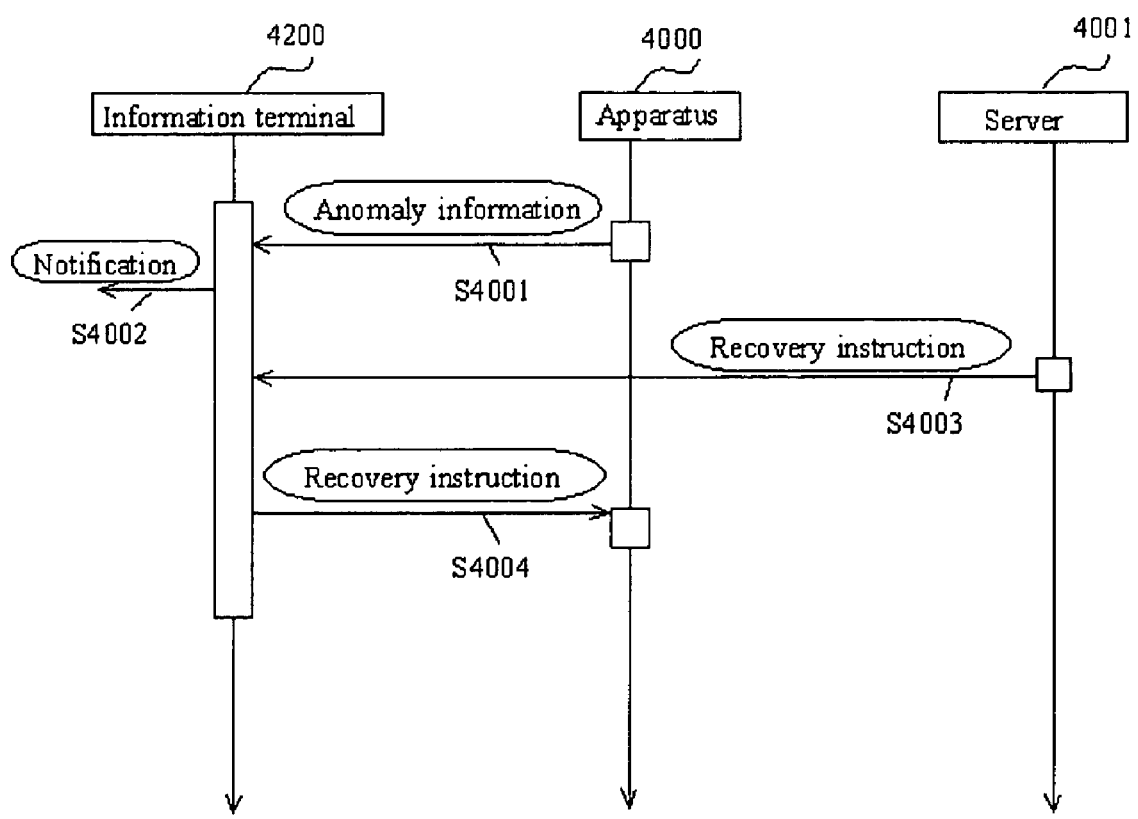
FIG. 40 is a sequential diagram of processing of the seventh embodiment of the present invention.

FIG. 40 is a sequential diagram of the seventh embodiment. If the anomaly information is transmitted by the apparatus 4000 and is received by the information terminal 4002 in step S4001, in step S4002, the notification of the details of the anomaly and/or the coping method thereto is executed. After that, the anomaly of the apparatus is detected by the server 4001 in any way (for example, the anomaly information may be transmitted to the server 4001 via the information terminal 4200.). In step S4003, the recovery instruction is transmitted from the server 4001 to the information terminal 4200. If the information terminal 4200 receives the recovery instruction, in step S4004, the recovery instruction is transmitted from the information terminal 4200 to the apparatus 4000. After that, the processing of respective embodiment is executed, and the apparatus 4000 transmits the reset information and determines whether or not the predetermined period of time is exceeded.

Note that the recovery instruction in step S4003 may be the same as that of in step S4004 or may be different. For example, the recovery instruction in step S4003 includes signature data, which indicates that the transmission is executed by the server 4001, and step S4004, may include signature data, which indicates that the transmission is executed by the information terminal 4200.

FIG. 41 is an illustration of a recovery instruction, which is transmitted from a server to an information terminal. The apparatus, to which the recovery instruction is to be transmitted, is specified by the manufacturer's name, the model number, and the serial number.

Figure 42:
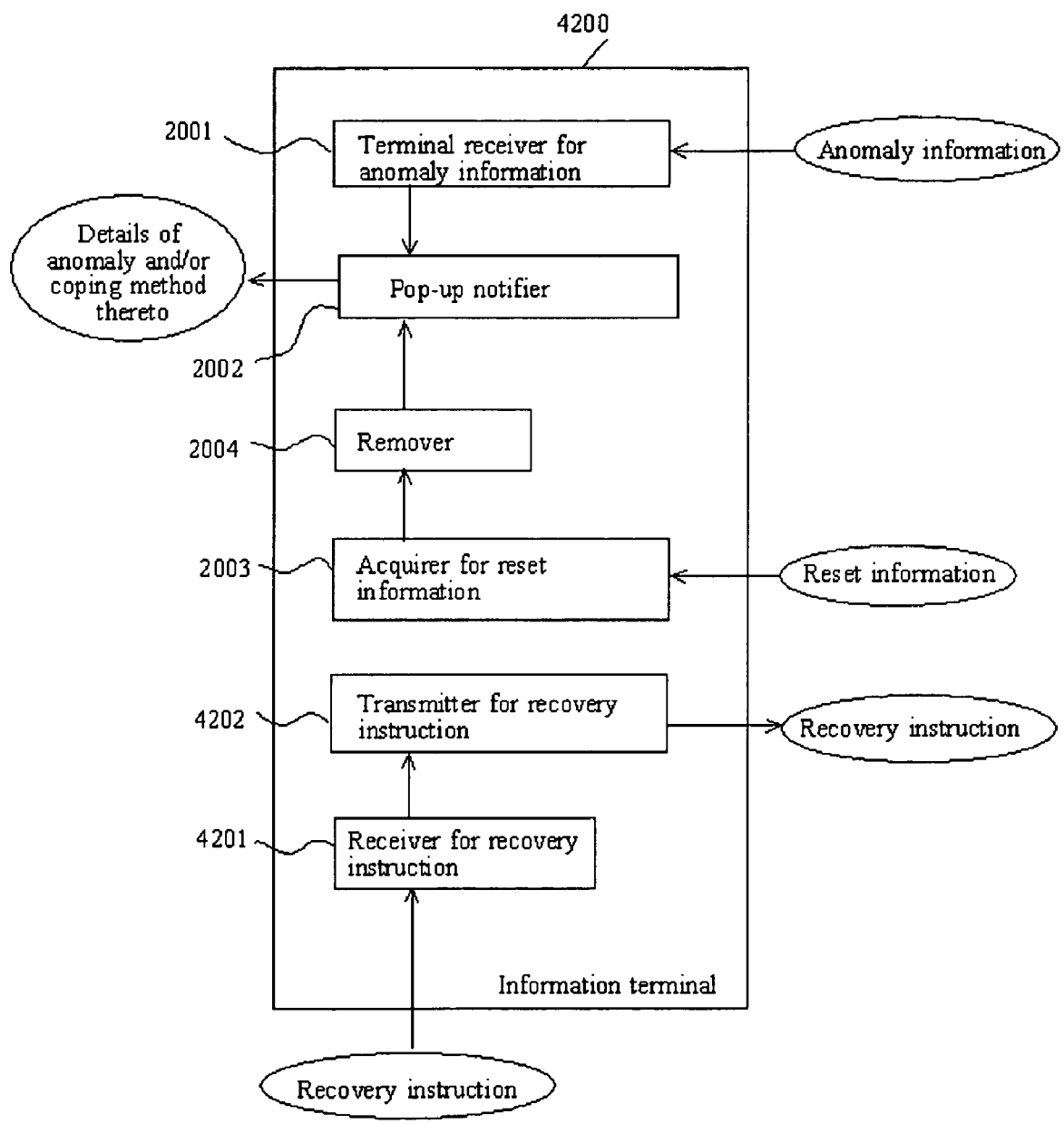
FIG. 42 is a functional block diagram of an information terminal of the seventh embodiment of the present invention.

FIG. 42 is a functional block diagram of the information terminal of the seventh embodiment. FIG. 42 shows the information terminal 4200, wherein the information terminal of the third embodiment comprises the receiver for recovery instruction 4201, and the transmitter for recovery instruction 4202. Similarly, in cases where the information terminal of the seventh embodiment is configured by the information terminal of the other embodiment, by comprising the receiver for recovery instruction 4201 and the transmitter for recovery instruction 4202, it becomes possible to configure.

The "the receiver for recovery instruction" 4201 receives the recovery instruction transmitted from the server, which is communicable with the information terminal.

The "the transmitter for recovery instruction" 4202 transmits the recovery instruction received by the receiver for recovery instruction to the apparatus. Here, the "apparatus" corresponds to the apparatus, which is specified by the recovery instruction received by the receiver for recovery instruction 4201. Alternatively, in cases where the recovery instruction received the receiver for recovery instruction 4201 does not specify the apparatus, the recovery instruction is transmitted to all of the apparatuses, which has transmitted the anomaly information, or to the apparatus in specific order, for example, in order of the apparatus, which has transmitted the anomaly information.

Figure 43:
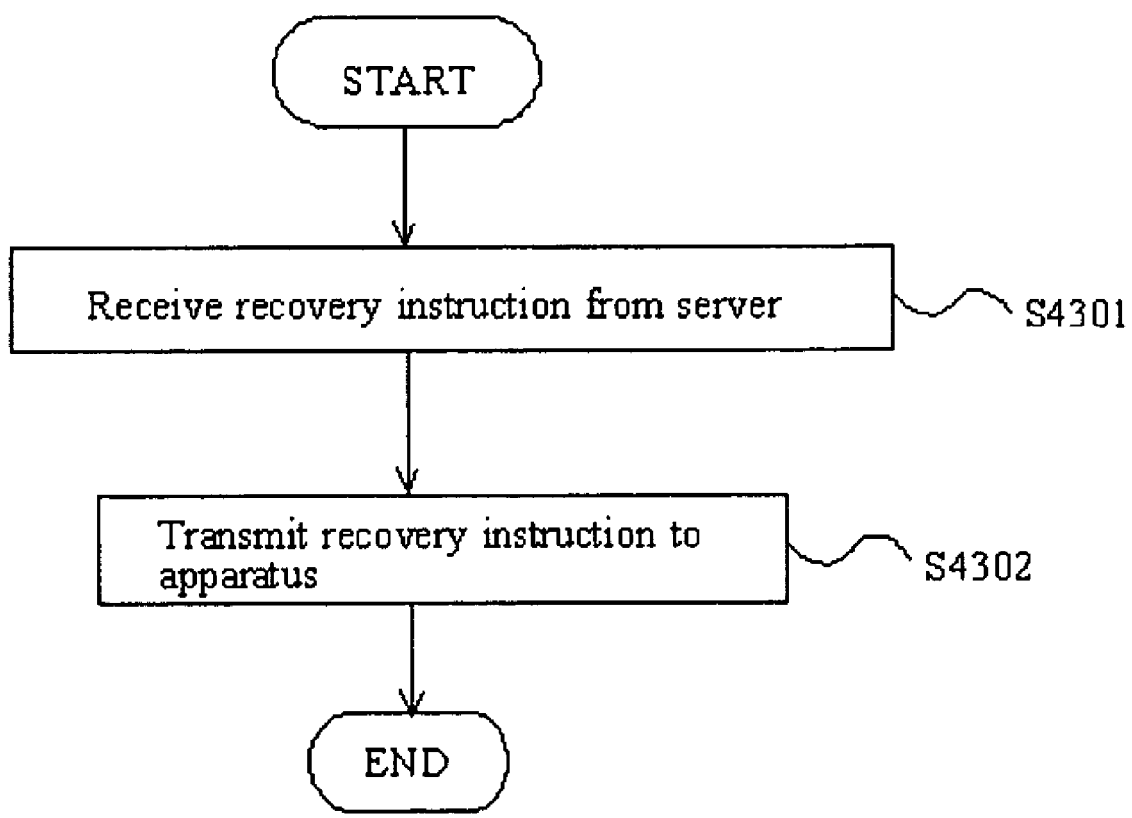
FIG. 43 is a flow chart of processing of an information terminal of the seventh embodiment of the present invention.

FIG. 43 is a flow chart explaining the processing, which is unique to the information terminal of the seventh embodiment, therefore, flow charts of processing of the receiver for recovery instruction 4201 and the transmitter for recovery instruction 4202. The information terminal executes the processing of FIG. 43 when the recovery instruction becomes receivable from the server. In step S4301, the recovery instruction is received from the server. In step S4302, the recovery instruction is transmitted to the apparatus.

Note that the flow chart illustrated in FIG. 43 can be regarded as a flow chart of a program (i.e. terminal processing program) for implementing the information terminal of the seventh embodiment by a computer. Moreover, the flow chart illustrated in FIG. 43 may be regarded as a flow chart of a method (i.e. a method for carrying out notification of anomaly), which is used by the information processing terminal or the terminal processing program of the seventh embodiment.

According to the seventh embodiment, it becomes possible to operate by remote-control from a server even if a user does not know how to cause an apparatus, in which the anomaly has occurred, to recover. Moreover, in cases where the apparatus has recovered from the anomaly, notification is provided, thereby improving user-friendliness.

As described hereinabove, in the seventh embodiment, the information terminal is mainly disclosed. Hence, the information terminal, which comprises:

a receiver for a recovery instruction, which receives a recovery instruction sent from a server capable of communication with an information terminal, and a transmitter for recovery instruction, which transmits to said apparatus the recovery instruction received by said receiver for recovery instruction, is mainly disclosed.

Note that, according to the seventh embodiment, as described in the third example, it becomes possible to provide, for example, the system for carrying out notification of a gas anomaly, the apparatus for carrying out notification of a gas anomaly, and the method for carrying out notification of a gas anomaly, as follows.

Therefore, it becomes possible to provide:

a system for carrying out notification of a gas anomaly, which is a system, in which an information terminal is connected to a server of a center for monitoring status of a gas apparatus; wherein the reset of anomaly of the gas apparatus is executed from the said server by communication via the information terminal, and if a reply to the reset of anomaly indicates a success thereof, the details of said pop-up is changed to the display indicating reset of the anomaly, or the display is removed.

In addition, it becomes possible to provide an apparatus for carrying out notification of a gas anomaly, which is an information terminal comprising a center communicator, which communicates with a server of center monitoring status of the gas apparatus;

causing a processor for anomaly information of said information terminal to execute processing for resetting the anomaly of the gas apparatus by a communication from the server, and if the reply to said reset of anomaly, which indicates the success thereof, is received, the details of said pop-up is changed to the display indicating reset of the anomaly, or the display is removed.

In addition, it becomes possible to provide a method for carrying out notification of a gas anomaly of the system, in which an information terminal is connected to a server of a center for monitoring status of a gas apparatus; comprising:

a step of executing reset of the anomaly of the gas apparatus by communication via the information terminal, and a step of changing the display of details of said pop-up to display indicating reset of the anomaly, or of removing, if a reply to reset of anomaly indicates success thereof.

For the above purpose, as shown in the sequential diagram of FIG. 40, if the server transmits the recovery instruction, the recovery instruction is transmitted to the apparatus via the information terminal, and after that, if the apparatus recovers from the anomaly, the remover removes the pop-up, or the notifier for recovery from anomaly provides notification of the information of recovery from the anomaly.

The Eighth Embodiment

As the eighth embodiment of the present invention, an information terminal, wherein reset information is acquired via a server, which is communicable with an information terminal, will be described.

Therefore, in any one of the third embodiment to sixth embodiment, the acquirer for reset information acquires the reset information via the server, which is communicable with the information terminal.

In the third or fourth embodiment, for example, the server and the apparatus communicate with each other (may communicate via the information terminal), and if the server determines that the apparatus has recovered from the anomaly by the operation from the server, the server transmits the reset information to the information terminal.

In the fifth or sixth embodiment, the reset information, which is outputted from the output unit for reset information, is transmitted to the server, and the server replies the received reset information.

According to the eighth embodiment, the server manages the apparatus and can determine the recovery from the anomaly (in case of being mainly based on the third or fourth embodiment). Moreover, it becomes possible to execute recording by the server whether or not the apparatus has recovered from the anomaly (in case of being mainly based on the fifth or sixth embodiment).

As described hereinabove, in the eighth embodiment, the information terminal is mainly disclosed. Hence, the information terminal, wherein said acquirer for reset information acquires reset information via a server capable of communication with the information terminal, is mainly disclosed.

Note that, according to the eighth embodiment, as described in the third example, it becomes possible to provide, for example, the system for carrying out notification of a gas anomaly, the apparatus for carrying out notification of a gas anomaly, and the method for carrying out notification of a gas anomaly, as follows.

Therefore, it becomes possible to provide:

the system for carrying out notification of a gas anomaly, in which an information terminal is connected to a server of a center for monitoring status of a gas apparatus in order to reset only a display of the anomaly from a server of a center, wherein if the anomaly information, which has occurred in the gas apparatus, is displayed in the information terminal, the display of details of said pop-up is changed to the display indicating reset of the anomaly, or the display is removed by the operation for resetting the display of the anomaly from the server.

In addition, it becomes possible to provide an apparatus for carrying out notification of a gas anomaly, which is an information terminal comprising a center communicator, which communicates with a server of center monitoring status of the gas apparatus, changing the display of details of said pop-up to display indicating reset of the anomaly, or of removing, if a reply to reset of the anomaly indicates the success thereof, in cases where the anomaly information, which has occurred in the gas apparatus, is displayed on the display unit of the information terminal, if the processor for anomaly information receives the information on resetting display of anomaly from the server.

In addition, it becomes possible to provide the method for carrying out notification of a gas anomaly of the system, in which an information terminal is connected to a server of a center for monitoring status of a gas apparatus, comprising:

a step of changing the display of details of said pop-up to the display indicating reset of the anomaly, or of removing by the operation for resetting the display of the anomaly from the server, if the anomaly information, which has occurred in the gas apparatus, is displayed in the information terminal.

The Ninth Embodiment

As the ninth embodiment of the present invention, the information terminal, which records the anomaly information, will be described.

Therefore, in any one of the fifth to eighth embodiment, the information terminal comprises a recorder.

The "recorder" records the anomaly information to a distinct area based on the priority indicated by the priority information, which is correlated with the anomaly information received by the terminal receiver for anomaly information, wherein the anomaly information is correlated with the priority information indicating priority of the anomaly.

Examples of the levels of the "priority" include (a) fatal anomaly, (b) anomaly needing attention, and (c) ignorable anomaly. The priority information may be included in the anomaly information. Moreover, the priority is determined based on the information stored in the information terminal, wherein the information indicates a result of correlation of the anomaly and the priority information. Alternatively, as in the first embodiment, the anomaly information may be transmitted to the server and the priority may be acquired. Moreover, according to the priority, the size of the storage area, in which the anomaly information is stored, may be changed. Furthermore, in cases where the whole storage area of respective priority is used, processing thereof may be changed according to the priority. For example, anomaly information of low-priority may be deleted in order of oldness, and the storage area thereof may be assigned to anomaly information of high-priority.

In addition, another example of the levels the priority include (a) the stored anomaly information may be deleted in any or specific timing, and (b) the stored anomaly should not be deleted until a predetermined condition is established. For example, the anomaly information indicating an operation history of a user for the apparatus or the information terminal, and the anomaly information caused by a simple mistake of operation by the user, etc., possess low-priority, and can be deleted in any or specific timing. Meanwhile, the anomaly information indicating a fatal error or unacceptable error should not be deleted until a predetermined condition is established. Accordingly, the anomaly information, which can be deleted in any or specific timing, is stored in volatile memory in the information terminal, and the anomaly information, which should not be deleted until the predetermined condition is established, is stored in non-volatile storage area, for example, a transportable memory card. By separating the storage area according to the priority as the above, it becomes possible to analyze the fatal error or the unacceptable error.

Figure 44:
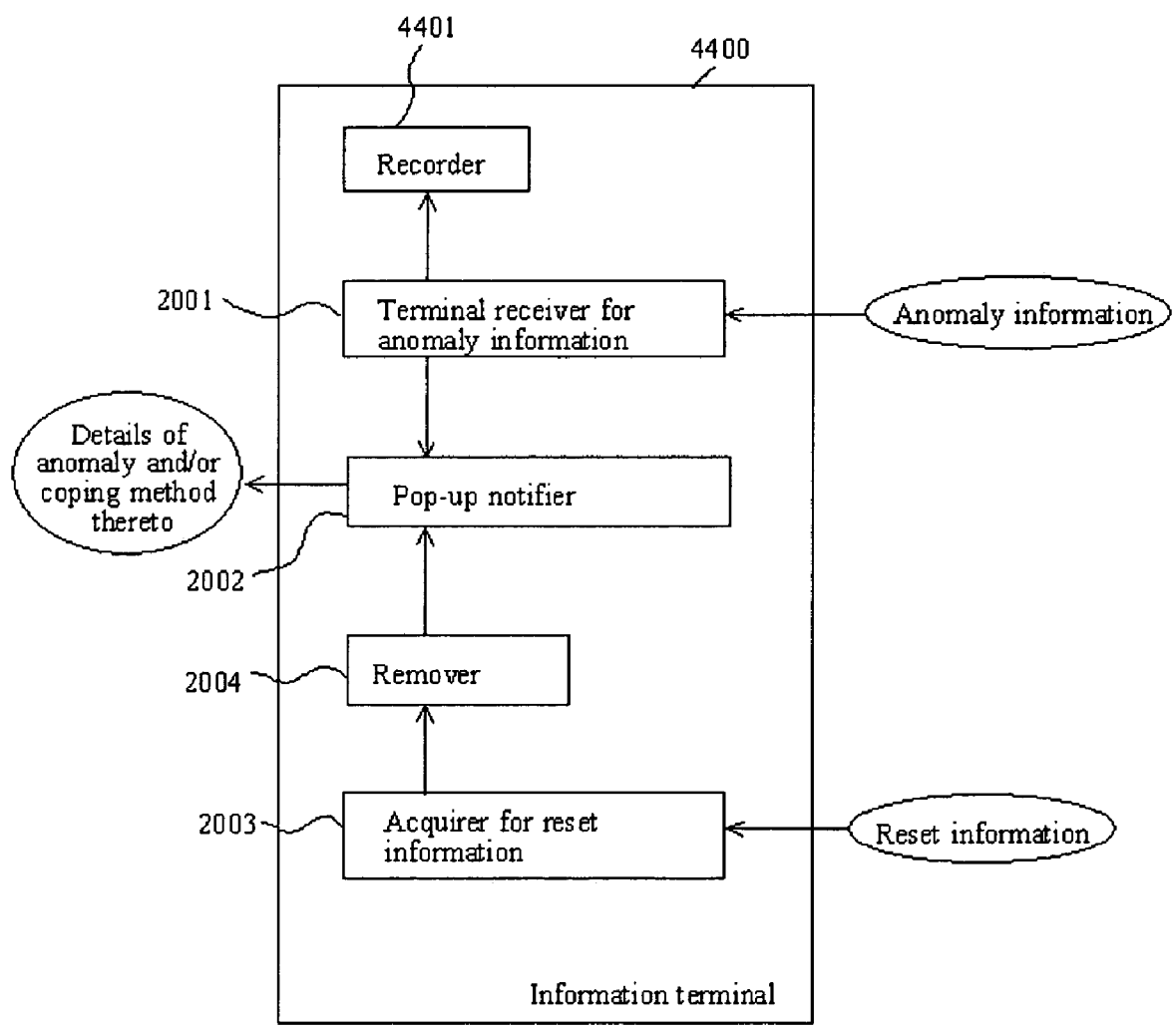
FIG. 44 is a functional block diagram of an information terminal of the ninth embodiment of the present invention.

FIG. 44 is a functional block diagram of the information terminal of the ninth embodiment. FIG. 44 is an illustration of the information terminal 4401, wherein the information terminal of the third embodiment comprises the recorder 4401. Similarly, by comprising the recorder 4401, it becomes possible to configure the information terminal of the ninth embodiment by the information terminal of the other embodiment.

According to the ninth embodiment, since the anomaly information is stored with respect to each priority, it enables easy analysis or prediction of failure of the apparatus. Moreover, by storing the anomaly information of specific priority to the transportable memory device, it becomes possible to bring the memory device storing the anomaly information to a service center, where maintenance of the apparatus is done, and to provide various services. For example, it becomes possible to analyze the anomaly information, to estimate user's usage, and to suggest profitable usage for the user, or to recommend the user to buy another apparatus.

As described hereinabove, in the ninth embodiment, the information terminal is mainly disclosed. Hence, the information terminal, wherein priority information indicating a priority of an anomaly is correlated to anomaly information, comprising:

a recorder, which records said anomaly information on a different area based on the priority indicated by the priority information correlated to the anomaly information received by said terminal receiver for anomaly information, is mainly disclosed.

Therefore, it becomes possible to provide:

the system for carrying out notification of an anomaly, which is the system comprising an information terminal, which communicates with a home appliance or equipment, manages and controls said apparatus, wherein said information terminal provides notification of the anomaly, which has occurred in said home appliance or equipment; wherein in cases where the anomaly occurs in the home appliance or equipment, and the anomaly is notified to the information terminal, the anomaly history information is managed and stored by separating with respect to each priority of said anomaly information.

In addition, it becomes possible to provide the apparatus for carrying out notification of an anomaly comprising:

a recorder for information, which records anomaly information, which has occurred in said apparatus, and a processor for anomaly information, which determines and processes priority of details of the anomaly upon receiving the anomaly; wherein the anomaly history information is managed and stored to the storage unit for information by separating storage areas with respect to each priority of said anomaly information.

THE FIRST EXAMPLE

The example of the present invention will be described. The details disclosed by the first example are as follows.

The first aspect of the first example will explain usage of a method for carrying out notification of an anomaly by a system comprising an information terminal, which communicates with a home appliance or equipment, manages and controls said apparatus, wherein said information terminal communicates with a server via a communication network and provides notification of anomaly information about the home appliance or equipment, and the method for carrying out notification of an anomaly comprising:

a step of carrying out notification the anomaly information to the server via the information terminal in cases where the anomaly occurs in the home appliance or equipment, a step of transmitting the details of the anomaly and the coping method thereto from the server to the information terminal by the anomaly number incidental to said anomaly information, and a step of displaying said transmitted the details of the anomaly and the coping method thereto on the display unit of the information terminal. According to this method for carrying out notification of an anomaly, a server judges anomaly information occurring in an apparatus, including network-connected appliances and network equipment, and transmits the details of the anomaly and a coping method thereto, so that it becomes possible to provide a detailed coping method corresponding to many appliances etc., and to modify assignment of the anomaly information or coping method just by changing memory details of the server. Note that this method for carrying out notification of an anomaly corresponds to the operation method of an entire system of processing an anomaly of the first embodiment as described hereinabove.

The second aspect of the first example will explain usage of the method for carrying out notification of an anomaly as described in the first aspect, wherein the server, which has received the anomaly information, comprises:

a step of determining and processing details of an anomaly by anomaly number, and a step of transmitting details of the anomaly and a coping method thereto, which are displayed in an information terminal, or not displaying information in case of non-display, depending on a result of determination. According to this system for carrying out notification of anomaly, by determining and processing the anomaly information by the server, it becomes possible to switch display or non-display of the anomaly information by the information terminal, thereby improving functionality of service. In addition, it becomes possible to store the anomaly information of various details. Note that this method for carrying out notification of an anomaly corresponds to the operation method of the server of the second embodiment as described above.

The third aspect of the first example will explain the system for carrying out notification of an anomaly, which is a system comprising an information terminal, which communicates with a home appliance or equipment, manages and controls said apparatus, in which said information terminal communicates with a server via communication network and provides notification of anomaly information about the home appliance or equipment; wherein in cases where an anomaly occurs in the home appliance or equipment, the anomaly information is provided to the server via the information terminal, the server transmits the details of the anomaly and the coping method thereto to the information terminal by referring to the anomaly number incidental to said anomaly information, and the details of the anomaly and the coping method thereto are displayed on the display unit of the information terminal. According to this system for carrying out notification of anomaly, a server determines the details of the anomaly information and transmits the coping method thereto to the information terminal, so that it becomes possible to provide a detailed coping method corresponding to many appliances, etc., thereby improving user-friendliness; and it becomes possible to modify assignment of the anomaly information or coping method just by changing the server. Note that this system for carrying out notification of an anomaly corresponds to the system of processing anomaly of the first embodiment as described above.

The fourth aspect of the first example will explain the system for carrying out notification of an anomaly as described in the third aspect, wherein the server, which has received the anomaly information, determines and processes details of the anomaly by anomaly number, and transmits details of the anomaly and coping method thereto, which are displayed in an information terminal, or in case of non-display, transmits non-display information. According to the above system for carrying out notification, by determining on the notification of the anomaly by the server, it becomes possible to switch display or non-display of the anomaly information in the information terminal, thereby improving functionality of service. Moreover, the anomaly information of various details can be stored on the server side, thereby being utilized for product development by a manufacturer. Note that this system for carrying out notification of an anomaly corresponds to the system for processing an anomaly comprising the server of the second embodiment as described above.

The fifth aspect of the first example will explain the apparatus for carrying out notification of an anomaly, which is an apparatus comprising an information terminal, which communicates with a home appliance or equipment, manages and controls said apparatus, in which said information terminal communicates with a server via a communication network and provides notification of anomaly information about the home appliance or equipment; wherein in cases where the anomaly occurs in the home appliance or equipment, the anomaly information is provided to the server via the information terminal, the server transmits the details of the anomaly and a coping method thereto by the anomaly number incidental to said anomaly information, and the received details of the anomaly and coping method thereto are displayed on the display unit of the information terminal. According to this apparatus for carrying out notification of an anomaly, a server determines the details of anomaly information and transmits the coping method thereto to the information terminal, so that it becomes possible to provide a detailed coping method corresponding to many appliances etc., thereby improving user-friendliness; and it becomes possible to modify assignment of anomaly information or coping method just by changing the server. Note that this operation of the apparatus for carrying out notification of anomaly corresponds to the operation of the system for processing anomaly utilizing the information terminal of the first embodiment as described above.

The sixth aspect of the first example will explain the apparatus for carrying out notification of an anomaly as described in the fifth aspect, wherein the server, which has received the anomaly information, determines and processes details of anomaly by anomaly number, and transmits details of the anomaly and a coping method thereto, which are displayed in an information terminal, or in case of non-display, transmits non-display information, and the information terminal displays the anomaly information according to the received information. According to this apparatus for carrying out notification, the server determines the anomaly information, so that it becomes possible to switch display or non-display of the anomaly information in the information terminal, thereby improving functionality of service. Moreover, the anomaly information of various details can be compiled on the server side, thereby being utilized for product development by a manufacturer. Note that the operation of the apparatus for carrying out notification of the anomaly corresponds to the operation of the apparatus for processing the anomaly comprising the server of the second embodiment as described above.

Figure 45:
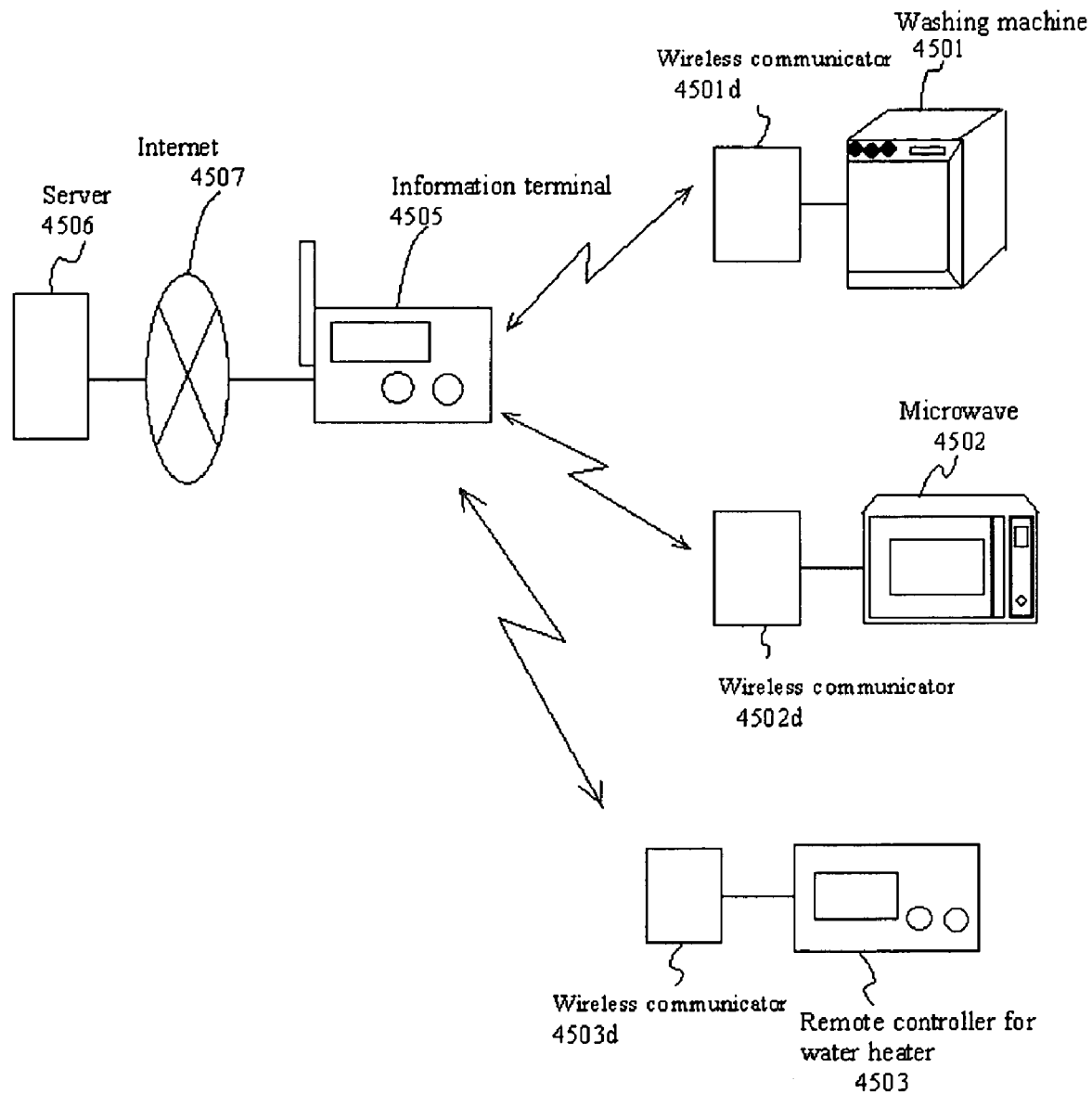
FIG. 45 is a block diagram of network system using a method for notification of anomaly, a system for carrying out notification of anomaly, and an apparatus for carrying out notification of anomaly of the example of the present invention.

FIG. 45 shows the network system for displaying or controlling the home appliance or equipment, which comprises the information terminal in the example of the present invention.

In FIG. 45, the washing machine 4501, the microwave 4502, the remote controller of the water heater 4503 are network-connected home appliances that comprise the function of network connection, are respectively connected to the wireless communicator 4501*d*, 4502*d*, and 4503*d*, and can communicate with the information terminal 4505 by wireless communication. The wireless communicators 4501*d*, 4502*d*, and 4503 are constructed by communication medium such as wireless LAN, Bluetooth®, or specified low power wireless communication.

Here, the concept of the network-connected home appliances corresponds to home appliances and equipment, which possess the function of connecting to various networks including the Internet, and are installed and used at home. Examples thereof may include a refrigerator, an air conditioner, a water heater, a system utilizing hot water, a dryer, a dish washer/dryer, a cleaner, a hot plate, an IH apparatus, a rice cooker, a toilet seat with warm-water bidet, an electronic lock, various security sensors (a human sensor and an anti-crime sensor), a home server, a television, video equipment, a DVD apparatus, a personal computer, an information terminal such as a PDA, a mobile phone, a FAX (Facsimile), a telephone, an audio apparatus and a remote-controller thereof, in addition to a washing machine 4501, a microwave 4502, and a remote-controller of water heater 4503 as illustrated. Moreover, an electric meter, a water meter, and a gas meter may be included. It becomes possible to display energy consumption and fee thereof on the information terminal 4505 by connecting with said meter apparatuses.

By providing the network communication function to the above network-connected home appliances, it becomes possible to display control state or maintenance information of the network-connected home appliance by communication method, and to automatically control the network-connected home appliance by the information terminal 4505. Moreover, it becomes possible to download new software from the server 4506, which manages the network-connected home appliance, to the network-connected home appliance, to download recipe information to the microwave 4502, or to download a washing program to the washing machine 4501. Furthermore, by utilizing a mobile phone, PDA, or personal computer from outside, the network-connected home appliance can be controlled via the Internet 4507 or the information terminal 4505.

Figure 46:
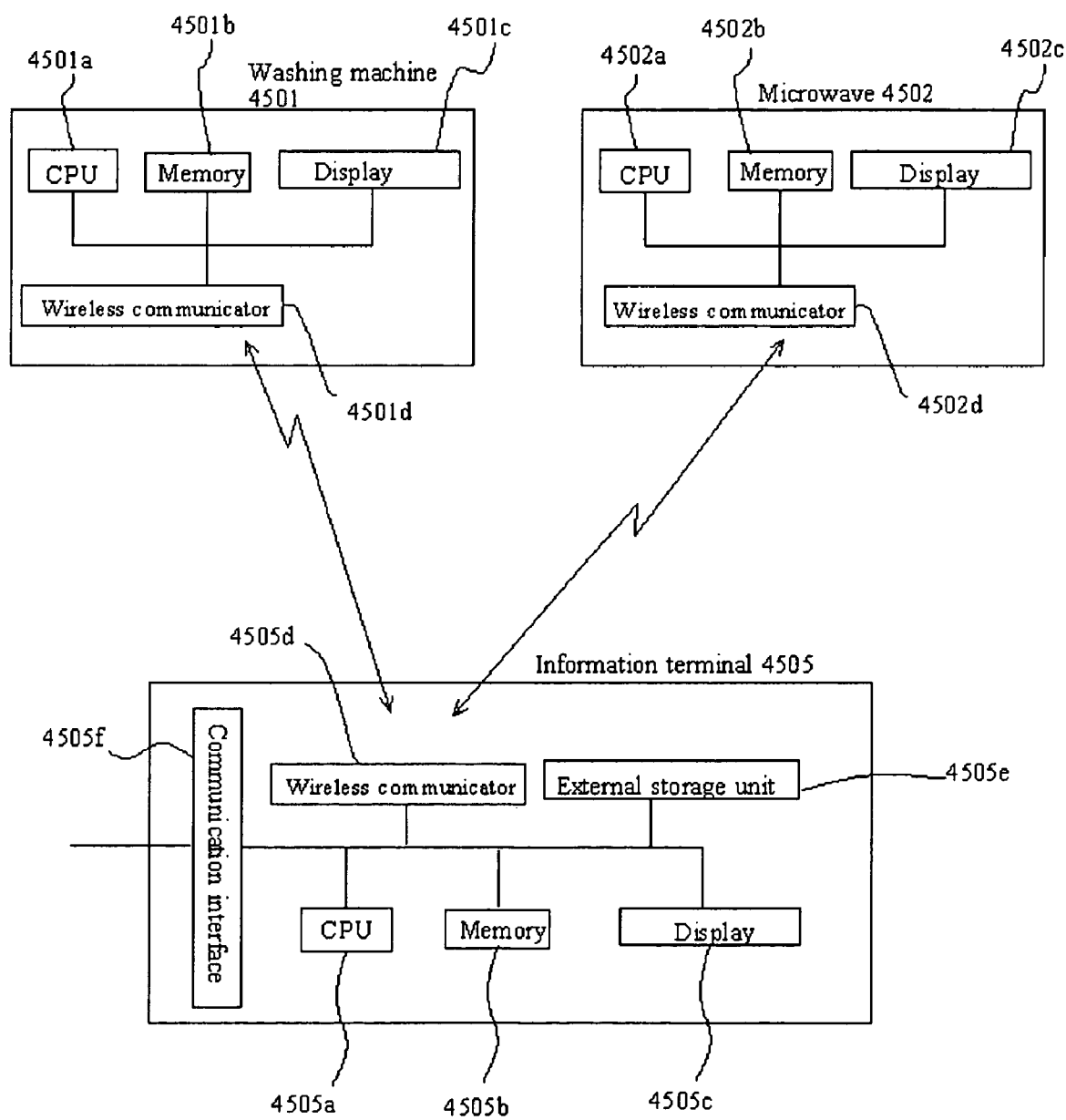
FIG. 46 is a block diagram of an information terminal and a home appliance of the example of the present invention.

In addition, as shown in FIG. 46, the washing machine 4501 comprises necessary hard resources such as the CPU 4501a, the memory 4501b, the display 4501c, which is a display means such as LCD (Liquid Crystal Display), or EL (Electro Luminescence) display, and the wireless communicator 4501d etc., and makes them perform; thereby operating the controller 4707, the information storage unit 4708, the monitoring unit for operational state 4709, the timer 4710, and the wireless communicator 4711.

Figure 48:
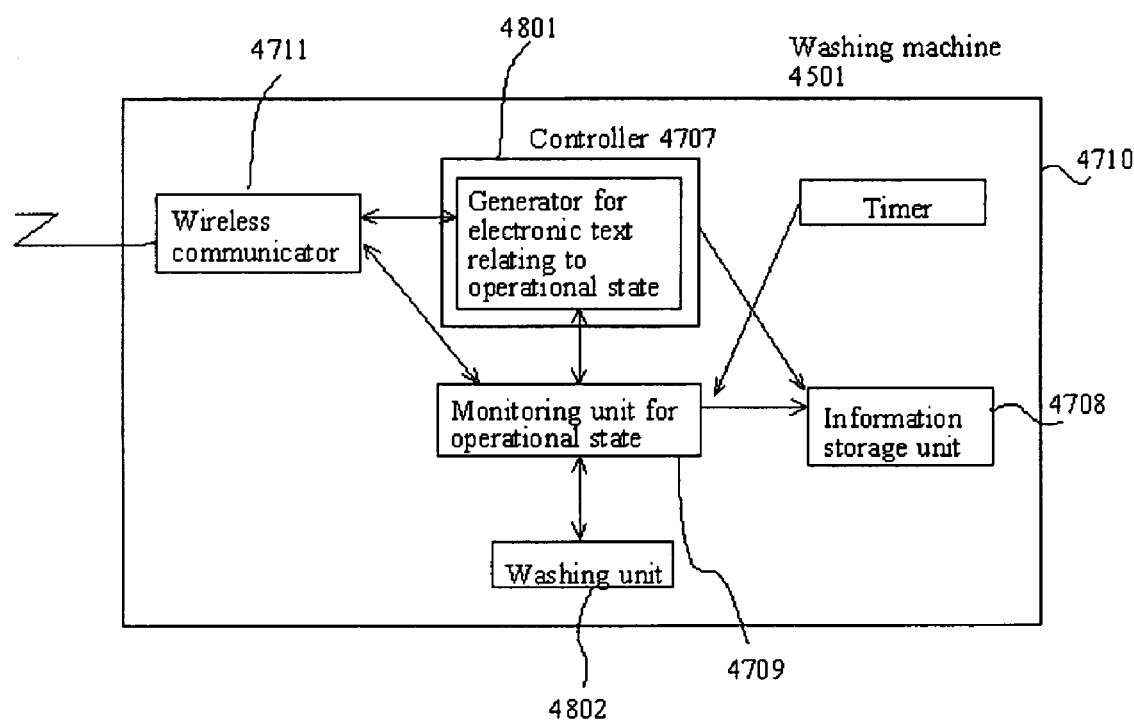
FIG. 48 is a functional block diagram of a home appliance (a washing machine) of the example of the present invention.

The controller 4707 controls the respective functional unit such as the wireless communicator 4711 etc., thereby causing the wireless communicator to perform notification of the operational state of the washing machine 4501, such as, filling with water, agitating, draining, spin-dry, and remaining time information etc., and to display them on the information terminal 4505. Furthermore, as shown in FIG. 48, the controller 4707 provides the function of the generator for electronic text relating to operational state 4801; monitors change of the operational state (state such as start of operation, end of operation, filling with water, agitating, draining, spin-dry, etc.) of the washing unit 4802 by the monitoring unit for operational state 4709 as described hereinafter; and transmits "electronic text relating to operational state" or "electronic text relating to apparatus anomaly" to the information terminal 4505 via the wireless communicator 4711 if there is a change of state or anomaly of apparatus state.

The information storage unit 4708 (the memory 4501b) possesses the functions of recording and storing the control information managed by the washing machine 4501 or downloaded washing program, and is composed of non-volatile flash memory and RAM (Random Access Memory), etc.

The monitoring unit for operational state 4709 monitors state of respective drive unit and proceeding state of washing process during operation of the washing machine 4501, and records them to said information storage unit 4708; moreover, it monitors usage error caused by a user during operation and component failure in the washing machine 4501 etc. Normally, in home appliances and equipment, there are minor apparatus anomalies such as the usage error and serious apparatus anomalies such as component failure. In the first example, in the order of the importance, a history of occurrence of an anomaly is recorded to the server 4506 and the body of the information terminal 4505, and is managed. The recorded control state information is incidental to the electronic text relating to the reply to the "electronic text for confirmation of operational state," which is periodically transmitted from the information terminal 4505, and is transmitted to the information terminal 4505, Moreover, in cases where the anomaly occurs in an apparatus, the "electronic text relating to apparatus anomaly" is transmitted to the information terminal 4505.

The timer 4710 operates a timer for measuring operating time, power usage time, and end time, etc. of the washing machine 4501, and records the date of start of operation and the date of end of operation as operation history to the information storage unit 4708.

The wireless communicator 4711 (the wireless communicator 4501d) constructs a wireless system by utilizing specified low power wireless communication (429 MHz band). The specified low power wireless communication is suitable for controlling the apparatus because of the low power thereof, whereas communication speed thereof is low; and is installed between the wireless communicator 4706 of the information terminal 4505 within effective transmission range, in which wireless communication is possible. Note that, although not illustrated in the first example, the wireless communicator 4711 (the wireless communicator 4501d) may be composed separately from the washing machine 4501.

Figure 47:
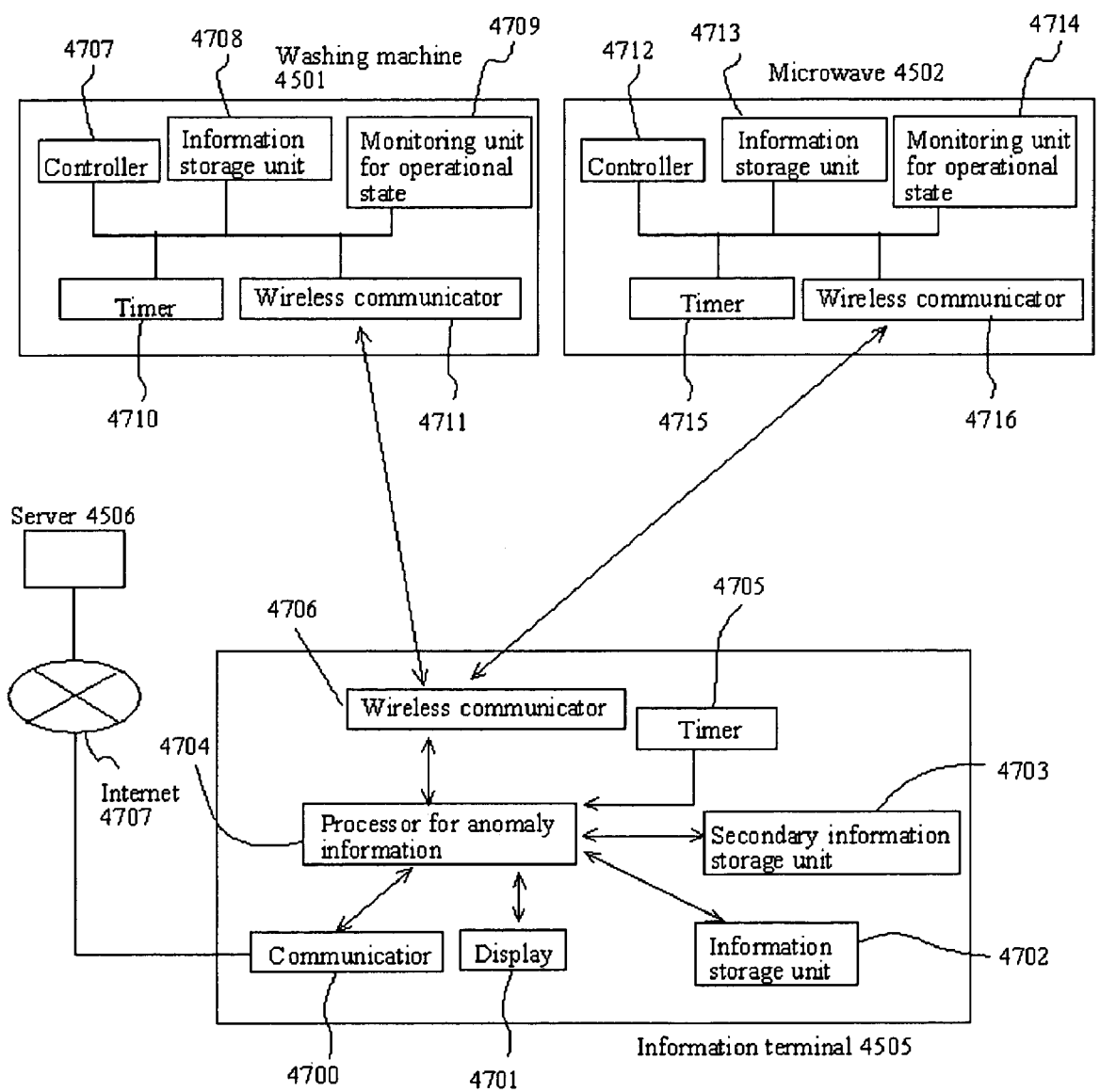
FIG. 47 is a functional block diagram of an information terminal and a home appliance of the example of the present invention.

In addition, the microwave 4502 comprises the same hard resource as said washing machine 4501, and operates the controller 4712, the information storage unit 4713, the monitoring unit for operational state 4714, the timer 4715, and the wireless communicator 4716 as shown in FIG. 47.

In addition, although not illustrated in the first example, the washing machine 4501 comprises hard resource such as a filling with water device and a motor for providing a washing function, and the microwave 4502 comprises hard resource such as a magnetron for radiating electrical waves, etc. Note that these communication mediums are not limited to wireless communication, and anything that establishes a home network such as power line communication, optical communication, or Ethernet®, may be allowed.

In addition, the information terminal 4505 is connected to an ISP (Internet service provider) by utilizing a communication medium, which is established by a PSTN (Public Switched Telephone Network), an ISDN (Integrated Service Digital Network), an ADSL (Asymmetric Digital Subscriber Line), a CATV (Community Antenna TeleVision) network, an optical cable, a PHS (Personal Handy Phone System), or a wireless communication network, etc., and is connected to the server 4506 via the Internet 4507. Moreover, the information terminal 4505 possesses the function of interconverting application protocols, which is used in communication between the network-connected home appliances and in the Internet communication, and it stores the user authentication ID and password, which are required to connect to the server 4506, and further stores ID information of wireless device, which communicates with the information terminal 4505.

In addition, as shown in FIG. 46, the information terminal 4505 comprises hard resources, such as the display 4505c, which displays apparatus state of the network-connected home appliances and service information provided by the server, and is composed of LCD (Liquid Crystal Display), or EL (Electro Luminescence), etc.; the wireless communicator 4505d, which communicates with wireless communicator of the network-connected home appliance; and the communication interface 4505f, such as modem or Ethernet®, in addition to the CPU 4505a, the memory 4505b, and the external storage unit 4505e such as Flash ROM (Read Only Memory), ROM, HDD (Hard Disk Drive); and makes them perform; thereby operating the communicator 4700, the display unit 4701, the information storage unit 4702, the secondary information storage unit 4703, the processor for anomaly information 4704, the timer 4705, and the wireless communicator 4706.

The communicator 4700 connects the information terminal 4505 to the Internet 4507 or the external communication network, such as a telephone line, thereby enabling data transmission/reception with the server 4506 in FIG. 47. Specifically, although not illustrated in FIG. 47, the communicator 4700 connects to the ISP using a protocol such as PPP (Point to Point Protocol), PPPoE (PPP over Atm) via NCU (Network Control Unit) or router unit; and further connects to the server 4506 over TCP/IP via the Internet 4507.

The display unit 4701, the display 4505c as described, provides menu and displays operational state, which is managed by the information terminal 4505 at the moment, if respective network-connected home appliance is selected. Moreover, homepage information of daily life information, which is provided by the server 4506, or the configuration menu of the network and the network-connected home appliance, which are managed by the information terminal 4505 is displayed. Furthermore, the display unit 4701 is composed of a touch panel, thereby enabling intuitive operation by displayed icon.

The information storage unit 4702, which is composed of the memory 4505*b*, temporarily stores information of operational state transmitted from respective apparatus, or information of an apparatus anomaly, or is used as work area for developing program or process executed in the information terminal 4505. The memory space, which is dynamically assigned to process etc., which has been developed on the information storage unit 4702, is released when the process is terminated, and becomes usable when the other process is activated.

The secondary information storage unit 4703 is composed of the external storage unit 4505*e* such as Flash ROM, and records information to be stored even if power is shut off in the information terminal 4505. Examples of the information include the terminal ID and password, which are authentication information for authenticating the information terminal 4505 by the server 4506, management information of the network-connected appliances, which are other party communications, and information of apparatus anomaly, which has been notified by respective apparatus.

The processor for anomaly information 4704 receives and processes the apparatus anomaly information notified by the network-connected home appliances and equipment, which are connected by wireless communication; generates electronic text notified to the server 4506, and provides notification thereof to the server 4506 by the communicator 4700 via the Internet 4507. The server 4506 determines the details of the information of the apparatus anomaly, and generates and replies with the coping method to the received anomaly information.

The timer 4705 measures time period and time instant. When the anomaly information is received, the processor for anomaly information 4704 extracts time information and provides notification thereof with the received information of apparatus anomaly to the server 4506. Moreover, "electronic text for confirming operational state," which is a polling electronic text for acquiring operational state of the respective apparatus, is transmitted at regular time intervals upon measurement by the timer 4705.

The wireless communicator 4706 is composed of the wireless communicator 4505*d*, and transmits and receives the electronic text relating to anomaly information or various electronic texts for control to the network-connected home appliances via wireless communication. The wireless communication medium may be any of wireless LAN, Bluetooth®, specified low power wireless communication, PHS, etc. Moreover, communication protocol may be any of Echonet or IP (Internet Protocol), etc.

In the first example, although not illustrated, an ISP is an Internet service provider, which provides service for Internet connection. A communication protocol, TCP/IP, or HTTP etc., which is generally used in the Internet, is used for communication. For the data of the communication, HTML (HyperText Mark-up Language), XHTML (extensible HTML), XML, Java®, etc., which are generally used in the WWW (World Wide Web) server on the Internet, is used. Image data or voice data do not depend on format, and any format generally used in the Internet may be allowed. The maintenance information and anomaly information, which are managed at a user's home, are transmitted to the server 4506.

Figure 49:
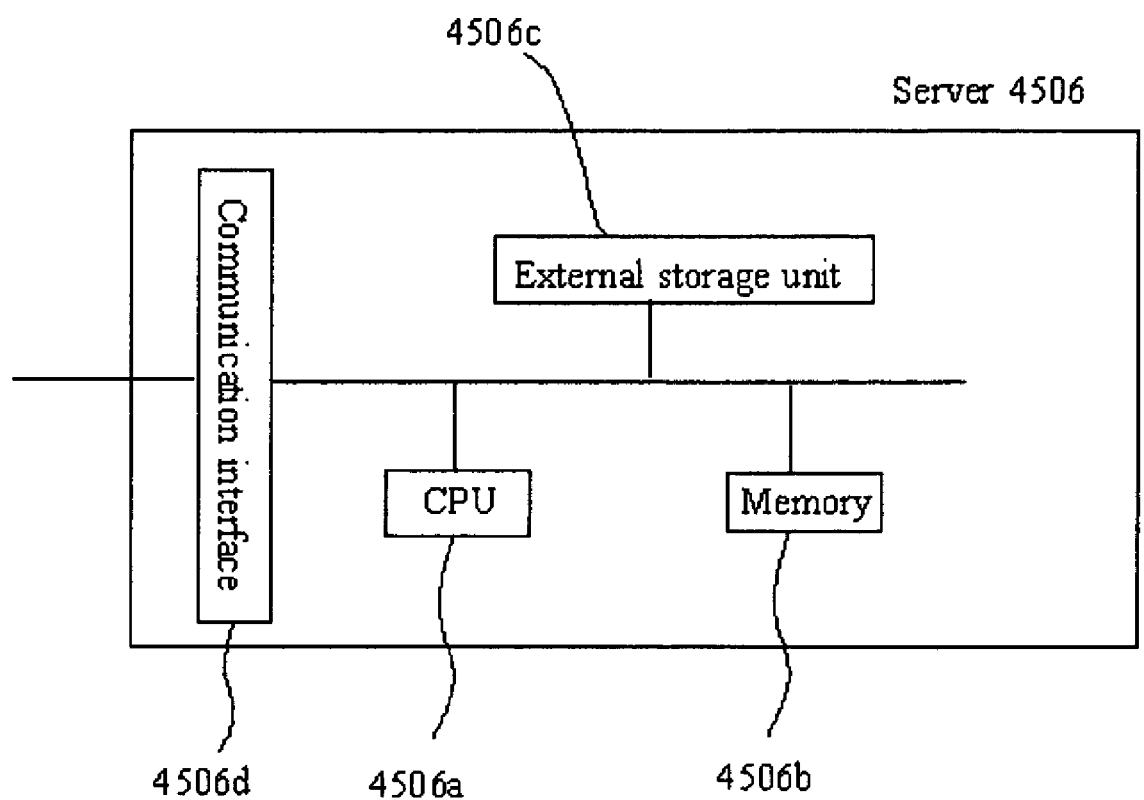
FIG. 49 is a block diagram of a server of the example of the present invention.
Figure 50:
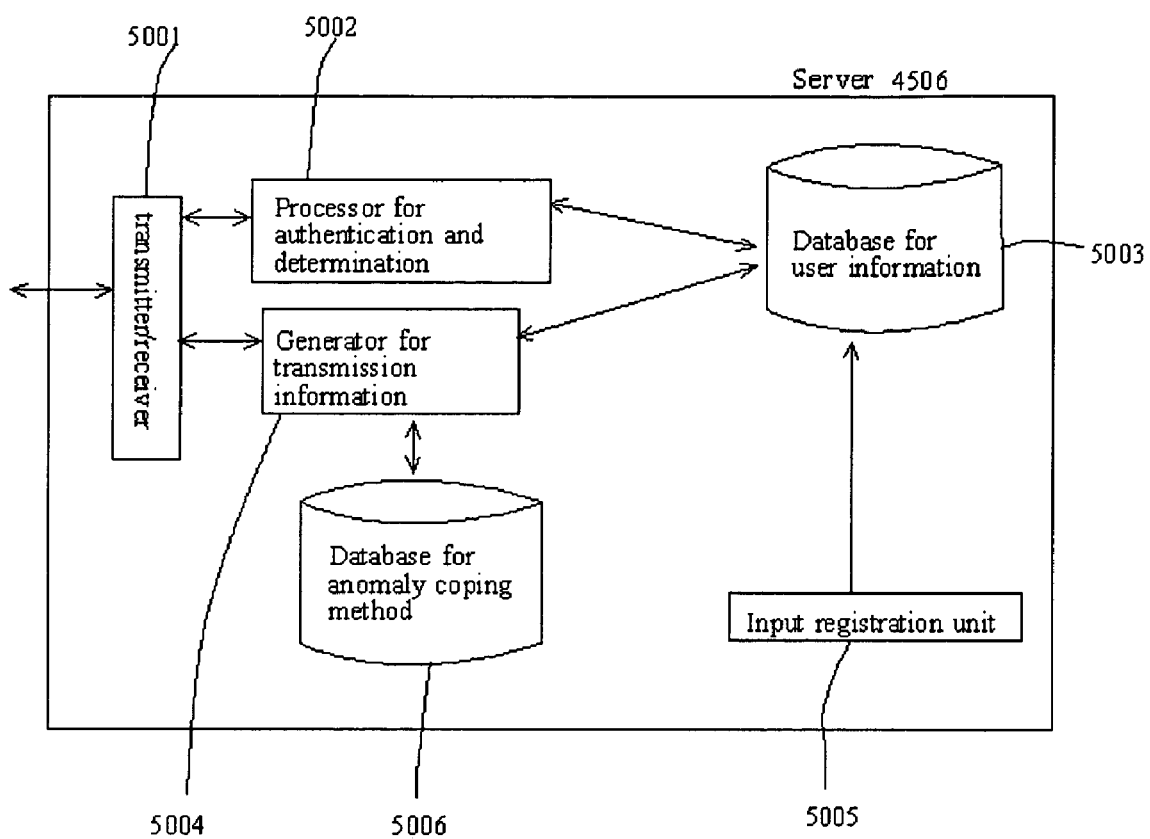
FIG. 50 is a functional block diagram of a server of the example of the present invention.

Meanwhile, the server 4506 determines the type of the authentication request or the notification of anomaly information from the information terminal 4505, which has been transmitted from said information terminal 4505, and transmits a reply to said electronic text. For the above purpose, as shown in FIG. 49, the server comprises hard resources such as the CPU 4506*a*, the memory 4506*b*, the external storage unit 4506*c*, the communication interface 4506*d*, and operates, as shown in FIG. 50, the transmitter/receiver 5001, the processor for authentication/determination 5002, the database for user information 5003, the generator for transmission information 5004, the input registration unit 5005, and the database for anomaly coping method 5006.

The transmitter/receiver 5001 establishes state for transmission/reception between the information terminal 4505 and performs transmission/reception of information in response to a TCP/IP connection, such as the authentication request or the notification of anomaly information from the information terminal 4505 via the Internet 4507.

The processor for authentication/determination 5002 performs processing for authentication by comparing the terminal ID and password, which are authentication information of the information terminal 4505 and received from the information terminal 4505 upon authentication request, with the user information, which is managed by the database for user information 5003. Moreover, the type of the data is determined by the data identifier incidental to the data. The received data of the first example includes the notification of anomaly information other than the authentication information. After termination of authentication processing, if the notification of anomaly information is received, the database for user information 5003 is detected by the attached user information, and communication history information of the user is recorded.

In the database for user information 5003 as described above, user's name, address, region code, telephone number, type of network-connected home appliance owned by the user, the network-connected home appliance ID, and history information of notification of the respective network-connected home appliance, are recorded.

The generator for transmission information 5004 generates the electronic text for control in the case of performing control from the server 4506, the electronic text for reply corresponding to the electronic text notified by user's information terminal 4505, or the transmission information in the case of transmitting information. In the case of receiving the notification of anomaly information, the information of "details of anomaly" and "coping method to anomaly" corresponding to said anomaly information are generated, and transmitted to the information terminal 4505, which is the transmitter of said anomaly information. In the case of the electronic text for reply, the electronic text for reply to the user information or the terminal ID, etc., which are incidental to the received electronic text, is generated and transmitted. Moreover, in cases where an operator on the server side or a user using a mobile phone, etc., operates the server 4506, and controls the user's network-connected home appliance, the user's terminal ID and IP information are acquired from the database for user information 5003, the electronic text for transmission control is generated, and transmission is carried out.

The input registration unit 5005 performs registration, etc., of user information by an operator. Moreover, command input for transmission of the electronic text for control to the network-connected home appliance owned by user, or the electronic text for reading maintenance information stored by the information terminal 4505, is carried out.

In the database for anomaly coping method 5006, the details of anomaly corresponding to the anomaly number (error code) of the anomaly information occurring in the network-connected home appliance and the network-connected equipment, and the coping method to said details of the anomaly are compiled in the database. By the anomaly number incidental to the electronic text relating to the anomaly information provided by the information terminal, the details of the anomaly are detected in the database for coping method to anomaly 5006 and the detailed information is acquired. In conjunction with this, said coping method to anomaly is further detected and acquired.

Note that, although in FIG. 50, the server 4506 is illustrated as one apparatus, the server may be multiple servers, and the database for user information 5003 and the database for coping method to anomaly 5006 may be other apparatuses and may be installed in other places. In addition, the database for user information 5003 may be used for management information of other services for the network-connected home appliance such as telecon services or security services.

In the first example, although the Internet 4507 is utilized as a communication medium for connection, if necessary, the connection may be carried out via an exclusive line or telephone line, and not limited to via the Internet 4507.

Next, the operation and effect of the method for carrying out notification of the network-connected home appliance in the system of the first example will be described.

The network-connected home appliance, such as the washing machine 4501 or the microwave 4502, etc., does not operate unless it is used by user. However, since it is necessary to confirm the operational state of the respective network-connected home appliance, the information terminal 4505 performs polling of transmission of "electronic text relating to confirming operational state" at periodical timing, then acquires how the respective network-connected home appliance is operating at a periodical timing, records to the information terminal 4505, and provides information to the user. For example, "periodical" operation means that the electronic text for confirming operational state is transmitted once every three hours to the respective network-connected home appliance, and the operational state thereof is acquired in order.

In addition, with the function of managing the operational state of the network-connected home appliance by the information terminal 4505, the function of carrying out notification of the anomaly occurring in the network-connected home appliance to the server 4506 via the information terminal 4505, and the function of displaying explanation of the details of said anomaly to the user, are provided.

In addition, depending on anomaly information, the coping method thereto is received from the server 4506 and displayed, thereby supporting the user to provide a coping method thereto. The anomaly information may include a minor anomaly, which is caused by the user's mistake in operation, and is easy to correct, and a serious anomaly, for example, component failure, which requires support by maintenance person, and history of the respective anomaly is managed as a different anomaly by the server 4506 and one portion of the information is managed by the information terminal 4505.

Figure 51:
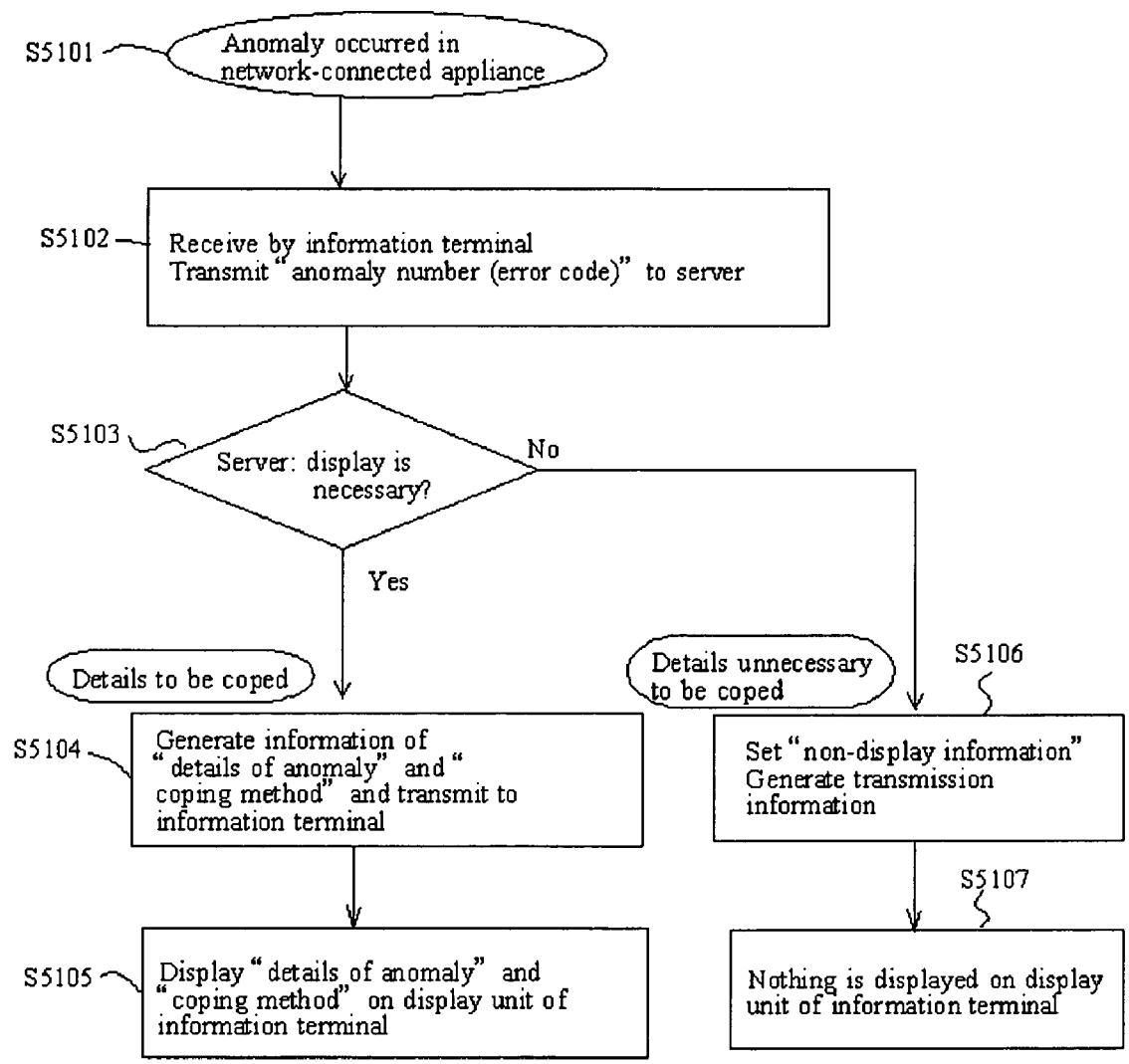
FIG. 51 is a flow chart of a control method for the example of the present invention.

FIG. 51 is a flow chart of operation until the anomaly is displayed when the anomaly occurs in the network-connected home appliance. FIG. 51 explains that the details of the anomaly information occurring in the network-connected home appliance are determined by the server 4506, and that explanation of said anomaly information and the coping method thereto are displayed by the information terminal 4505.

When using the network-connected home appliance, for example, in the case of operating the washing machine 4501 for washing, if an anomaly occurs in the washing unit 4802, the monitoring unit for operational state 4709 detects the anomaly, and the generator for electronic text relating to operational state 4801 generates electronic text with the "anomaly information number" of said anomaly state. Said electronic text is transmitted to the information terminal 4505 by the wireless communicator 4711 (step S5101).

After that, if the "electronic text relating to operational state" is determined as the anomaly information by the processor for anomaly information 4704, it is stored in a certain area in the secondary information storage unit 4703 in the information terminal 4505. In addition, since the capacity of the storage area is limited, a number of history storage is preliminarily assigned. In this case, the minor anomaly and the serious anomaly are stored in separate areas in order to prevent the history information of serious anomalies from being deleted, even if many minor anomalies occur. Then, the electronic text relating to the anomaly is converted to electronic text form communicable with the server 4506 via the Internet 4507, and said anomaly information with the "anomaly information number" is transmitted to the server 4506 by the communicator 4700 (step S5102). Either the notification to the server 4506 or the recording of history to the information terminal 4505, performed at this point, may be carried out first.

The server 4506 receives the electronic text from the user's information terminal 4505 by the transmitter/receiver 5001, authenticates the user by the processor for authentication/determination 5002, and after the authentication of the terminal, determines the details of the received anomaly information. Then, by the "anomaly information number" incidental to the anomaly information, the details of the anomaly are determined, and it is determined whether or not the anomaly information is to be displayed on the information terminal 4505 (step S5103).

Here, if there are details to be displayed for the user, the generator for transmission information 5004 acquires the information of the details of the anomaly and the coping method thereto corresponding to said details from the database for anomaly coping method 5006, and generates the transmission information to the information terminal 4505. Then, the transmitter/receiver 5001 transmits it as electronic text for reply to the information terminal 4505 (step S5104). Here, depending on the details of the anomaly, there may be a case in which the coping method to the anomaly is not transmitted, or a case in which the anomaly display information is not transmitted.

Figure 52:
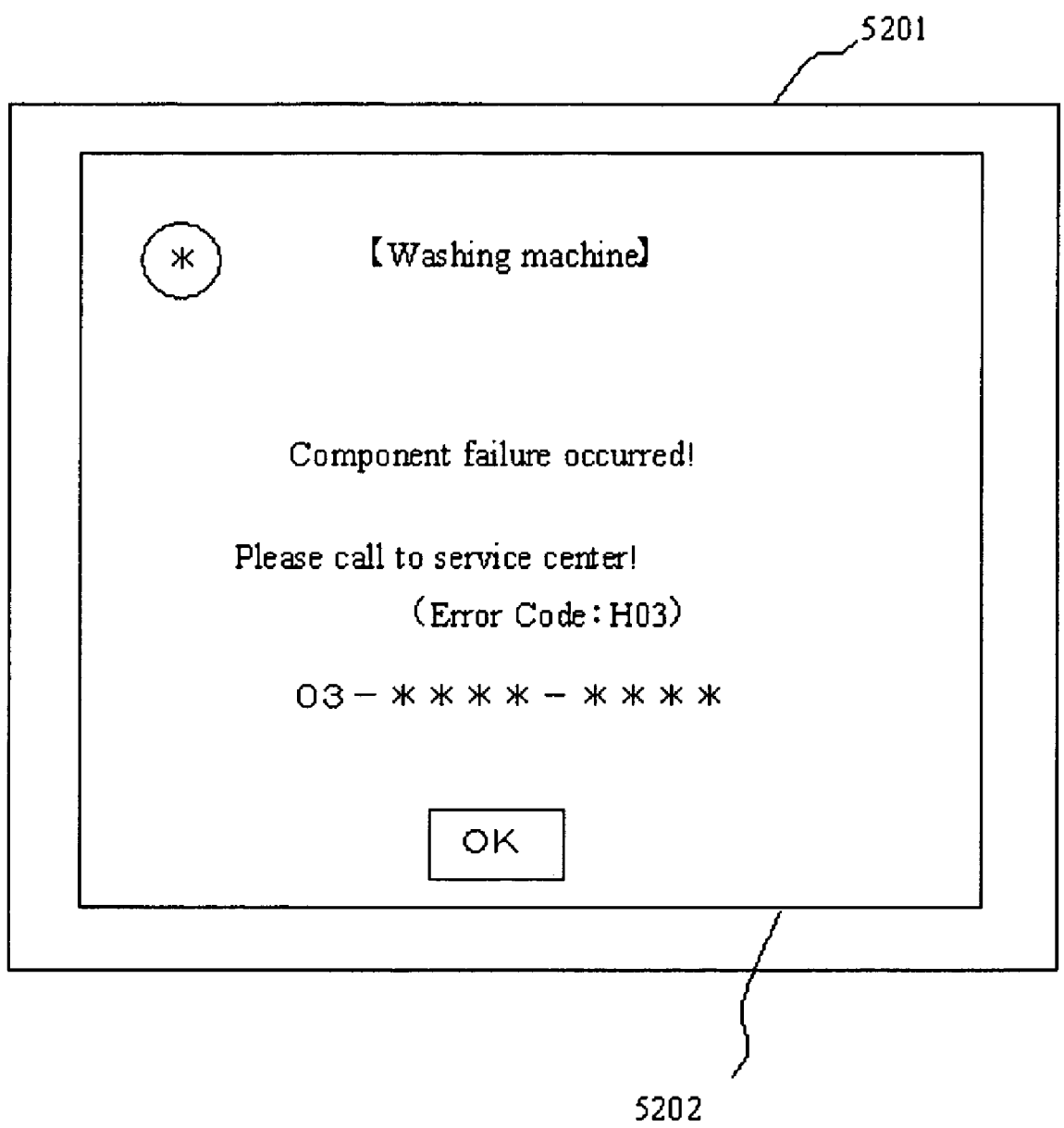
FIG. 52 is an illustration of a panel for notification of anomaly information of the example of the present invention.

Then, the communicator 4700 receives said electronic text for reply. The details of the display of said received details is acquired by the processor for anomaly information 4704, and displayed as anomaly information on the menu screen by the display unit 4701. For example, if failure of the washing machine 4501 is determined by the server 4506, as the details of anomaly, the message "<Washing machine> component failure occurred!", etc., is transmitted, and as the coping method to the anomaly, the telephone number of a service center and the coping method are displayed for the user as "Please call to service center! 03-**-". FIG. 52 shows the display screen thereof displayed on the display screen 5201 as the pop-up for displaying the anomaly 5202 (step S5105**).

Next, the case in which the anomaly information received by the server 4506 is not necessarily provided to the user and is not displayed, will be described. In FIG. 51, in step S5103, if it is determined by the anomaly information number that display is not necessary, the generator for transmission information 5004 of the server 4506 sets "non-display information" and generates and transmits the electronic text for reply (step S5106).

The information terminal 4505, which received the above, acquires said details of the information by the processor for anomaly information 4704, and if the non-display information is set, does not display the pop-up. Nothing is newly displayed for the user, and the menu screen is displayed (step S5107).

Note that, when the anomaly information is provided from the information terminal 4505 to the server 4506, all of the anomaly information with the user information is recorded and managed in the database for user information 5003.

In addition, although in the first example, the case utilizing the specified low power wireless communication (429 MHz band) is described, the first example is not limited to this, and may be configured by utilizing power line communication or wireless LAN (e.g. 802.11b) and is still effective.

In addition, operations of the network-connected home appliances are different from each other, and the details of anomaly information and the determination process thereof are also different. Moreover, by setting on the server 4506 side, it becomes possible to change handling of the display of details of anomaly information, thereby enabling an optional change from non-display to display of anomaly.

In addition, although not illustrated, the information terminal 4505 may be installed as a gateway apparatus of the network-connected home appliance, and the display unit 4701 may be installed as another apparatus.

Note that, although it is described that the information terminal 4505 and the server 4506 are connected via the Internet 4507, the first example is not limited to this, and the connection line may be a customer access line (telephone line), ISDN, ADSL, CATV, FTTH (Fiber To The Home), wireless LAN, or Ethernet® etc.

In addition, the first example may be similarly configured as all or one portion of the method of the information terminal, or as a program for operating a computer. By being configured as a program, it can be carried out as one of the functions of a micro computer, a personal computer, or other apparatus, thereby improving user-friendliness and versatility thereof, and enabling easy configuration of the system. Moreover, by recording on the recording medium, or by distributing the program via the communication line, it becomes easy to distribute or install the program.

In addition, the concrete configurations of the respective units are not limited to the above example, and may be embodied in various modifications without departing from the scope of the present invention.

As described above, according to the configuration of the first example, the server determines the details of the anomaly information and transmits the coping method thereto to the information terminal, so that it becomes possible to provide detailed coping method corresponding to many appliances, etc., thereby improving user-friendliness; and it becomes possible to modify assignment of anomaly information or coping method just by changing the server. Moreover, it becomes unnecessary to store much information for determining the anomaly information, thereby configuring the information terminal at a reasonable price.

In addition, all of the anomaly information is once provided to the server, and "non-display information" is transmitted to the information terminal; so that it becomes possible to switch display or non-display of the anomaly information in the information terminal, thereby improving functionality of service. Moreover, various details of the anomaly information can be compiled on the server side, and it becomes possible for a service provider to know the user's usage of the network-connected home appliance, or the state thereof, and this makes it possible for the manufacturer side to use this information for product development or service.

Moreover, by configuration as a program, it can be carried out as one of the functions of a micro computer, a personal computer, or other apparatus; thereby improving user-friendliness and versatility thereof, and enabling easy configuration of the system. Moreover, by recording on the recording medium, or by distributing the program via the communication line, it becomes easy to distribute, or to install the program.

THE SECOND EXAMPLE

Another example of the present invention will be described. The details of the example will be described hereinafter.

The first aspect of the second example will explain the system for carrying out notification of an anomaly, which is the system comprising an information terminal, which communicates with a home appliance or equipment, manages and controls said apparatus, wherein said information terminal provides notification of anomaly, which has occurred in said home appliance or equipment; wherein in cases where the anomaly occurs in the home appliance or equipment, and the anomaly information is provided to the information terminal, a display indicating said details of anomaly is displayed by pop-up, and in cases where the reset information is provided by the appliance or equipment, which has provided notification of said anomaly, to the information terminal, said pop-up is removed. According to this system for carrying out notification of anomaly, by removing the pop-up, the reset of the anomaly becomes noticeable to the user, thereby improving user-friendliness. Note that the operation of the system for carrying out notification of the anomaly corresponds to the operation of the system by utilizing the information terminal of the third embodiment.

The second aspect of the second example will explain the apparatus for carrying out notification of anomaly comprising:

a display unit, which communicates with the appliance or the equipment and provides notification of the anomaly, which has occurred in said apparatus, and a processor for anomaly information, which displays the pop-up of the details of the anomaly on the display unit upon receiving the anomaly; wherein while the anomaly occurs and the pop-up is displayed, if the reset information from the apparatus, which has provided notification of the anomaly, is received, the pop-up is removed. According to this apparatus for carrying out notification of the anomaly, by removing the pop-up, the reset of the anomaly becomes noticeable to the user, thereby improving user-friendliness. Note that the operation of the apparatus for carrying out notification of anomaly corresponds to the operation of the apparatus by utilizing the information terminal of the fourth embodiment.

The third aspect of the second example will explain the system for carrying out notification of the anomaly, which is the system comprising an information terminal, which communicates with a home appliance or equipment, manages and controls said apparatus, wherein said information terminal provides notification of the anomaly, which has occurred in said home appliance or equipment; wherein in cases where the anomaly occurs in the home appliance or equipment, and the anomaly notification is provided to the information terminal, the anomaly history information is managed and stored by separating with respect to each priority of said anomaly information. According to this system for carrying out notification of the anomaly; wherein the anomaly history information is separately managed and stored with respect to each priority of said anomaly information, thereby preventing the history information of a serious anomaly from being deleted even if many minor anomalies occur. Note that the operation of the system for carrying out notification of the anomaly corresponds to the operation of the system by utilizing the information terminal of the ninth embodiment.

The fourth aspect of the second example will explain the apparatus for carrying out notification of the anomaly comprising:

a recorder for information, which records anomaly information, which has occurred in said apparatus, and a processor for anomaly information, which determines and processes priority of details of the anomaly upon receiving the anomaly, wherein the anomaly history information is managed and stored to the storage unit for information by separating storage areas with respect to each priority of said anomaly information. According to this apparatus for carrying out notification of anomaly, wherein the anomaly history information is separately managed and stored with respect to each priority of said anomaly information, thereby preventing the history information of a serious anomaly from being deleted even if many minor anomalies occur. Note that the operation of the apparatus for carrying out notification of the anomaly corresponds to the operation of the apparatus by utilizing the information terminal of the ninth embodiment.

Figure 53:
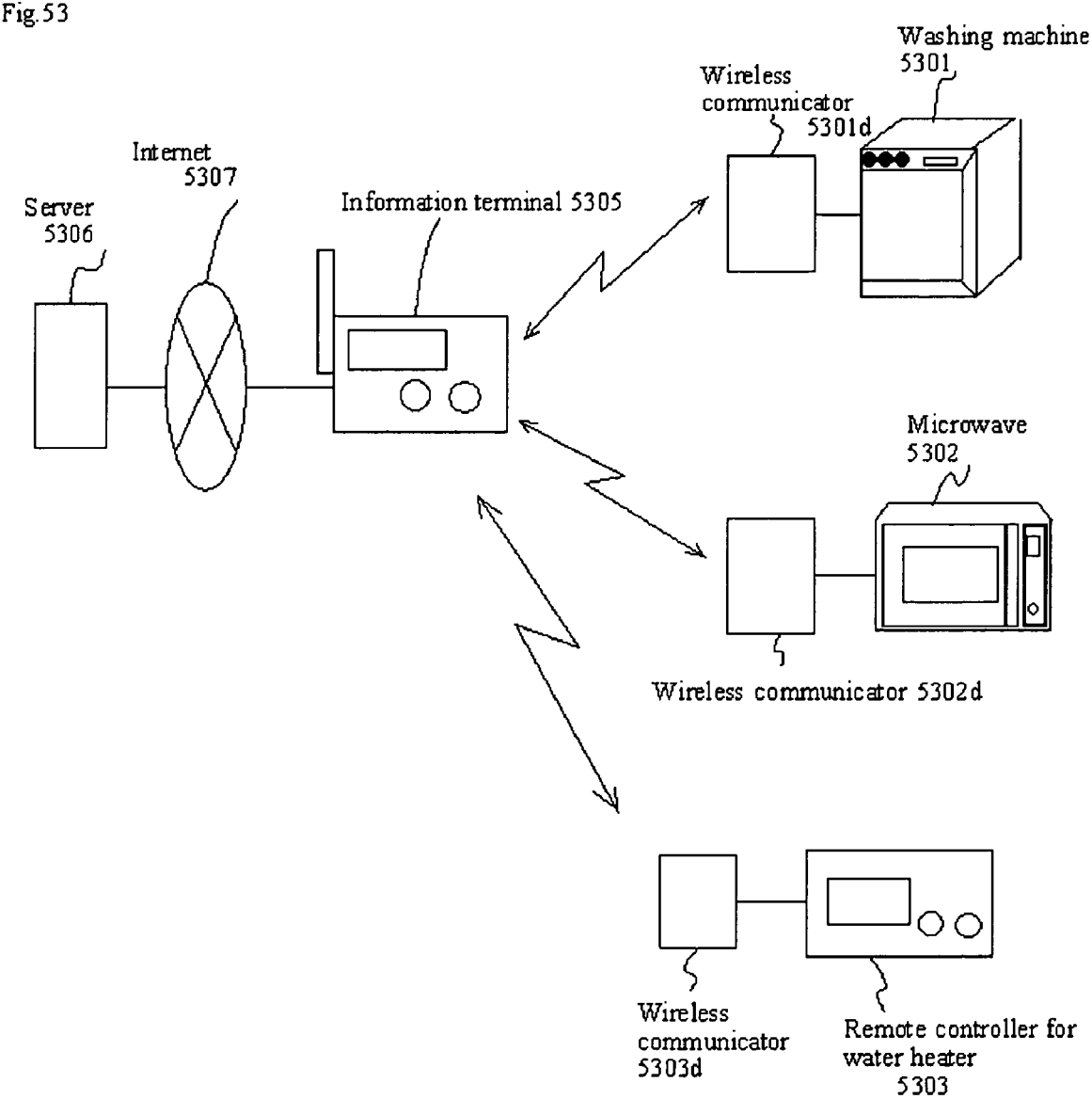
FIG. 53 is a block diagram of a system of network-connected home appliances using a system for carrying out notification of anomaly and an apparatus for carrying out notification of anomaly of the examples of the present invention.

FIG. 53 illustrates the network system, in which the information terminal of the second example displays the state of the home appliance or equipment or performs control thereof.

As shown in FIG. 53, the washing machine 5301, the microwave 5302, the remote controller of the water heater 5303, which are network-connected home appliances comprising functions of the connecting network, are respectively connected to the wireless communicator 5301d, 5302d, and 5303d, and can communicate with the information terminal 5305 by wireless communication. The wireless communicators 5301d, 5302d, and 5303d are constructed by communication medium such as wireless LAN, Bluetooth®, or specified low power wireless communication.

Here, the concept of the network-connected home appliance corresponds to home appliances and equipment, which possess functions of connecting to various networks including the Internet, and installed and used at home. Examples thereof may include a refrigerator, an air conditioner, a water heater, a system utilizing hot water, a dryer, a dish washer/dryer, a cleaner, a hot plate, an IH apparatus, a rice cooker, a toilet seat with warm-water bidet, an electronic lock, various security sensors (a human sensor and a anticrime sensor), a home server, a television, video equipment, a DVD apparatus, a personal computer, an information terminal such as a PDA, a mobile phone, a FAX, a telephone, an audio apparatus and a remote-controller thereof in addition to a washing machine 5301, a microwave 5302, and a remote-controller of water heater 5303 as illustrated. Moreover, an electric meter, a water meter, and a gas meter may be included. It becomes possible to display energy consumption and fee thereof on the information terminal 5305 by connecting with said meter apparatuses. Moreover, in the case of the gas meter, it becomes possible to control shut off/recovery of the gas meter by the information terminal 5305.

By providing the network communication function to the above network-connected home appliances, it becomes possible to display control state or maintenance information of the network-connected home appliance by communication methods, and to automatically control the network-connected home appliances by the information terminal. Moreover, it becomes possible to download new software from the server, which manages the network-connected home appliance, to the network-connected home appliance, to download recipe information to the microwave, or to download a washing program to the washing machine.

Furthermore, by utilizing a mobile phone, PDA, personal computer from outside, the network-connected home appliances can be controlled via the Internet 5307 or the information terminal 5305.

In addition, as shown in FIG. 2, the washing machine 5301 comprises necessary hard resources such as the CPU 5301a, the memory 5301b, the display 5301c, which is a display means such as a LCD, or EL display, and the wireless communicator 5301d, etc., and makes them perform, thereby operating the controller 5507, the information storage unit 5508, the monitoring unit for operational state 5509, the timer 5510, and the wireless communicator 5511.

Figure 56:
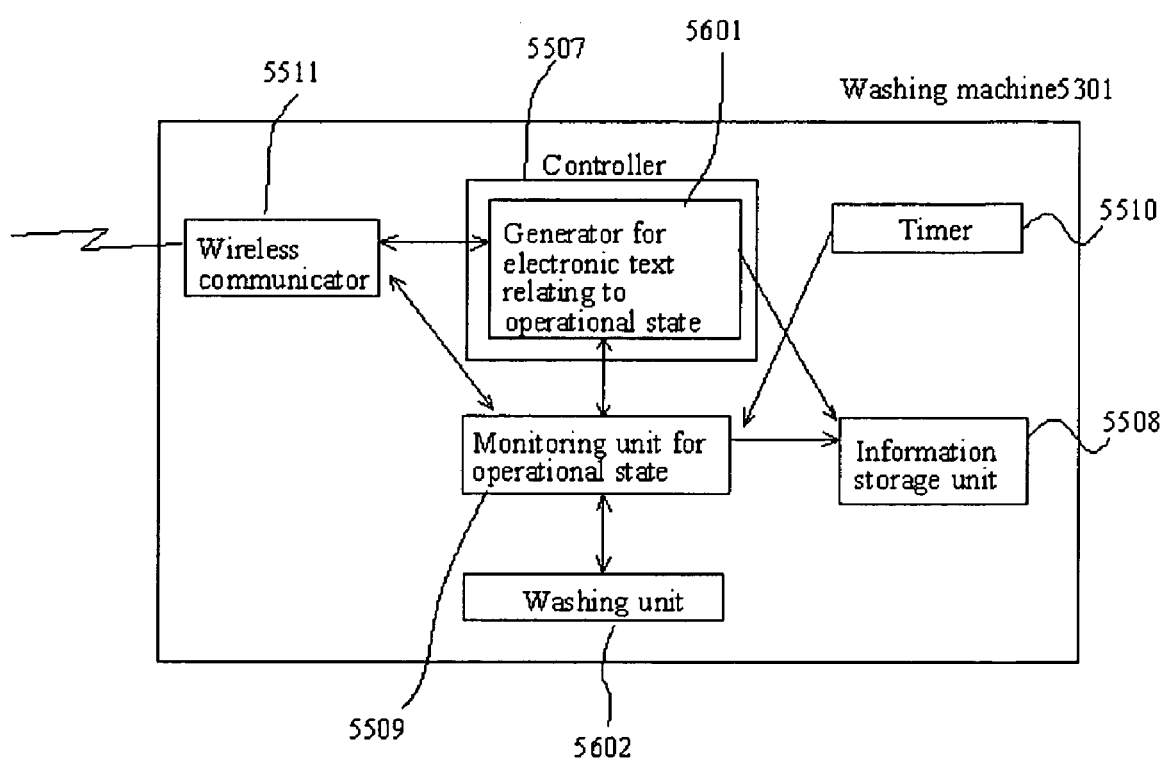
FIG. 56 is a functional block diagram of a home appliance (a washing machine) of the example of the present invention.

The controller 5507 controls respective functional units such as the wireless communicator 5511, etc., thereby causing the wireless communicator to perform notification of the operational state of the washing machine 5301, such as filling with water, agitating, draining, spin-dry, and remaining time information etc., and to display them on the information terminal. Furthermore, as shown in FIG. 56, the controller 5507 provides the function of the generator for electronic text relating to operational state 5601; monitors change of the operational state (state such as start of operation, end of operation, filling with water, agitating, draining, spin-dry, etc.) of the washing unit 5602 by the monitoring unit for operational state 5509 as described hereinafter; and transmits "electronic text relating to operational state" or "electronic text relating to apparatus anomaly" to the information terminal 5305 via the wireless communicator 5511 if there is a change of state or anomaly of apparatus state.

The information storage unit 5508 (the memory 5301b) possesses the function of recording and storing the control information managed by the washing machine 5301 or downloaded washing program recipe, and is composed of non-volatile flash memory, RAM, etc.

The monitoring unit for operational state 5509 monitors the state of the respective drive unit and progressive state of the washing process during operation of the washing machine 5301, and records them to said information storage unit 5508; moreover, it monitors usage error caused by a user during operation and component failure in the washing machine 5301, etc. Normally, in the home appliance and equipment, there are minor apparatus anomalies, such as the usage error, and serious apparatus anomalies such as component failure.

In the second example, in the order of importance, a history of anomaly occurrence is recorded at the server 5306 and the body of the information terminal 5305, and managed. The recorded control state information is incidental to the electronic text relating to the reply to the "electronic text for confirmation of operational state," which is periodically transmitted from the information terminal 5305, and is transmitted to the information terminal 5305.

Moreover, in cases where an anomaly occurs in an apparatus, the "electronic text relating to apparatus anomaly" is transmitted to the information terminal 5305.

The timer 5510 operates a timer for measuring operating time, power usage time, and time to the end etc. of the washing machine 5301, and records date of start of operation and the date of end of operation as an operation history to the information storage unit 5508.

The wireless communicator 5511 (the wireless communicator 5301d) constructs a wireless system by utilizing specified low power wireless communication (429 MHz band). Moreover, Echonet protocol, which is standardized as a communication protocol, is utilized. The specified low power wireless communication is suitable for controlling apparatuses because of the low power thereof, whereas the communication speed thereof is low (2400 bps or 4800 bps), and is installed between the wireless communicator 5506 of the information terminal 5305 within effective transmission range, in which wireless communication is possible. Note that, although not illustrated in the second example, the wireless communicator 5511 (the wireless communicator 5301d in FIG. 54) may be configured separately from the washing machine 5301.

Figure 55:
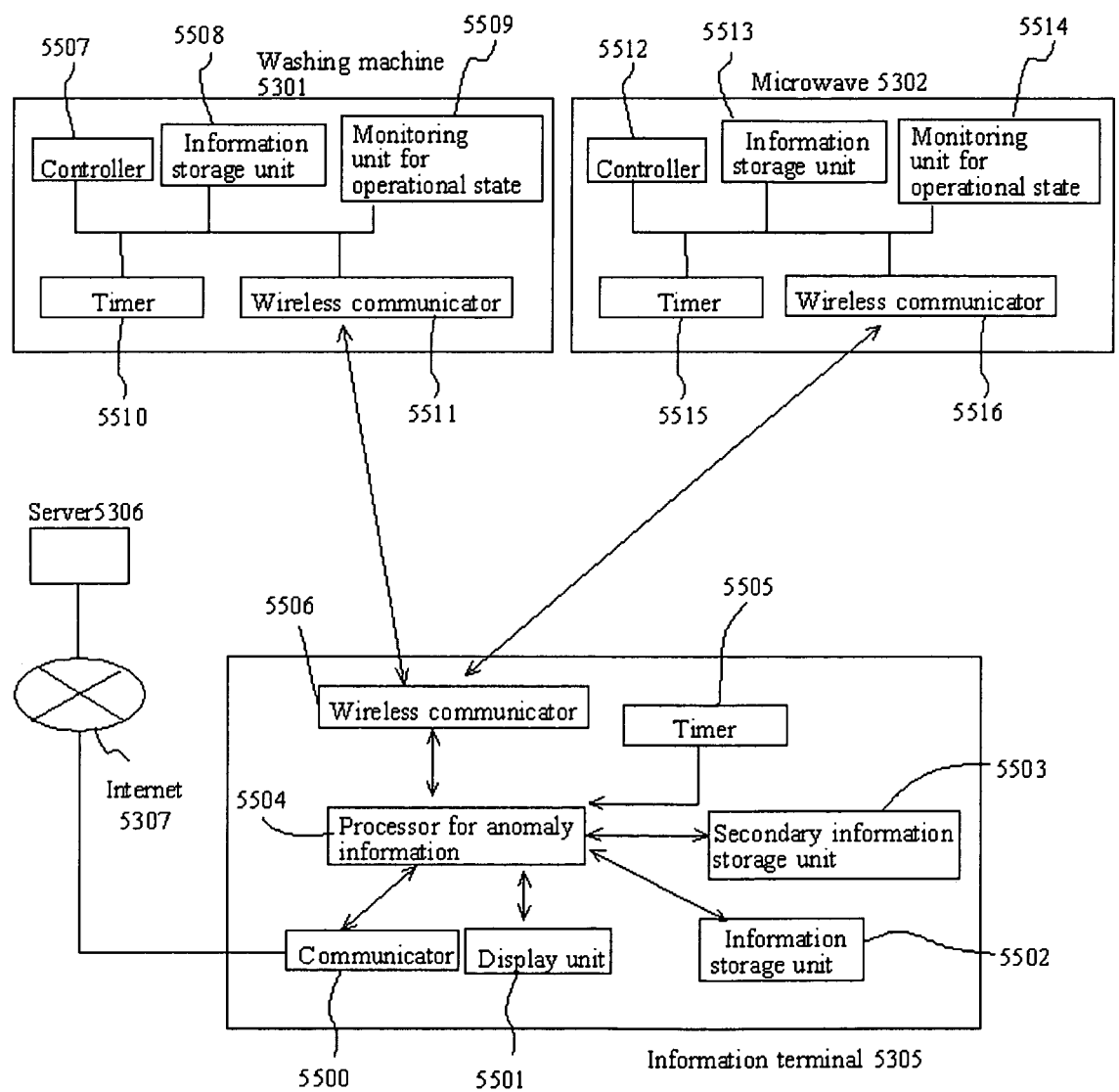
FIG. 55 is a functional block diagram of an information terminal and a home appliance of the example of the present invention.

In addition, the microwave 5302 comprises the same hard resource as said washing machine 5301, and operates the controller 5512, the information storage unit 5513, the monitoring unit for operational state 5514, the timer 5515, and the wireless communicator 5516, as shown in FIG. 55.

In addition, although not illustrated in the second example, the washing machine 5301 comprises hard resource such as a water filling device and a motor for providing the washing function, and the microwave 5302 comprises hard resources, such as a magnetron for radiating electrical waves, etc. Note that these communication mediums are not limited to wireless communication, and anything that establishes a home network, such as power line communication, optical communication, or Ethernet®, may be included.

In addition, the information terminal 5305 is connected to an ISP (Internet service provider) by utilizing a communication medium, which is established by a PSTN, ISDN, ADSL, CATV network, optical cable, PHS, or wireless communication network, etc., and is connected to the server 5306 via the Internet 5307. Moreover, the information terminal 5305 possesses functions of interconverting application protocols, which are used in communication between the network-connected home appliances and in the Internet; and stores the user authentication ID and password, which are required to connect to the server 5306; and further stores ID information of the wireless device, which communicates with the information terminal 5305.

Figure 54:
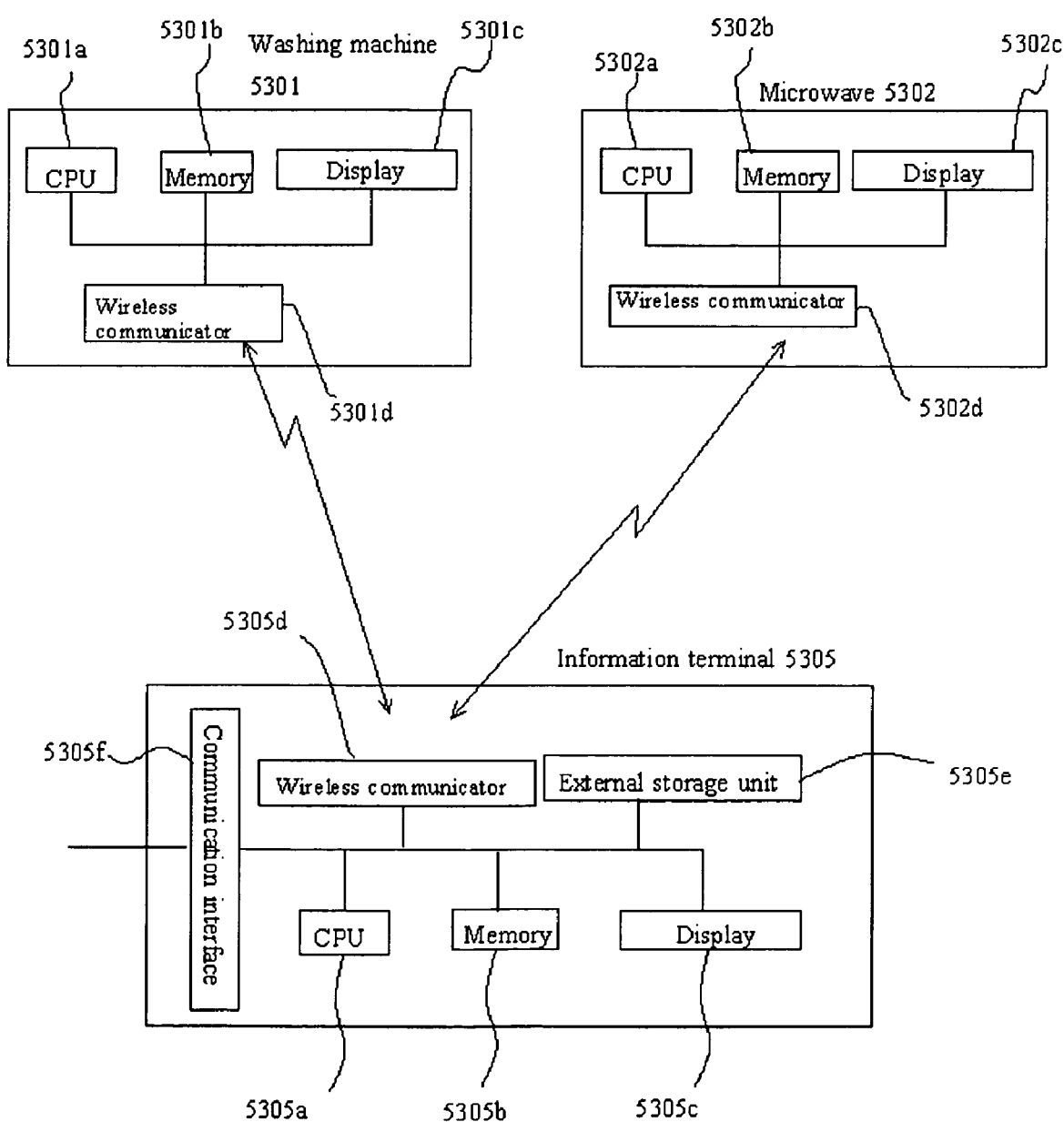
FIG. 54 is a block diagram of an information terminal and a home appliance of the example of the present invention.

In addition, as shown in FIG. 54, the information terminal 5305 comprises hard resources, such as the display 5305c, which displays apparatus state of the network-connected home appliance and service information provided by the server and includes LCD, or EL, etc., the wireless communicator 5305d, which communicates with the wireless communicator of the network-connected home appliance, and the communication interface 5305f such as modem or Ethernet®, in addition to the CPU 5305a, the memory 5305b, and the external storage unit 5305e such as Flash ROM (Read Only Memory), ROM, HDD (Hard Disk Drive); which makes them perform, thereby operating the communicator 5500, the display unit 5501, the information storage unit 5502, the secondary information storage unit 5503, the processor for anomaly information 5504, the timer 5505, and the wireless communicator 5506 as shown in FIG. 55.

The display unit 5501, the display 5305c as described, provides a menu and displays operational states, which are managed by the information terminal 5305 at the moment, if respective network-connected home appliance is selected. Moreover, if the anomaly occurs in the network-connected home appliance, the pop-up relating to the anomaly is displayed on the display unit 5501. Moreover, homepage information of daily life information, which is provided by the server 5306, or the configuration menu of the network and the network-connected home appliance, which are managed by the information terminal 5305, is displayed. Furthermore, the display unit 5501 is composed of a touch panel, thereby enabling intuitive operation by displayed icon.

The information storage unit 5502, which is composed of the memory 5305b, temporarily stores information of operational states transmitted from the respective apparatuses, or information of an apparatus anomaly, or is used as work area for developing a program or process executed in the information terminal 5305. The memory space, which is dynamically assigned to the process, etc., which has been developed on the information storage unit 5502, is released when the process is terminated, and becomes usable when the other process is activated.

The secondary information storage unit 5503 is composed of the external storage unit 5305e such as a Flash ROM, and records information to be stored even when power is shut off in the information terminal 5305. Examples of the information include the terminal ID and password, which are authentication information for authenticating the information terminal 5305 by the server 5306, management information of the network-connected appliances, which are other parties to the communication, and information of apparatus anomaly, which has been provided by respective apparatus.

The processor for anomaly information 5504 receives and processes the apparatus anomaly information provided by the network-connected home appliance and equipment, which are connected by wireless communication; generates electronic text provided to the server 5306, and provides notification thereof to the server 5306 by the communicator 5500 via the Internet 5307. The server 5306 determines the details of the information of apparatus anomaly, and generates and replies with the coping method corresponding to the received anomaly information.

The timer 5505 measures time periods and time instances. When the anomaly information is received, the processor for anomaly information 5504 extracts time information and provides notification thereof with the received information of apparatus anomaly to the server 5306. Moreover, "electronic text for confirming operational state," which is polling electronic text for acquiring operational states of the respective apparatuses, is transmitted at regular time intervals upon measurement by the timer 5505.

The wireless communicator 5506 is composed of the wireless communicator 5305d, and transmits and receives the electronic text relating to anomaly information or various electronic texts for control of the network-connected home appliance via wireless communication. The wireless communication medium may be any of wireless LAN, Bluetooth®, specified low power wireless communication, PHS, etc. Moreover, the communication protocol may be any of Echonet or IP (Internet Protocol), etc.

In the second example, although not illustrated, the ISP is the Internet service provider, which provides service for the Internet connections. A communication protocol, TCP/IP, or HTTP, etc., generally used in the Internet, is used for communication. For the communication data, HTML, XHTML, XML, or Java®, etc., generally used in a WWW server on the Internet, is used. Image data or voice data does not depend on format, and any format generally used in the Internet may be included. The maintenance information and anomaly information, which are managed at the user's home, are transmitted to the server 5306.

Figure 57:
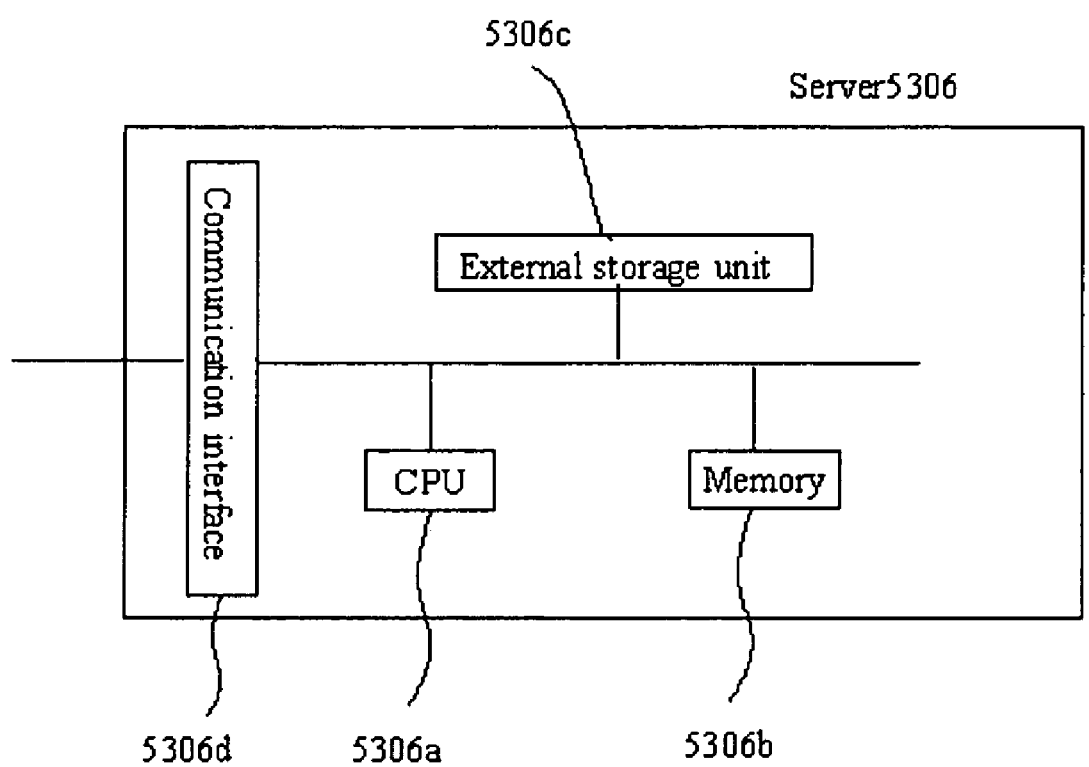
FIG. 57 is a block diagram of a server of the example of the present invention.
Figure 58:
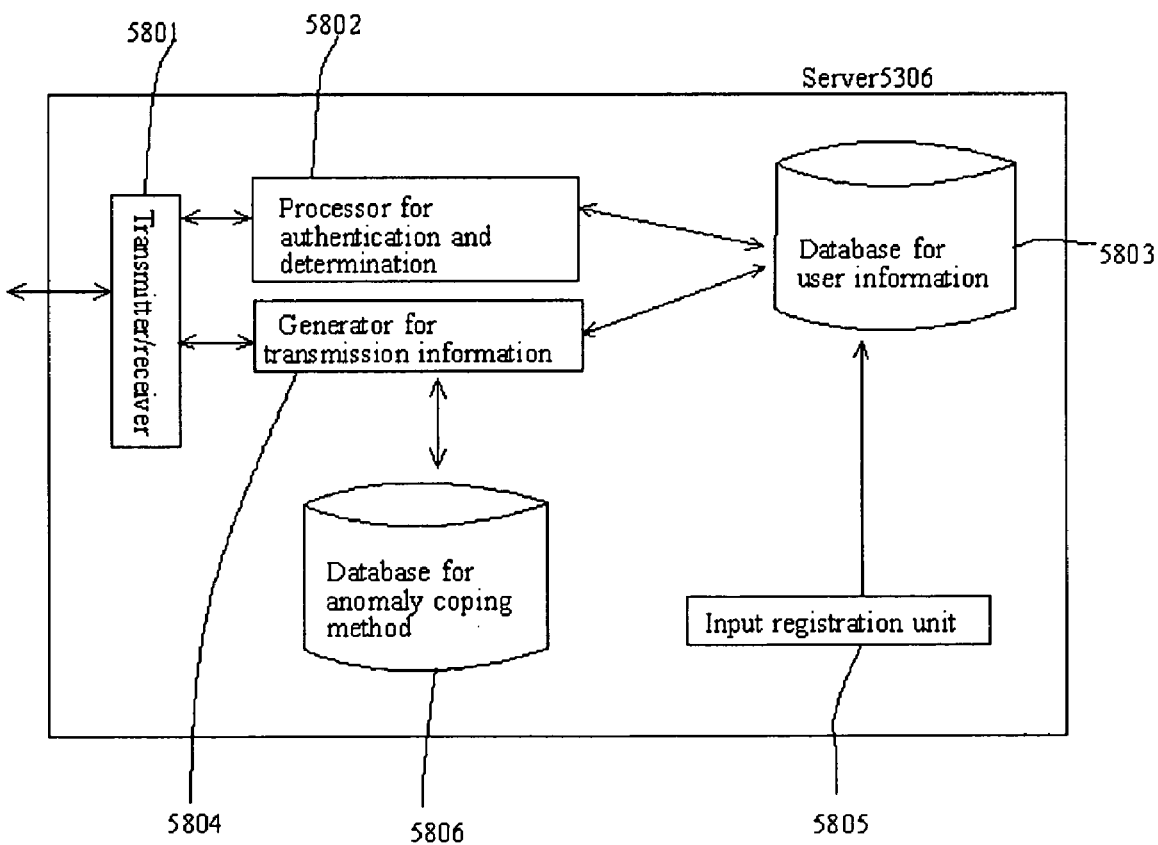
FIG. 58 is a functional block diagram of a server of the example of the present invention.

Meanwhile, the server 5306 determines the type of the authentication request or the notification of anomaly information from the information terminal 5305, which have been transmitted from said information terminal 5305, and transmits a reply to said electronic text. For the above purpose, as shown in FIG. 57, the server comprises hard resources, such as the CPU 5306a, the memory 5306b, the external storage unit 5306c, and the communication interface 5306d, and operates, as shown in FIG. 58, the transmitter/receiver 5801, the processor for authentication/determination 5802, the database for user information 5803, the generator for transmission information 5804, the input registration unit 5805, and the database for anomaly coping method 5806.

The transmitter/receiver 5801 establishes a state for transmission/reception between the information terminal 5305 and performs transmission/reception of information for a TCP/IP connection, such as the authentication request or the notification of anomaly information from the information terminal 5305 via the Internet 5307.

The processor for authentication/determination 5802 performs processing for authentication by comparing the terminal ID and password, which are authentication information of the information terminal 5305 and received from the information terminal 5305 upon authentication request, with the user information, which is managed by the database for user information 5803. Moreover, the type of the data is determined by the data identifier incidental to the data. The reception data of the second example includes providing the notification of the anomaly information other than the authentication information. After termination of authentication processing, if the notification of the anomaly information is received, the database for user information 5803 is detected by the attached user information, and communication history information of the user is recorded.

In the database for user information 5803 as described above, the user's name, address, region code, telephone number, the type of network-connected home appliance owned by the user, the network-connected home appliance ID, and history information of notification of respective network-connected home appliance, are recorded.

The generator for transmission information 5804 generates the electronic text for control in cases of performing control from the server 5306, the electronic text for reply corresponding to the electronic text provided by the user's information terminal 5305, or the transmission information in case of transmitting information. In the case of receiving the notification of anomaly information, the information of the anomaly display and coping method to the anomaly information corresponding to said anomaly information are generated, and transmitted to the information terminal 5305, which is the transmitter of said anomaly information. In the case of the electronic text for reply, the electronic text for reply to the user information or the terminal ID, etc., which are incidental to the received electronic text, is generated and transmitted. Moreover, in cases where an operator on the server side or a user using a mobile phone, etc., operates the server 5306, and controls the user's network-connected home appliance, the user's terminal ID and IP information are acquired from the database for user information 5803, the electronic text for transmission control is generated, and transmission is carried out.

The input registration unit 5805 performs registration, etc., of the user information by an operator. Moreover, command input for transmission of the electronic text for control to the network-connected home appliance owned by the user, or the electronic text for reading maintenance information stored by the information terminal 5305, is carried out.

In the database for anomaly coping method 5806, the apparatus anomaly information occurred in the network-connected home appliance and the network-connected equipment, and the coping method to said apparatus anomaly information are compiled in the database. By the anomaly number incidental to the electronic text relating to the anomaly information provided by the information terminal 5305, the details of the anomaly are detected in the database for anomaly coping method 5806 and the details information is acquired. In conjunction with this, said coping method to the anomaly is further detected and acquired.

Note that, although in FIG. 58, the server 5306 is illustrated as one apparatus, the server may be multiple servers, and the database for user information 5803 and the database for anomaly coping method 5806 may be other apparatuses and may be installed in other place. In addition, the database for user information 5803 may be used for management information of other service for the network-connected home appliance such as telecon service or security service.

In the second example, although the Internet 5307 is utilized as the communication medium for connection, if necessary, the connection may be carried out via an exclusive line or telephone line, and otherwise not limited to via the Internet 5307.

Next, the operation and effect of the method for carrying out notification of the network-connected home appliance in the system of the first example will be described.

The network-connected home appliances such as the washing machine 5301 or the microwave 5302, etc., does not operate unless they are used by the user. However, since it is necessary to confirm the operational state of the respective network-connected home appliances, the information terminal 5305 performs a polling transmission of the "electronic text relating to confirming operational state" at periodical timing, then acquires information on how the respective network-connected home appliances are operating at a periodical timing, records to the information terminal 5305, and provides information to the user. For example, "periodical" means that the electronic text for confirming the operational state is transmitted once every three hours to the respective network-connected home appliances and the operational states thereof are acquired in order.

In addition, with the function of managing the operational states of the network-connected home appliances by the information terminal 5305, the function of carrying out notification of an anomaly occurring in a network-connected home appliance to the server 4506 via the information terminal 5305, and the function of displaying explanation of the details of said anomaly to the user, are provided. Moreover, depending on the anomaly information, the coping method thereto is received from the server 5306 and displayed, thereby supporting the user to provide a coping method thereto. The anomaly information may include a minor anomaly, which is caused by the user's mistake in operation, and is easily addressed, and a serious anomaly, for example, a component failure, which requires support by a maintenance person, and history of respective anomaly is managed as the different anomaly by the server 5306, and one portion of the information thereof is managed by the information terminal 5305.

Figure 59:
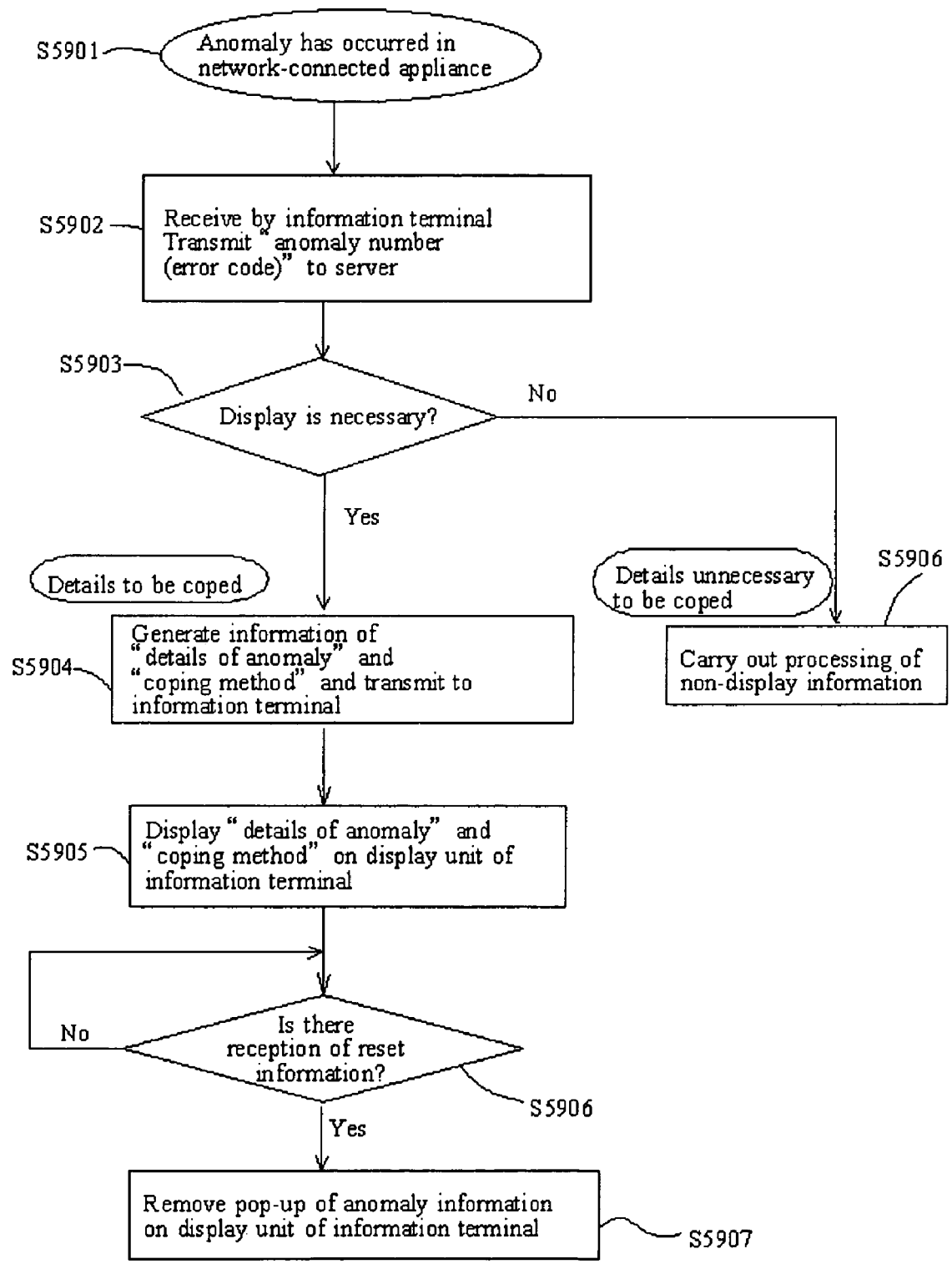
FIG. 59 is a flow chart of operations of functions of displaying and removing an anomaly display of the example of the present invention.

FIG. 59 is a flow chart of operations of displaying an anomaly and resetting when the anomaly occurs in the network-connected home appliance. FIG. 59 explains that the details of the anomaly information occurring in the network-connected home appliance are determined by the server 5306, and explanation of said anomaly information and the coping method thereto are displayed by the information terminal 5305.

In case of using the network-connected home appliance, for example, when operating the washing machine 5301 for washing, if an anomaly occurs in the washing unit 5602, the monitoring unit for operational state 5509 detects the anomaly, and the generator for electronic text relating to operational state 5601 generates electronic text with the "anomaly information number (error code)" of said anomaly state. Said electronic text is transmitted to the information terminal 5305 by the wireless communicator 5511 (step S5901).

After that, if the "electronic text relating to apparatus anomaly", which has been received by the wireless communicator 5506 of the information terminal 5305, is determined as the anomaly information by the processor for anomaly information 5504, it is stored in a certain area in the secondary information storage unit 5503 in the information terminal 5305. In addition, since the capacity of the storage area is limited, a number of storage of the history is preliminarily assigned. In this case, a minor anomaly and a serious anomaly are stored in separate areas in order to prevent the history information of the serious anomaly from being deleted even if many minor anomalies occur. Then, the electronic text relating to the anomaly is converted to electronic text form communicable with the server 5306 via the Internet 5307, and said anomaly information with the "anomaly information number" is transmitted to the server 5306 by the communicator 5500 (step S5902).

The server 5306 receives the electronic text from user's information terminal 5305 by the transmitter/receiver 5801, authenticates the user by the processor for authentication/determination 5802, and after the authentication of the terminal, determines the details of the received anomaly information. Then, by the "anomaly number" incidental to the anomaly information, the details of the anomaly are determined, and it is determined whether or not the anomaly information is to be displayed on the information terminal 5305 (step S5903).

Here, if there are details to be displayed for the user, the generator for transmission information 5804 acquires the information of the details of the anomaly and the coping method thereto corresponding to said details from the database for anomaly coping method 5806, and generates the transmission information to the information terminal 5305. Then, the transmitter/receiver 5801 transmits it as electronic text for a reply to the information terminal 5305 (step S5904). Here, depending on the details of the anomaly, there is a case in which the coping method to the anomaly is not transmitted, or a case that the anomaly display information is not transmitted.

Figure 60:
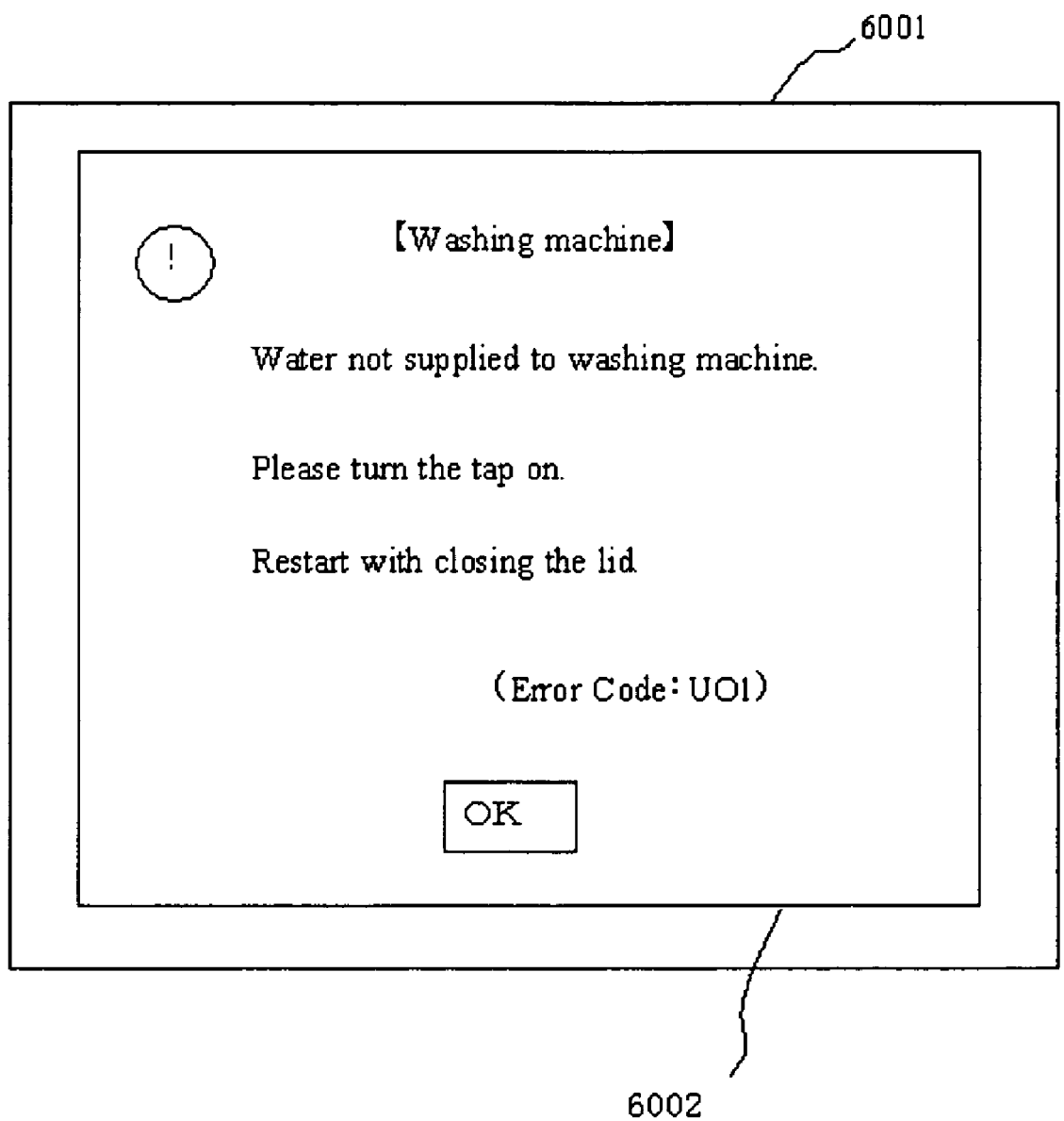
FIG. 60 is an illustration of a display panel of anomaly information of the example of the present invention.

Then, the communicator 5500 receives said electronic text for reply. The details of the display of said received details is acquired by the processor for anomaly information 5504, and displayed as anomaly information on the menu screen by the display unit 5501. For example, if failure of the washing machine 5301 is determined by the server 5306, as the anomaly display information, the message "Water not supplied to washing machine", etc., is transmitted, and as the information of the coping method to the anomaly, "Please turn the tap on. Restart with closing the lid" is displayed. FIG. 60 shows the display screen thereof displayed on the display screen 6001 as the pop-up for displaying anomaly 6002 (step S5905).

Then, the user watches the displayed information and resets the apparatus anomaly, and the information terminal 5305 expects the reception of the reset information from the home appliance which has carried out said notification of the anomaly (step S5906).

Note that, although the transmission of the reset information from the network-connected home appliance, which has provided the notification of the anomaly, is described in the second example, the reset information may be transmitted by the server 5306 or by the information terminal 5305. In addition, the reset information is electronic text indicating reset of the anomaly, and is transmitted to the information terminal 5305 if an operation of resetting the anomaly is carried out.

The user watches the details of the display of FIG. 60, turns on the tap connected to the washing machine 5301, and closes the lid, the monitoring unit of operational state 5509 of the washing machine 5301 detects said state, and the "reset information" is provided to the information terminal 5305. In the information terminal 5305, the "reset information" is determined and processed by the processor for anomaly information 5504, and if it is determined that it is the reset information, the pop-up (anomaly display) is removed (step S5907).

Figure 61:
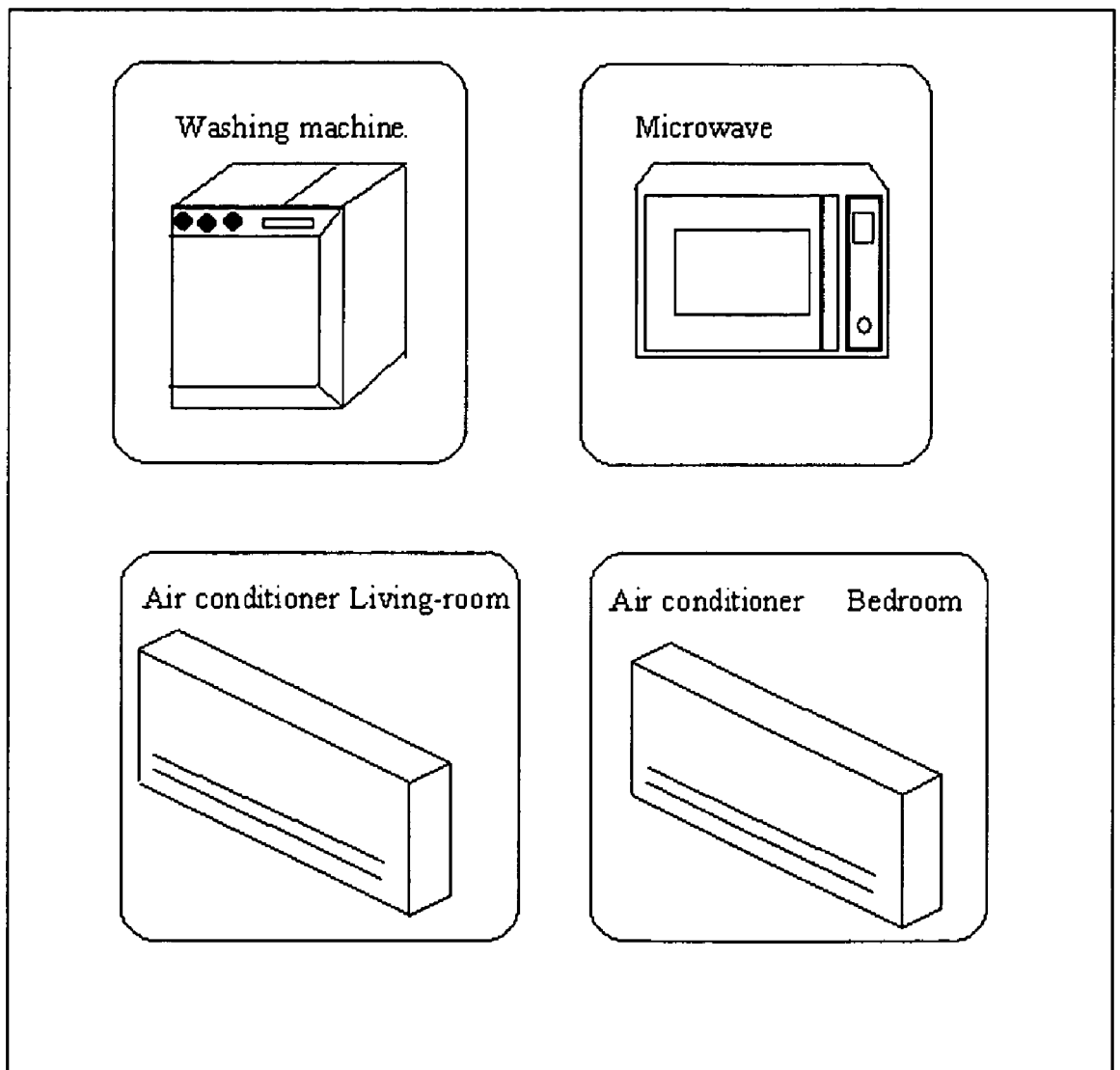
FIG. 61 is an illustration of a panel, from which a pop-up indicating an anomaly has been removed, of the example of the present invention.

Next, the menu screen (FIG. 61, 6101) is displayed, and the state is back to the normal usage condition.

In addition, if the server determines that the details are not to be displayed on the information terminal, non-display processing is carried out. In step S5903 of the flow chart of FIG. 59, it is determined by the anomaly number that display is unnecessary, the generator for transmission information 5804 of the server 5306 sets the "non-display information," and generates and transmits the electronic text for reply. The information terminal 5305, which has received that, acquires said details of information by the processor for anomaly information 5504, and does not display the pop-up if the non-display information is set. For the user, nothing is newly indicated, and just the menu screen is displayed (step S5908).

Next, storage and management of the history of the notified apparatus anomaly by the information terminal 5305 will be described. As described above, there are serious anomalies and minor anomalies. The minor anomalies are reset by the user in response thereto.

The respective apparatus anomalies are managed as shown in FIG. 62. FIG. 62 is a list of history of anomalies stored in the information terminal 5305. The anomalies are separately divided into the "serious anomalies 6201" or the "minor anomalies 6202," and managed, and stored in the information storage unit 5503. For example, 10 items are managed respectively, and if more than 10 items exist, the oldest details are deleted and the latest anomaly is added. By managing separately as described above, it becomes possible to prevent the history information of a serious anomaly from being deleted even if many minor anomalies often occur.

Note that, when the anomaly information is provided from the information terminal 5305 to the server 5306, all of the anomaly information with user information are recorded and managed in the database for user information 5803.

In addition, although in the first example, the case utilizing the specified low power wireless communication (429 MHz band) is described, the second example is not limited to this, and may be configured by utilizing a power line communication or wireless LAN (e.g. 802.11b) and be effective.

In addition, operations of the network-connected home appliances are different from each other, and the details of anomaly information and the determination process thereof are also different. Moreover, by setting on the server 5306 side, it becomes possible to changes handling of the display of details of the anomaly information, thereby enabling optional change from non-display to display of the anomaly. Furthermore, although the information terminal 5305 is not illustrated and has been described as to comprise the display unit, the display unit may be installed separately.

Note that, although it is described that the information terminal 5305 and the server 5306 are connected via the Internet, the second example is not limited to this, and the connection line may be a customer access line (telephone line), ISDN, ADSL, CATV, FTTH (optical cable), wireless LAN, or Ethernet®, etc.

In addition, the second example may be similarly configured as all or one portion of the method of the information terminal, or as a program for operating computer.

By being configured as a program, it becomes possible to be carried out as one of the functions of a micro computer, a personal computer, or other apparatus, thereby improving user-friendliness and versatility thereof, and enabling easy configuration of the system. Furthermore, by recording on the recording medium, or by distributing the program via the communication line, it becomes easy to distribute or install the program.

In addition, the concrete configurations of respective units are not limited to the above example, and may be embodied in various modifications without departing from the scope of the present invention.

As described above, according to the configuration of the second example, while the details of the apparatus anomaly provided by the network-connected home appliance is displayed by the pop-up, if the reset information indicating reset of the anomaly is received, the pop-up is removed; thereby making the reset of the anomaly noticeable to the user, and improving user-friendliness.

In addition, the information terminal manages and stores the history of the anomalies with respect to each priority of apparatus anomaly, so that it is possible to prevent the history information of a serious anomaly from being deleted even if many minor anomalies occur.

Moreover, by configuring as a program, or by carrying out as one of the functions of a micro computer, a personal computer, or other apparatus; it becomes possible to improve user-friendliness and versatility thereof, and to configure the system easily. Furthermore, by recording on the recording medium, or by distributing the program via the communication line, it becomes easy to distribute or install the program.

THE THIRD EXAMPLE

Another example of the present invention will be described. The details of the example will be described hereinafter.

The first aspect of the third example will explain implementation of the system for carrying out notification of a gas anomaly, which is a system comprising an information terminal, which communicates with a gas apparatus, manages and controls said a gas apparatus, wherein said information terminal provides notification of the anomaly, which has occurred in the gas apparatus; wherein in cases where the anomaly occurs in the gas apparatus, and the anomaly information is provided to the information terminal, a display indicating said details of the anomaly is displayed by pop-up, and in cases where the reset information is provided to the information terminal by the gas apparatus, which has provided notification of said anomaly, details of said pop-up are changed to the display indicating the reset of the anomaly, or the display is removed. According to the system for carrying out notification of a gas anomaly, the pop-up for carrying out notification of the anomaly is changed to the display indicating reset of the anomaly or removed, thereby making the reset of the anomaly noticeable to the user, and improving safety in using gas and user-friendliness. Note that the operation of this system for carrying out notification of the gas anomaly corresponds to the operation of the system by utilizing the information terminal of the third and fourth embodiment, as described above.

The second aspect of the third example will explain implementation of the system for carrying out notification of a gas anomaly, which is a system comprising an information terminal, which communicates with a gas apparatus, manages and controls said gas apparatus, wherein said information terminal provides notification of the anomaly, which has occurred in the gas apparatus; wherein in cases where the anomaly occurs in the gas apparatus, and the anomaly information is provided to the information terminal, a display indicating said details of the anomaly is displayed by pop-up, an operation for resetting the anomaly to the gas apparatus, which has provided notification of said anomaly, is executed by the information terminal, and if there is no re-notification of the anomaly during a predetermined period of time, the details of said pop-up are changed to a display indicating the reset of the anomaly, or the display is removed. According to this system for carrying out notification of a gas anomaly, wherein, if there is no re-notification of the anomaly during a predetermined period of time after operation of resetting the anomaly, it is determined that the anomaly has been reset; it becomes adaptable to a gas apparatus, which does not provide notification of the reset of the anomaly to the information terminal, thereby making the reset of the anomaly noticeable to the user. Note that the operation of this system for carrying out notification of a gas anomaly corresponds to the operation of the system by utilizing the information terminal of the fifth and sixth embodiment, as described above.

The third aspect of the third example will explain implementation of the system for carrying out notification of a gas anomaly as described in the above first or second aspect, which is a system, in which an information terminal is connected to a server of a center for monitoring the status of a gas apparatus; wherein the reset of the anomaly of the gas apparatus is executed from said server by communication via the information terminal, and if a reply to the reset of the anomaly indicates a success thereof, the details of said pop-up are changed to the display indicating the reset of the anomaly, or the display is removed. According to this system for carrying out notification of a gas anomaly, it becomes possible to reset the anomaly display of the information terminal by the operation of resetting the anomaly from the server of the center, thereby improving service for monitoring security of gas usage. Note that the operation of this system for carrying out notification of a gas anomaly corresponds to the operation of the system by utilizing the information terminal of the seventh embodiments, as described above.

The fourth aspect of the third example will explain implementation of the system for carrying out notification of a gas anomaly as described in the above first or second aspect, which is a system, in which an information terminal is connected to a server of a center for monitoring status of a gas apparatus; wherein if the anomaly, which has occurred in the gas apparatus, is displayed in the information terminal, the other information service provided by the information terminal becomes unavailable. According to this system for carrying out notification of a gas anomaly, by stopping the other information service during display of the gas anomaly, it becomes possible to require the user to address the gas anomaly, thereby improving safety in using gas.

The fifth aspect of the third example will explain implementation of the system for carrying out notification of a gas anomaly, the system for carrying out notification of a gas anomaly, in which an information terminal is connected to a server of a center for monitoring status of a gas apparatus in order to reset only a display of anomaly from the server of the center, wherein if the anomaly information occurring in the gas apparatus is displayed in the information terminal, the display of details of said pop-up is changed to the display indicating reset of the anomaly, or the display is removed by the operation for resetting the display of anomaly from the server. According to this system for carrying out notification of a gas anomaly, under management by the server of the center, it becomes possible to use the service by utilizing the information terminal even when the gas anomaly occurs, thereby improving user-friendliness. Note that the operation of this system for carrying out notification of a gas anomaly corresponds to the operation of the system by utilizing the information terminal of the eighth embodiment, as described above.

The sixth aspect of the third example will explain implementation of the apparatus for carrying out notification of a gas anomaly, which is an information terminal comprising:
    a communicator, which communicates management information and control information with the gas apparatus,
    a processor for anomaly information, which receives the anomaly information about the gas apparatus and executes displaying a screen or removing a screen according to the details thereof, and
    a display unit, which displays said anomaly information; wherein
    in cases where the anomaly occurs in the gas apparatus, and is notified to the information terminal, the display indicating said details of the anomaly is displayed on said display unit by pop-up, and
    in cases where the reset information is provided to the information terminal by the gas apparatus, which has provided the notification of said anomaly, the details of said pop-up are changed to a display indicating reset of the anomaly, or the display is removed. According to this apparatus for carrying out notification of a gas anomaly, the pop-up for carrying out notification of the anomaly is changed to the display indicating reset of the anomaly or removed, thereby making the reset of the anomaly noticeable to the user, and improving safety in using gas and user-friendliness. Note that this apparatus for carrying out notification of a gas anomaly corresponds to the information terminal of the third and fourth embodiments, as described above.

The seventh aspect of the third example will explain implementation of the apparatus for carrying out notification of a gas anomaly, which is an information terminal comprising:
    a communicator, which communicates management information and control information with the gas apparatus,
    a processor for anomaly information, which receives the anomaly information about the gas apparatus and executes displaying a screen or removing a screen according to the details thereof,
    a display unit, which displays said anomaly information, and
        an operation unit for controlling the gas apparatus; wherein
        in cases where the anomaly occurs in the gas apparatus, and is notified to the information terminal, the display indicating said details of the anomaly are displayed on said display unit by pop-up, an operation for resetting the anomaly to the gas apparatus, which has provided notification of said anomaly, is executed by the information terminal, and if there is no re-notification of anomaly to the information terminal during a predetermined period of time, the details of said pop-up are changed to a display indicating reset of the anomaly, or the display is removed. According to this apparatus for carrying out notification of a gas anomaly, wherein, if there is no notification of the anomaly during a predetermined period of time after the operation of resetting the anomaly, it is determined that the anomaly has been reset; it becomes adaptable to a gas apparatus, which does not provide notification of reset of the anomaly to the information terminal, thereby making the reset of the anomaly noticeable to the user. Note that this apparatus for carrying out notification of a gas anomaly corresponds to the information terminal of the fifth and sixth embodiments, as described above.

The eighth aspect of the third example will explain implementation of the apparatus for carrying out notification of a gas anomaly, which is an information terminal comprising a center communicator, which communicates with a server of a center for monitoring status of the gas apparatus, causes a processor for the anomaly information of said information terminal to execute processing for resetting the anomaly of the gas apparatus by a communication from the server, and if the reply to said reset of the anomaly, which indicates the success thereof, is received, the details of said pop-up are changed to the display indicating the reset of the anomaly, or the display is removed. According to this apparatus for carrying out notification of the gas anomaly, it becomes possible to reset the anomaly display of the information terminal by the operation of resetting the anomaly from the server of the center, thereby improving service for monitoring security of gas usage. Note that this apparatus for carrying out notification of a gas anomaly corresponds to the information terminal of the seventh embodiment, as described above.

The ninth aspect of the third example will explain implementation of the apparatus for carrying out notification of a gas anomaly, which is an information terminal comprising a center communicator, which communicates with a server of a center for monitoring status of the gas apparatus, wherein, while the anomaly occurring in the gas apparatus is displayed in the information terminal, the processor for anomaly information of the information terminal makes other information services provided by the information terminal unavailable. According to this apparatus for carrying out notification of a gas anomaly, by stopping the other information services during display of a gas anomaly, it becomes possible to require the user to address the gas anomaly, thereby improving safety in using gas.

The tenth aspect of the third example will explain implementation of the apparatus for carrying out notification of a gas anomaly, which is an information terminal comprising a center communicator, which communicates with a server of center monitoring status of the gas apparatus, wherein, while the anomaly occurring in the gas apparatus is displayed in the information terminal, if the processor for the anomaly information receives the information of resetting the display of the anomaly from the server, the display of details of said pop-up is changed to a display indicating a reset of the anomaly, or is removed. According to this apparatus for carrying out notification of a gas anomaly, by an operation for resetting only the display of anomaly from the server, it becomes possible to use the services by utilizing the information terminal under management by the server of the center, even when the gas anomaly occurs, thereby improving user-friendliness. Note that this apparatus for carrying out notification of gas anomaly corresponds to the information terminal of the eighth embodiment, as described above.

The eleventh aspect of the third example will explain implementation of the method for carrying out notification of anomaly, comprising an information terminal, which communicates with a gas apparatus and manages and controls said apparatus, comprising:

a step of transmitting anomaly information to in information terminal upon occurrence of anomaly in a gas apparatus, a step of displaying pop-up of details of the anomaly on a display unit of the information terminal upon receiving the anomaly information, and a step of changing details of the pop-up to the display indicating the reset of the anomaly, or of removing the display when the reset information is provided to the information terminal by the gas apparatus, which has provided notification of said anomaly. According to this method for carrying out notification of a gas anomaly, the pop-up for carrying out notification of the anomaly is changed to the display indicating reset of the anomaly, or removed, thereby making the reset of the anomaly noticeable to the user, and improving safety in using gas and user-friendliness. Note that this method for carrying out notification of a gas anomaly corresponds to the operation of the information terminal of the third and fourth embodiments, as described above.

The twelfth aspect of the third example will explain usage of the method for carrying out notification of an anomaly, which communicates with a gas apparatus and manages and controls said apparatus, comprising:

a step of transmitting anomaly information to an information terminal upon occurrence of an anomaly in a gas apparatus, a step of displaying a pop-up of details of the anomaly on the display unit of the information terminal upon receiving the anomaly information, and a step of operating reset of the anomaly to the gas apparatus, which has provided notification of said anomaly by the information terminal, and a step of changing the details of said pop-up to a display indicating the reset of the anomaly, or of removing the display, if there is no re-notification of the anomaly to the information terminal during a predetermined period of time. According to this method for carrying out notification of a gas anomaly, wherein if there is no notification of the anomaly in the information terminal during a predetermined period of time after the operation of resetting the anomaly, it is determined that the anomaly has been reset; it becomes adaptable to a gas apparatus, which does not provide notification of reset of the anomaly to the information terminal, thereby making the reset of the anomaly noticeable to the user. Note that this method for carrying out notification of a gas anomaly corresponds to the operation of the information terminal of the fifth and sixth embodiments, as described above.

The thirteenth aspect of the third example will explain usage of the method for carrying out notification of a gas anomaly of the system, in which an information terminal is connected to a server of a center for monitoring status of a gas apparatus; comprising:

a step of resetting of the anomaly of the gas apparatus by communication via the information terminal, and a step of changing the display of details of said pop-up to display indicating reset of the anomaly, or of removing, if a reply to reset of the anomaly indicates success thereof. According to this method for carrying out notification of a gas anomaly, it becomes possible to reset the anomaly display of the information terminal by the operation of resetting the anomaly from the server of the center, thereby improving service for monitoring security of gas usage. Note that this method for carrying out notification of a gas anomaly corresponds to the operation of the system including the information terminal of the seventh embodiment, as described above.

The fourteenth aspect of the third example will explain usage of the method for carrying out notification of a gas anomaly comprising:

a step of making the other information service provided by the information terminal unavailable, if the anomaly, which has occurred in the gas apparatus, is displayed in the information terminal. According to this method for carrying out notification of a gas anomaly, by stopping the other information service during display of a gas anomaly, it becomes possible to require a user to address the gas anomaly, thereby improving safety of gas usage.

The fifteenth aspect of the third example will explain usage of the method for carrying out notification of a gas anomaly of the system, in which an information terminal is connected to a server of a center for monitoring status of a gas apparatus, comprising:

a step of changing the display of details of said pop-up to a display indicating a reset of the anomaly, or removing the display by an operation for resetting the display of the anomaly from the server, if the anomaly information occurring in the gas apparatus is displayed in the information terminal. According to this method for carrying out notification of a gas anomaly, only the display of the anomaly is removed by the server of the center, so that it becomes possible to use the service by utilizing the information terminal under management by the server of the center even when the gas anomaly occurs, thereby improving user-friendliness. Note that this method for carrying out notification of a gas anomaly corresponds to the operation of the system including the information terminal of the eighth embodiment, as described above.

Figure 63:
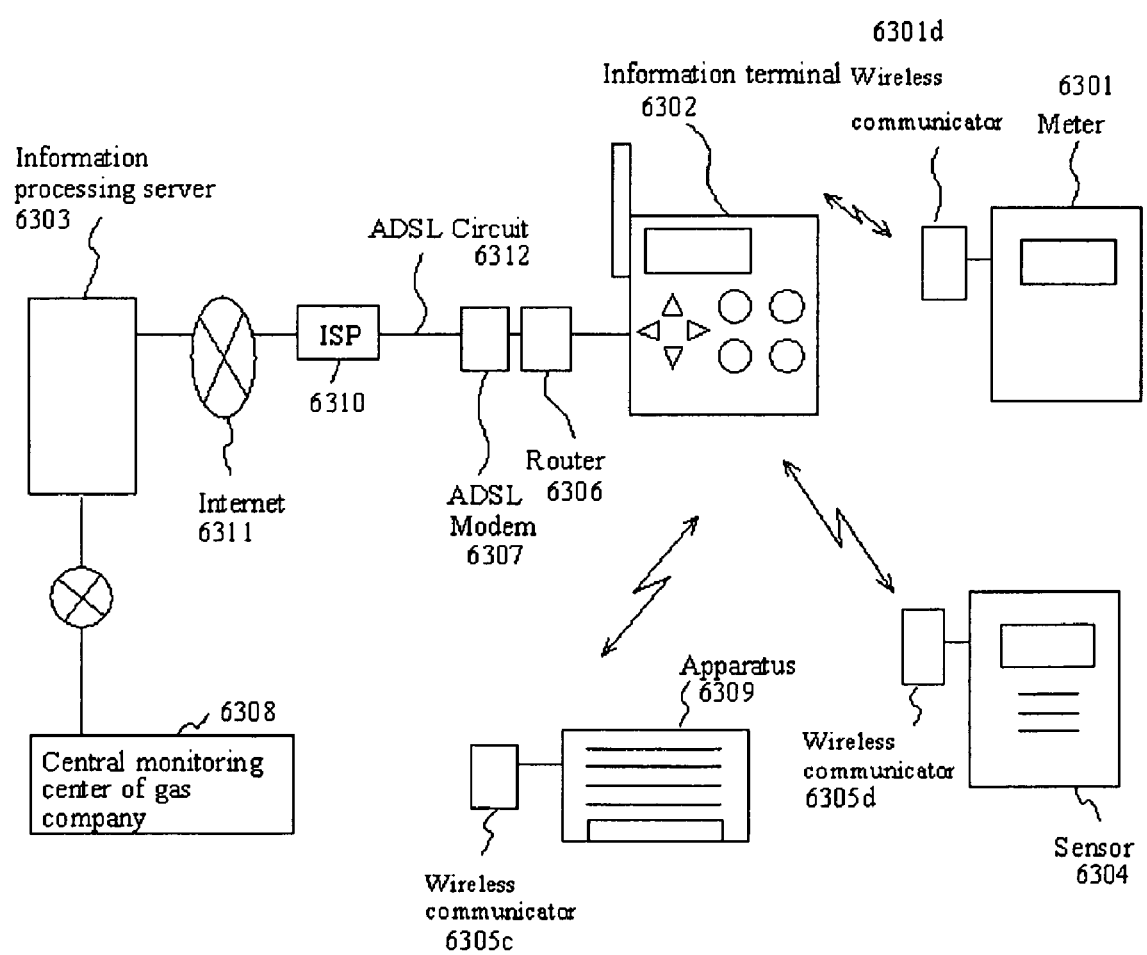
FIG. 63 is a block diagram of a system for carrying out notification of a gas anomaly of the example of the present invention.

In the system as shown in FIG. 63, the information terminal 6302, which is placed in a home and possesses a function of communication via a LAN, possesses the function of communicating with the meter 6301, the sensor 6304, and the apparatus 6309, communicates the information of meter-reading and the anomaly information to the server 6303 of the service provider via the information terminal 6302, thereby providing the monitoring service of gas safety or the information service. The information processing server 6303 and the central monitoring center of a gas company 6308 are connected and communicate with each other the information of meter-reading and the gas anomaly information via the communication line, or the control information of an apparatus and information of the state of the apparatus etc. via the wireless communication.

In addition, the information terminal 6302 possesses the function of acquiring content information from the information processing server 6303, or configuration information, etc., to the information terminal 6302, and the function of displaying various anomaly information such as a gas anomaly, in the information terminal 6302, or of providing notification to the information processing server 6303 in conjunction with providing the information service by the acquired information. Moreover, the information terminal 6302 possesses the function of periodically downloading the content information or the configuration information from the information processing server 6303 at a specified date and time.

Here, the configuration information corresponds to the information configured to the information terminal, for example, URL of the content, date and time information for periodically acquiring content, ID or password, which is user authentication information for using the application function of the information processing server 6303.

Furthermore, examples of the configuration information include apparatus ID information, communication conditions such as wireless communication channels, intermittent reception interval, or transmission time, etc., for wireless communication, communication destination for communicating a detected anomaly, and operation conditions defining the operation of the information terminal 6302, moreover, configuration of notification or non-notification for gas anomaly information, and configuration information of control defining details of the notification.

In addition, the meter 6301, the sensor 6304, and the apparatus 6309, to which the wireless communicator 6301*d*, 63005*d*, and 6305*c* performing wireless communication with the information terminal 6302 via specified low power wireless communication (400 MHz band) are respectively connected, communicates with the information terminal 6302. Then, the information terminal 6302 is connected to the router 6306 via a LAN communication I/F, and is further connected from the router 6306 to the ADSL modem 6307 and to the ISP 63010 via the ADSL line 6312, and communicates the information of meter-reading or the gas anomaly information etc. to the information processing server 6303 via the Internet 6311.

The information terminal 6302 of this system possesses the function of communicating sensing information, control information, and state information with the meter 6301, which is a gas meter for measuring gas usage and anomalies in using gas, the sensor 6304 such as an intruder sensor for detecting an intruder, human sensor, fire sensor, gas leakage sensor, CO (carbon monoxide) sensor, and the apparatus 6309 such as a washing machine, a rice cooker, a microwave, a refrigerator, an air conditioner, a water heater, and a cleaner.

In addition, this information terminal 6302 possesses following functions:

displaying content information, such as product information for electronic ordering, mail information for a user, advertising information, cooking recipe, regional information;

carrying out notification of anomaly information transmitted from the meter 6301 or the sensor 6304 such as gas security information for providing an alarm for gas leakage, etc., or security information involving intruder detection for providing notification of an intruder in the house; and displaying ON/OFF control or operational state of the apparatus 6309.

Next, the respective apparatuses in the house will be described.

The meter 6301, which is placed at the respective house or multi dwelling houses, etc., possesses a function of outputting the anomaly information such as gas leakage, and the information of meter-reading to the information terminal 6302. Concretely speaking, although not illustrated, at least a gas pipe with a gas valve, an electromagnetic valve for the gas valve, an automatic gas cut-off mechanism, and an automatic meter-reading mechanism are provided inside. The automatic gas cut-off mechanism possesses a functional algorithm for automatically shutting off the gas valve in case of detecting an anomaly, such as gas leakage, etc., and the automatic meter-reading mechanism measures gas flow in the gas pipe, converts it to the electrical data, and outputs it, thereby enabling meter-reading.

Figure 64:
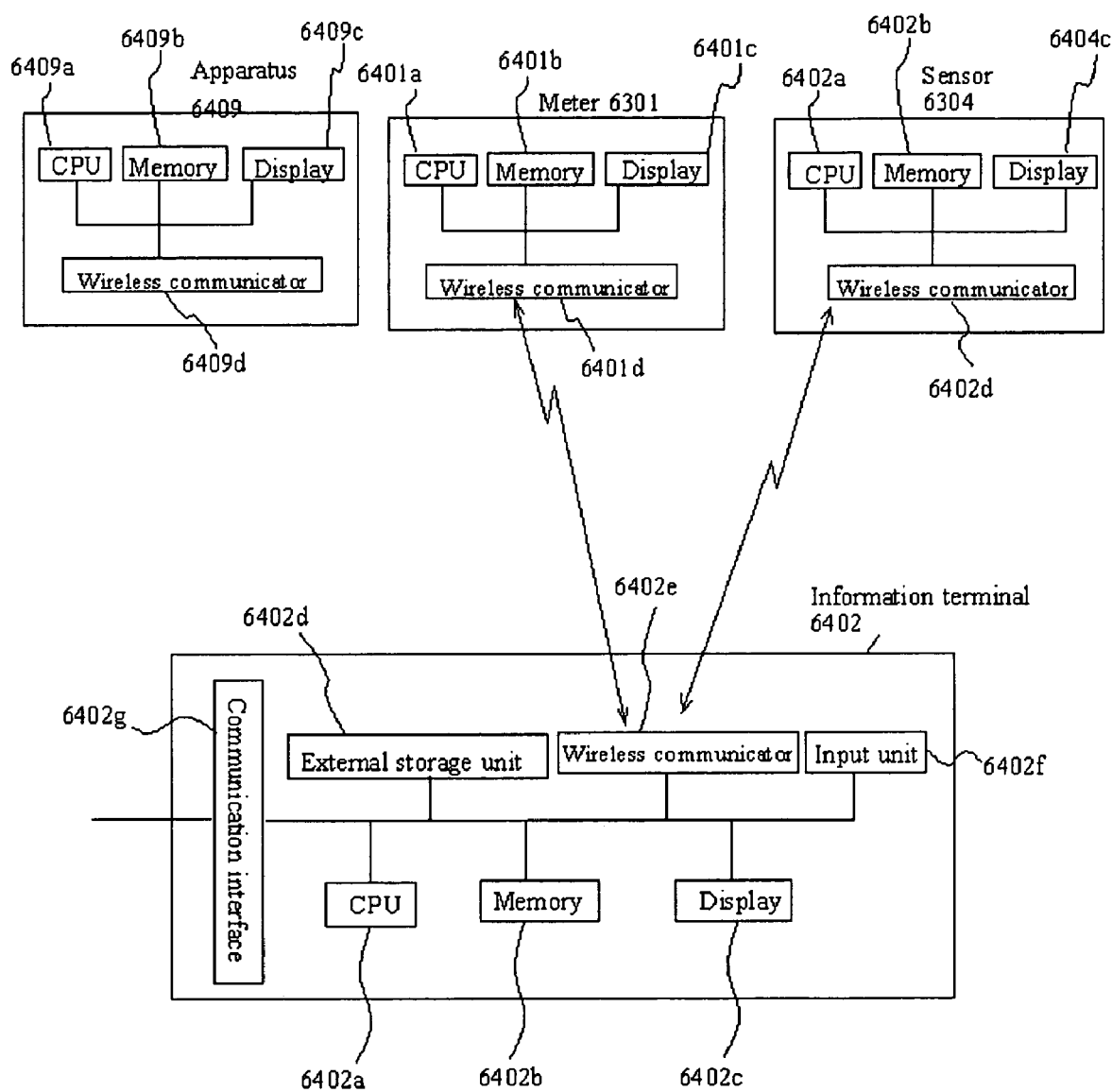
FIG. 64 is a block diagram of an information terminal, gas meter, and a home appliance of the example of the present invention.

Moreover, in order to carry out at least the transmission process of the information of automatic meter-reading or the calling process relating to gas leakage anomaly, the meter 6301, as shown in FIG. 64, comprises necessary hard resources, such as the CPU 6401*a*, the memory 6401*d*, the sensor 6401*c*, such as the pressure sensor for monitoring pressure of the gas supply and a seismo-sensor for detecting earthquake, and the wireless communicator 6401*d*. The wireless communicator 6401*d* is placed within effective transmission range, in which wireless communication with the wireless communicator 6402*e* in the information terminal 6302, which will be described hereinafter, is possible. Note that the wireless communicator 6301*d*, although not illustrated, may be placed separately from the meter 6301.

The information terminal 6302 is placed in the house (preferably, around the kitchen), and receives content information, apparatus anomaly information, operating information of the apparatus, sensing information, etc., performs processing thereof, and according to details of information, carries out storage in the information terminal 6302, and performs notification to the information processing server 6303. Furthermore, the WWW serer function is provided by the information processing server 6303; and by utilizing said function, the following function is provided: transmitting various configurations and the control information of the meter 6301, the sensor 6304, and the apparatus 6309, which are inside the house, from a personal computer, mobile phone, or PDA, which are outside of the house, to the information terminal 6302; thereby enabling configuring and controlling the apparatus inside the house via the information terminal 6302.

In addition, as shown in FIG. 64, the information terminal 6302 comprises hard resources such as the display 6402*c*, the input unit 6402*f*, which is a user interface, such as a button or touch panel, etc., the wireless communicator 6402*e*, and the communication interface 6402*g* such as Ethernet®, in addition to the CPU 6402*a*, the memory 6402*b*, and the external storage unit 6402*d* such as Flash ROM (Read Only Memory), ROM, HDD (Hard Disk Drive); and makes them perform; thereby operating the transmitter/receiver 6500, the determination unit for communication processing 6501, the information storage unit 6502, the secondary information storage unit 6503, the processor for anomaly information 6504, the processor for authentication information 6505, the display unit 6506, the operation unit 6507, the wireless communicator 6508, and the processor for anomaly information 6509.

Figure 65:
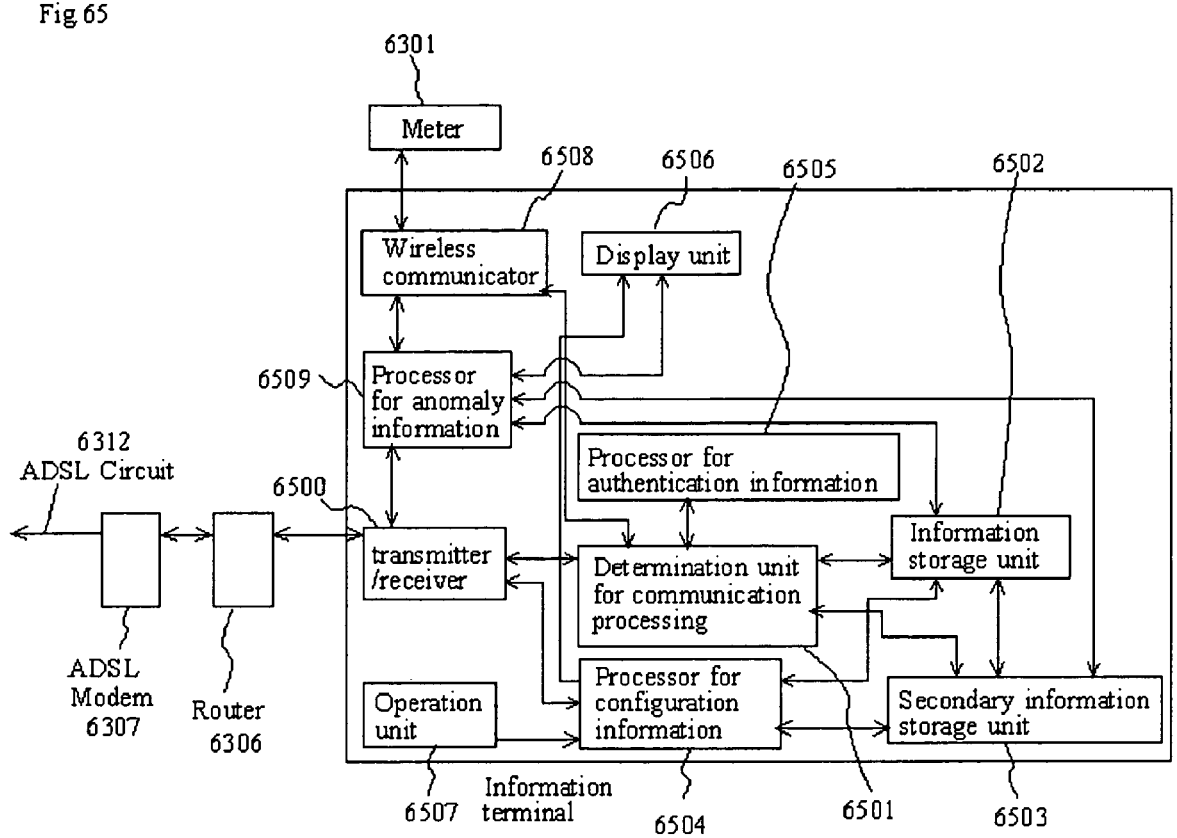
FIG. 65 is a functional block diagram of an information terminal of the example of the present invention.
Figure 66:
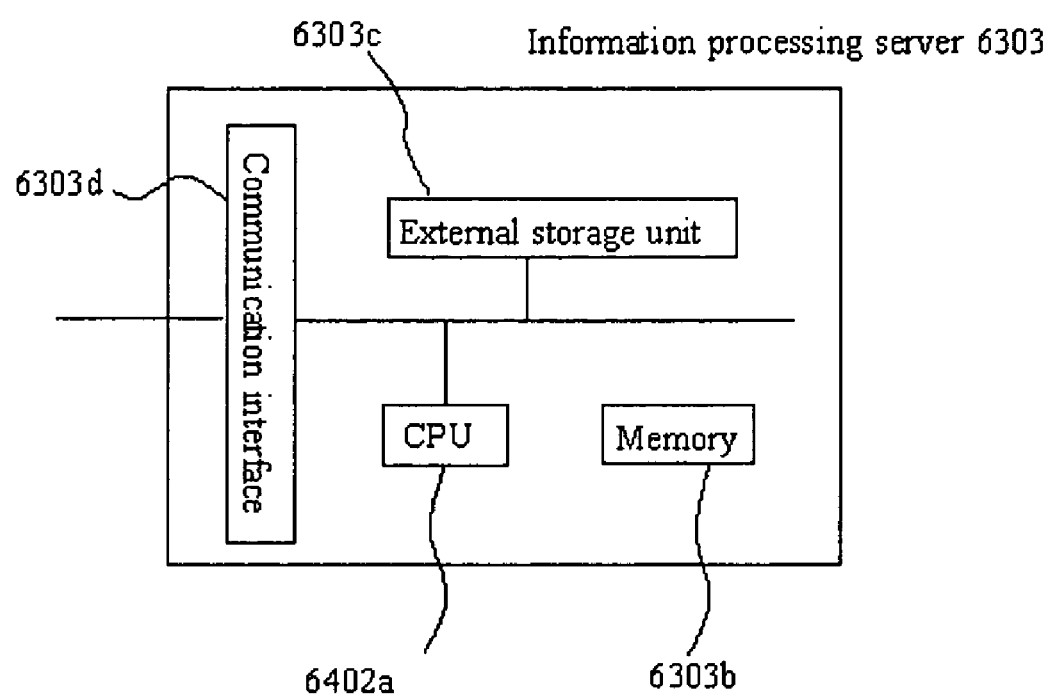
FIG. 66 is a block diagram of an information processing server of the example of the present invention.

The transmitter/receiver 6500 connects the information terminal 6302 to the external communication network, such as the Internet or the telephone line 6312, and as shown in FIG. 66, establishes a state, in which data transmission/reception is possible with the information processing server 6303. Concretely speaking, in FIG. 65, the transmitter/receiver 6500 comprising a LAN I/F of Ethernet® generates information for transmitting the gas anomaly information or the information of reset of a gas anomaly, etc., which has been received from the meter 6301, over various protocols used in the Internet; connects to the ISP (Internet Service Provider) 6310 over PPPoE or PPPoA via the ADSL line 6312 by utilizing the router 6306 and the ADSL modem 6307; then, makes a TCP/IP connection to the information processing server 6303 via the Internet; and transmits said gas anomaly information or the information of the reset of the gas anomaly, etc., to the information processing server 6303 by utilizing HTTP or HTTPS protocol.

In HTTPS, the information to be transmitted is encrypted by SSL in order to prevent interception.

The determination unit for communication processing 6501 provides the function of receiving the content information and the configuration information, which are transmitted from the information processing server 6303 using a TCP/IP connection via the Internet 6311. Moreover, the function of transmitting the apparatus information, which is notified by the meter 6301, the sensor 6304, and the apparatus 6309, etc., to the information processing server 6303 is provided. Furthermore, if disconnection occurs in the Internet 6311, a retry process is carried out.

The information storage unit 6502, which is composed of the memory 6402b, as described above, temporary stores information of operational state, or information of apparatus anomaly, or is used as work area for developing program or processing executed in the information terminal 6302. The memory space, which is dynamically assigned to process etc., which has been developed on the information storage unit 6502, is released when the process is terminated; and becomes usable when the other process is activated.

The secondary information storage unit 6503 is composed of the external storage unit 6402d, such as a Flash ROM. The content information, the configuration information, and the authentication information etc., which are temporarily stored in the information storage unit 6502 by the processor for downloading (not illustrated), is processed to be usable by the user, and is stored in the secondary information storage unit 6503, so that the information is preserved even if power fails.

The processor for anomaly information 6504 reads out configuration information, such as content URL, user authentication ID, password of the application server configured to the information terminal 6302 from the information storage unit 6502 or the secondary information storage unit 6503, and uses this information. Moreover, type and ID of the terminal, which communicates with the information terminal 6302, are read out as the configuration information, and it is determined whether or not notification of the information provided by the sensor 6304 is carried out on the control screen or the display screen of the operational state of the apparatus 6309 based on the configuration information.

In addition, a determination process relating to the flag information to the information terminal 6302 is carried out. The flag information is information for managing predetermined events. In this system, the gas anomaly flag (or the information service stop flag) is provided, and if the gas anomaly information is received, this flag is set and is not put down until reception of the information of the reset of the gas anomaly. If the gas anomaly flag is set, some of information services and the control function for the apparatus 6309 and the sensor 6304 are stopped. Said flag information is recorded on the non-versatile memory (the secondary storage unit 6503), so that the flag information is stored even if power fails.

The processor for authentication information 6505 carries out authentication by transmitting authentication information (user ID and password), which is requested from the information processing server 6303, and if the control information from the information processing server 6303 is received, performs a server authentication in order to determine whether or not the access is from an authenticated server.

The display unit 6506 is composed of the display 6402c, and displays a shopping menu used by user, advertising information, the gas anomaly information provided by the meter 6301, the security anomaly information such as the intruder detection provided by the sensor 6304, the gas anomaly, and the emergency call, by the pop-up; or displays operational information of the apparatus 6309, or the sensing information, etc., thereby providing information to the user.

The operation unit 6507 enables optionally inputting using a button, a touch panel, etc., composing the input unit 6402f, and enables operation for acquiring the details of content or operation for pressing an emergency button, etc., Then, if the operation for acquiring the details of content or operation for pressing the emergency button, etc., is provided, according to the operation, the information for carrying out notification of the details of the content or the anomaly is outputted to the display unit 6506 composing the display 6402c. Moreover, the control operation to the apparatus 6309 is possible, for example, ON/OFF of operation or up/down of temperature of air conditioner etc.

The wireless communicator 6508, which composes the wireless communicator 6402e, communicates the anomaly information, information of a change of state, or the operational information, etc., as described above, which are detected by the wireless communicator 6301d, 6304d, 6309d (FIG. 64) of the meter 6301, and by the sensor 6304, the apparatus 6309, and the sensor 6401c, 6404c, and 6409c (FIG. 64). Moreover, in the meter 6301, the value of meter-reading is transmitted from the wireless communicator 6301d to the wireless communicator 6402e.

The processor for anomaly information 6509 displays the anomaly information such as the gas anomaly, the intruder detection information detecting an intruder in the house, the emergency call information, and the fire alarm information, which are detected by the meter 6301, and by the sensor 6401c and the sensor 6404c of the sensor 6304, on the display unit 6506, or provides notification thereof to the information processing server 6303 via the transmitter/receiver 6303, and the Internet 6311. Moreover, if the apparatus 6309 breaks down and needs maintenance, determination is carried out in the apparatus and the determination relating to the failure is displayed in the information terminal 6302, and informed to a prescribed maintenance agent or repair agent, etc.

Meanwhile, the information processing server 6303 determines the type of the anomaly information transmitted from said information terminal 6302, and transmits the instruction information in response to the anomaly information or the termination information for terminating the notification of the anomaly information. For this purpose, as shown in FIG. 66, the information processing server 6303 comprises hard resources, such as the CPU 6303a, the memory 6303b, and the external storage unit 6303c, and the communication interface 6303d; and makes them perform; thereby operating the transmitter/receiver 6701, the determination unit for reception data 6702, the management unit for user information 6703, the database for user information 6704, the generator for transmission data 6705, the database for content information 6706, and the input unit for configuration 6707.

The transmitter/receiver 6701 transmits/receives various information with the information terminal 6302, when the TCP/IP connection is established from the information terminal via the Internet 6311. Moreover, although not illustrated in the third example, the transmitter/receiver is connected to the Internet 6311 via the router 6306. Moreover, there is a case where the modem intervenes depending on communication line.

The determination unit for reception data 6702 determines the type of data received from the information terminal 6302 according to the data identifier incidental to the data. The reception data of the third example includes communication information, such as anomaly information and the meter-reading information. Concretely speaking, in the predetermined storage area, the data identifier and the processing command corresponding thereto are stored in pairs, and the management unit for user information 6703 extracts and carries out the processing command corresponding to the data identifier of the received data.

In addition, if the received data is meter-reading information, the management unit for user information 6703 compiles the value thereof in the database for user information 6704. Meanwhile, if the data is gas anomaly information, the history thereof is similarly compiled in the database for user information 6704, and said details is notified to the information processing server 6303 and to the central monitoring center 6308 connected thereto. The central monitoring center 6308 copes to the gas anomaly according to said information.

The generator for transmission data 6705 comprises data generating program in appropriate storage area such as the memory 6403b or the external storage unit 6403c etc., and if the meter processing command, which has been configured preliminarily, is executed as a condition of start, the CPU 6403a reads out the data generating program from said storage area, and generates information to be transmitted to the information terminal 6302 according to this program. The transmission information to be generated corresponds to the configuration information or the control information for the information terminal 6302, the meter 6301, the apparatus 6309, or the sensor 6304, moreover, to the content information to be downloaded to the information terminal 6302.

The database for contents information 6706 possesses the function of compiling the content information such as daily information, region information, advertising information, which are utilized by the information terminal 6302, and further possesses a WWW server function, thereby compiling content of HTML, or image information.

The determination unit for reception data 6702 determines the type of data received from the information terminal 6302 according to the data identifier incidental to the data. The reception data of the third example includes content requesting data, which is transmitted based on the operation for using content by the user.

The input unit for configuration 6707 inputs the configuration information to the meter 6301, the information terminal 6302, the sensor, and the apparatus 6309 etc., which are configured to respective users, to the database for contents information 6706 of the information processing server 6303. The input unit for configuration 6707 is composed of an input device such as a key board, a mouse, and a touch panel, etc. In cases where the administrator of the gas company changes the configurations of date and time of meter-reading, etc., of the user's meter 6301, information of date and time to be changed is inputted to the item of the user to be changed by the input unit for configuration 6707. The inputted information is registered to the database for contents information 6705. Then, the information terminal 6302 carries out calling process at periodical timing for updating or upon command, so transmits said configuration information to the information terminal 6302 via the Internet 6311.

Figure 67:
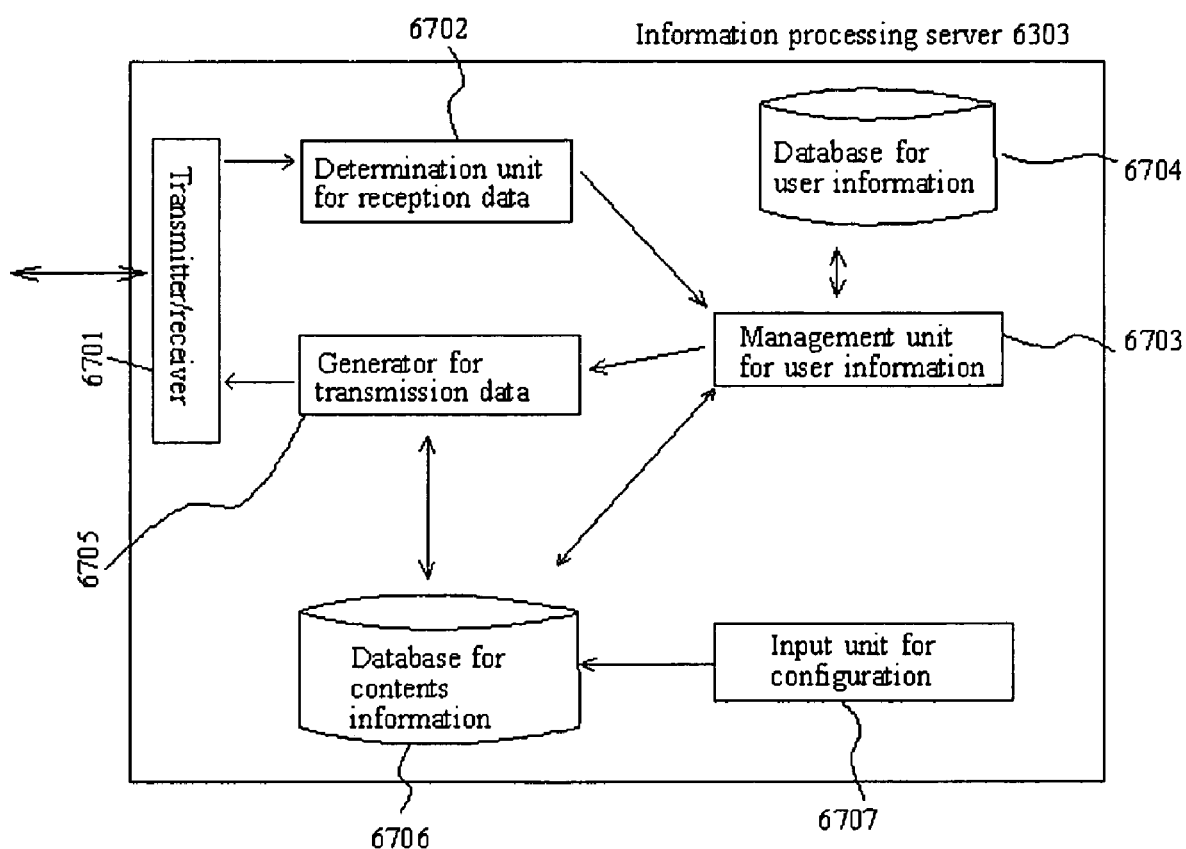
FIG. 67 is a functional block diagram of an information terminal of the example of the present invention.

Note that, although in FIG. 67, the information processing server 6303 is illustrated as one apparatus, there may be multiple servers.

In the third example, although the connection is established via the Internet 6311 as a communication medium, if necessary, the configuration, in which the connection is established via the telephone line, may be allowed, and the communication medium is not limited to the Internet 6311.

Next, the operation and the function of the anomaly display and the reset of the anomaly display of the system for monitoring security of gas in the third example will be described using the flow chart of FIG. 68.

If the gas anomaly is detected by the inside sensor of the meter 6301 (gas meter), the meter 6301 changes the flag to ON, wherein the flag is a flag of an anomaly flag table of the anomaly information managed by the meter 6301. Then, the calling process is carried out using a wireless communication in order to provide notification of the occurrence of the gas anomaly to the central monitoring center 6308 of a gas agency (step S6801).

By the calling process using the wireless signal, the information terminal 6302 is caused to receive said anomaly information. Then, the determination process for the received details is carried out, and the information terminal 6302 carries out a determination as to whether or not the details are to be provided to the user. The determination process is performed by the processor for anomaly information 6509 in FIG. 3, and depending on the details, said details of information is appropriately stored in the information storage unit 6502 or the secondary information storage unit 6503 (the step S6802).

Here, in case of a gas shut off event, in which the meter 6301 determines that the details of the anomaly indicate an occurrence of a gas anomaly and shuts off the gas, the user cannot use gas, at the same time, there is a risk of a serious gas anomaly, so that it is necessary to provide the details to the user. In the event determined above, specifically, when there is a gas shut-off event, the information terminal 6302 determines that it is necessary to provides notification to the user, and performs an anomaly display (the step S6803).

Note that, as to the details determined to be unnecessarily provided to the user, only the details of the anomaly are provided to the information processing server 6303 by the information terminal 6302 (the step S6807).

Then, the anomaly flag of the received anomaly information is determined, and compared with the anomaly flag table for display of details of the anomaly, which are stored in the memory of the information terminal 6302, and the display of corresponding details of the anomaly is displayed in a pop-up on the display unit of the information terminal 6302. The pop-up corresponds to an operational display or an anomaly display etc., which is inserted independently of the latest operation, without relation to a display style or display size thereof. The case of a shut off from continued use is shown in FIG. 69(a). When the anomaly information flag makes an ON state of the shut off from continued use, the information terminal 6302 carries out the "display of shut off by continued use" 6901. Moreover, on the screen, the "confirm" button 6902 is provided, and by pressing, the "coping method information" for addressing said anomaly event is displayed. In the "coping method information", although not illustrated, the coping method to the details corresponding to respective anomaly events, such as the shut off from continued use with controller is displayed. Then, in conjunction with displaying the details of the anomaly on the display unit 6506 of the information terminal 6302, the electronic text, to which said information of details of the anomaly is set, is notified to the information processing server 6303 via the Internet. Then the notification is carried out from the information processing server 6303 to the central monitoring center of a gas company 6308 via communication line (the step S6804).

Note that said notification of the details of the anomaly is carried out not only by display, but also by voice, so that the user can notice easily.

Moreover, in cases where the causation of the gas anomaly is removed while the details of anomaly are being displayed, for example, in case of the shut off by continued use, after shutting off all of the gas apparatuses and turning the gas tap off, the user does the recovery operation of the information terminal 6302, an operation by the meter 6301, or an operation from the server 6303, so that the details of anomaly are resolved; the gas meter turns said anomaly flag of the anomaly flag table OFF, or turns ON a flag, indicating details of a success for recovery from the anomaly. Then, according to the configuration on the server 6301 side, a calling process relating to the reset of the details of the anomaly are carried out from the gas meter to the information terminal 6302. Said information of the details indicating reset of the anomaly is called "anomaly reset information," which corresponds to the calling information of any one or both of "anomaly flag OFF"

or "recovery of shut off valve ON". If said information is received, a comparing process with the "anomaly flag" stored in the information terminal 6302 is carried out, and it is determined whether or not the stored "anomaly flag" is OFF (the step S6805).

Note that, in cases where the recovery process is carried out, the "recovery flag" is ON, so that the calling processes of the "recovery flag ON" and the "anomaly flag OFF" to the information terminal 6302 are carried out at the same time, and are determined together.

Then, if it is determined by the "anomaly reset information" that the displayed anomaly event is reset, the pop-up for displaying details of the anomaly displayed in the information terminal 6302 is changed to the "display indicating reset of the anomaly" (FIG. 69(*b*)). Alternatively, in cases where confirmation process by the user is unnecessary, the information terminal 6302 removes the pop-up for displaying details of the anomaly, and displays operation screen displayed before occurrence of anomaly (the step S6806).

Note that, although in the description of the third example, the case of a recovery process of the gas meter has been described, depending on details of the gas anomaly, there is a case where the anomaly is displayed without shut off of the gas meter. In this case, if the operation for resolving the situation is carried out, the display of the gas anomaly is automatically removed.

Next, an operation and a function of resetting a display of anomaly information without reception of the "anomaly reset information" will be described using the flow chart of FIG. 70.

Figure 68:
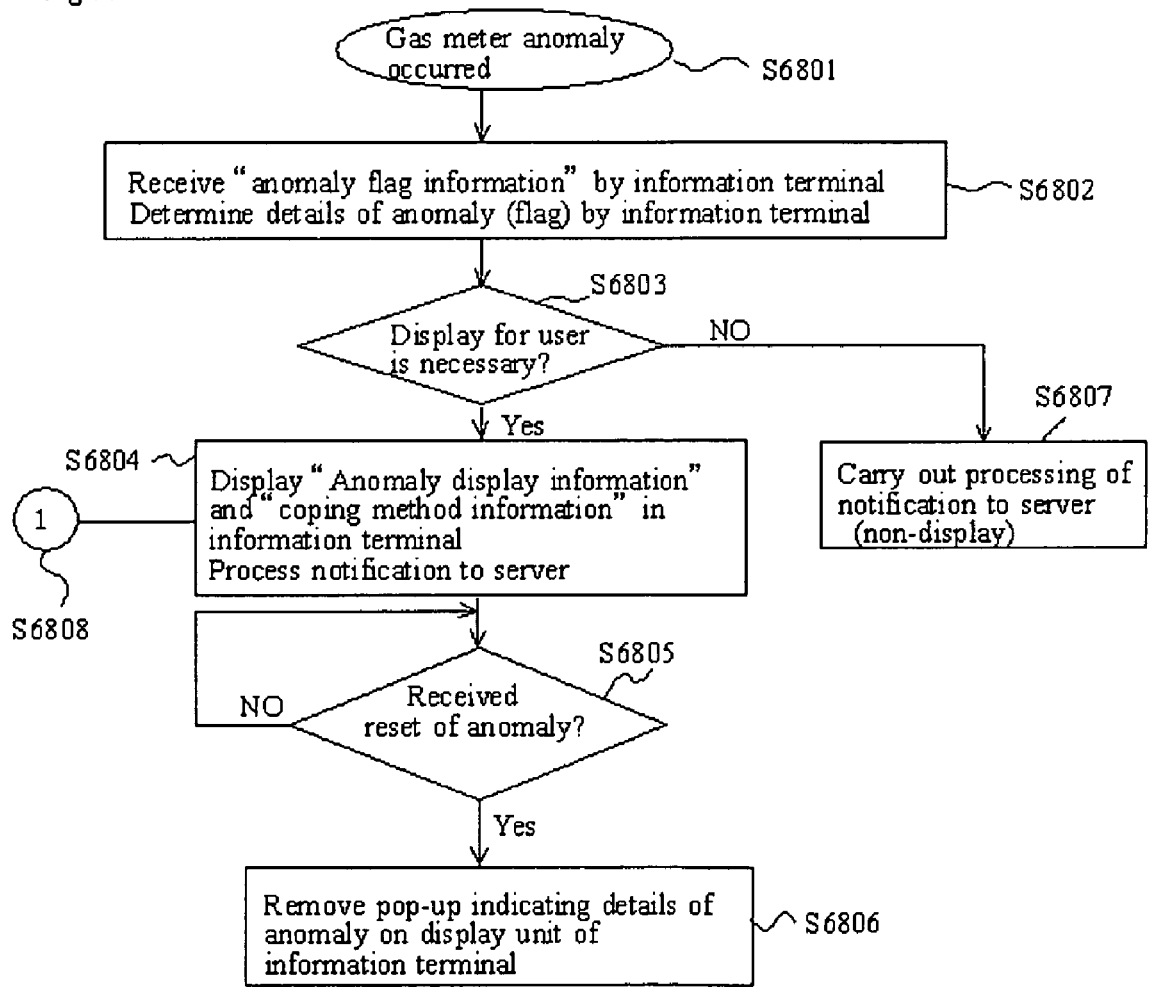
FIG. 68 is a flow chart of operations of display of a gas anomaly and reset of a gas anomaly of the example of the present invention.
Figure 70:
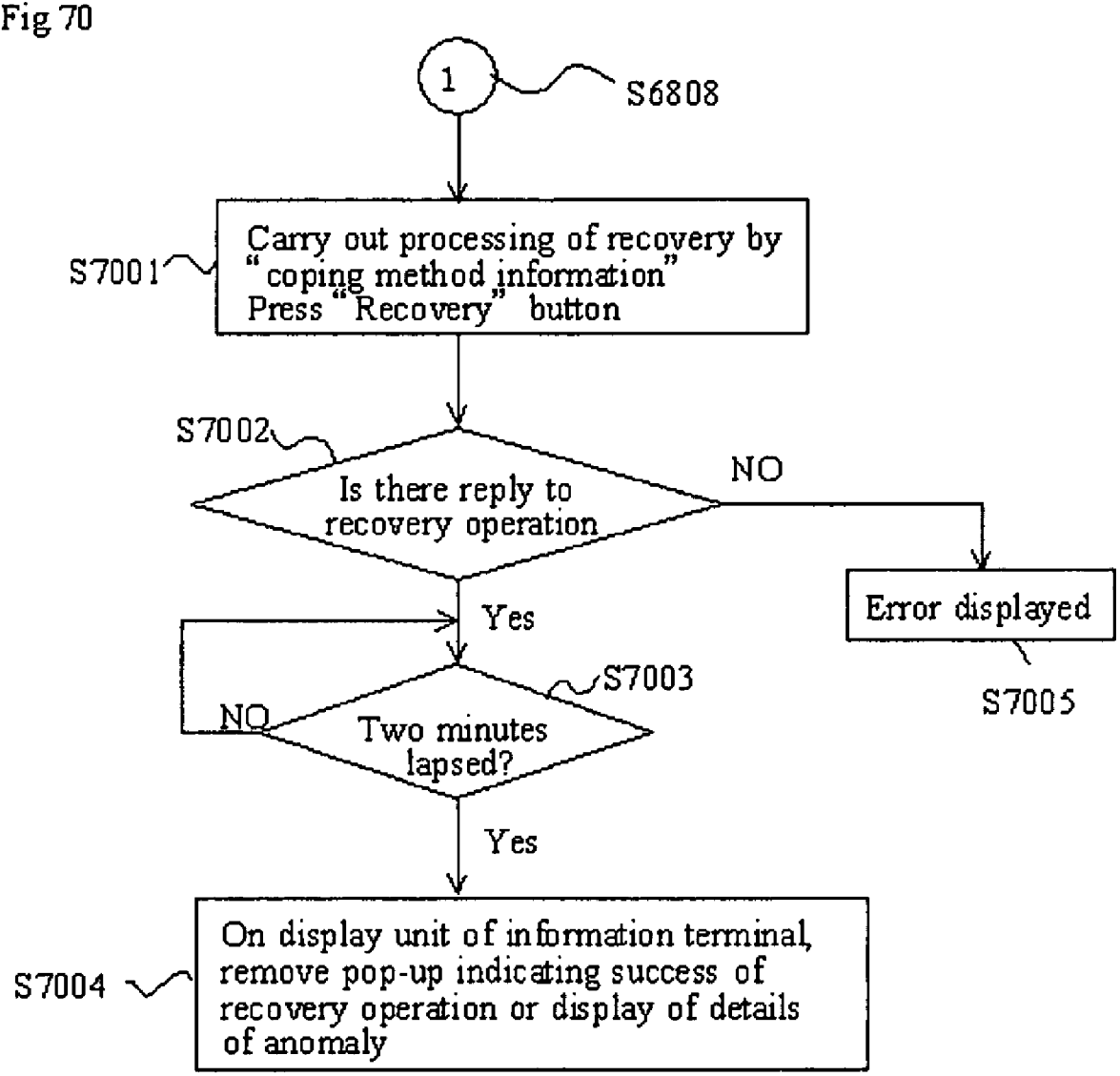
FIG. 70 is a flow chart of operations of display of a gas anomaly and reset of a gas anomaly of the example of the present invention.
Figure 71:
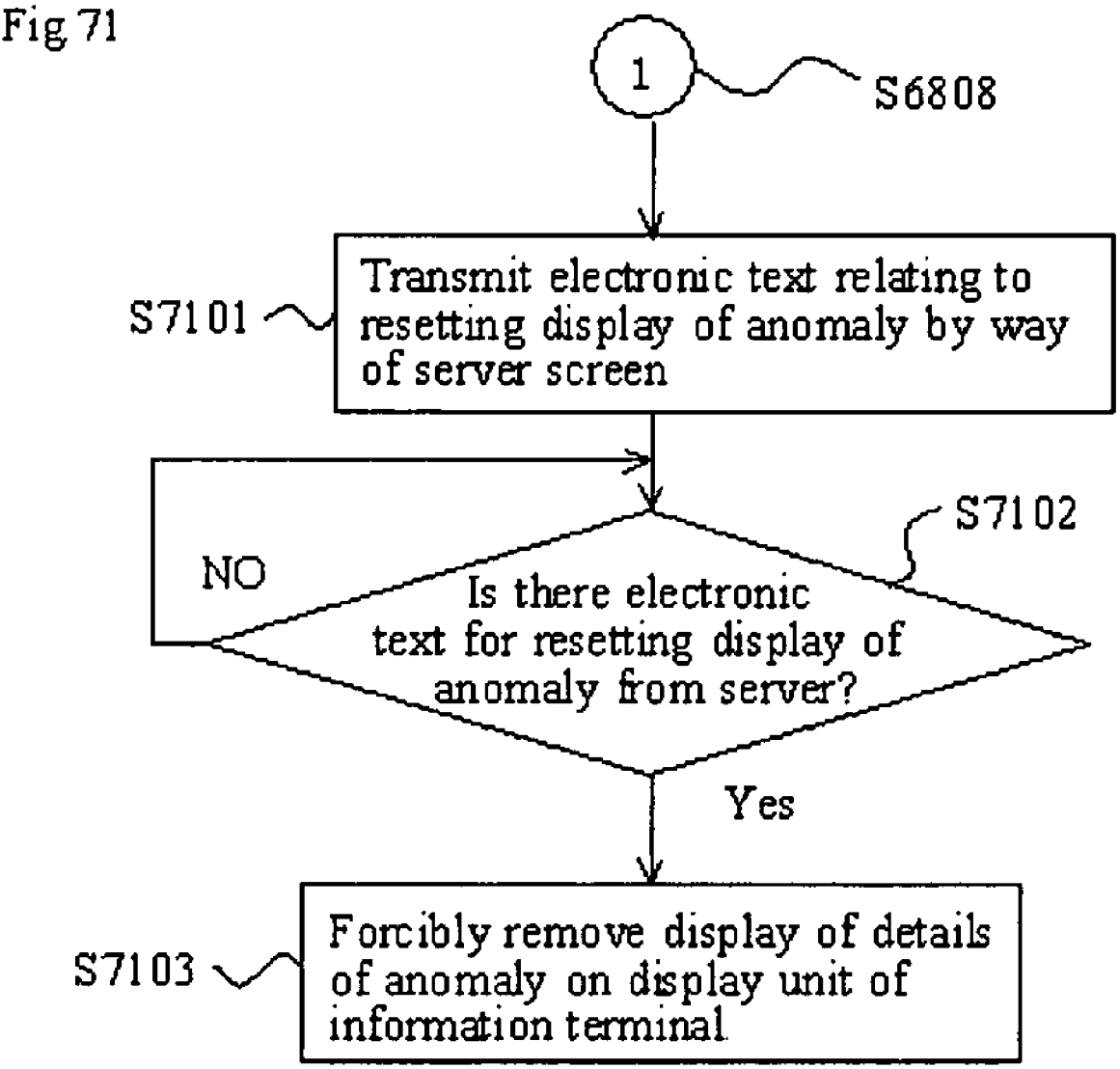
FIG. 71 is a flow chart of operations of display of a gas anomaly of the example of the present invention.

Note that the steps of operation preceding the details of process shown in S6808 of FIG. 70 and FIG. 71 are the same as S6801 to S6804 of FIG. 68, so that description will not be repeated.

If the anomaly is detected by the gas meter and the calling process thereof to the information terminal 6302 is carried out, the details of the anomaly information are determined, and according to an anomaly flag, the "anomaly display information" and the "coping method information" are displayed, and the notification is carried out using display and voice, by playing voice for guidance of "gas is shut off", etc., or alarm. Moreover, the notification process to the server 6303 is also performed. Then, if the user confirms said details and carries out the recovery process, the "confirm" button is pressed. By pressing the "confirm" button, the electronic text relating to recovery of the shut off valve is transmitted to the wireless communicator 6405*a*, which is connected to the meter 6301 by wireless communication signals (the step S7001).

The meter 6301, which has received said electronic text relating to recovery of the shut off valve, carries out a recovery control of the shut off valve, and transmits the electronic text for reply relating to the recovery to the information terminal 6302. The information terminal 6302, which has received said electronic text for reply relating to the recovery, confirms that said recovery control is processed by the meter 6301 (the step S7002). Note that said operation may occur without pressing the "recovery" button in the information terminal 6302.

In the "recovery process" of the meter 6301 by the control screen of the information processing server 6303, the information terminal 6302 receives the electronic text for communication, to which the electronic text relating to the recovery of the shut off valve is set, from the information processing server 6303 via the Internet, and to perform processing thereof. Then, similarly to the case in which the user presses the "recovery" button, the information terminal 6302 transmits the electronic text relating to the recovery of the shut off valve to the meter 6301, and similarly carries out following processes, if electronic text in reply to the electronic text relating to the recovery is received.

Then, when said reply to the "recovery operation" is received, a predetermined timer is activated. In the case of the third example, two minutes is set. Note that since the above time relates to the time for processing of confirming safety, which is carried out by the meter 6301 upon the recovery process, a longer time is provided in consideration of wireless communication times, etc. If the meter 6301 confirms the anomaly again upon processing of confirming safety of the recovery process, the determined anomaly flag is turned ON, and the calling process thereof to the information terminal 6302 is carried out again. Then, if the predetermined two minutes lapses, the information terminal 6302 determines that the time is out and no anomaly exists (the step S7003).

Then, the information terminal 6302 changes the display of details of the anomaly to the display of the success of the recovery operation (anomaly reset), and carries out the display, or removes the display (the step S7004).

Note that, if there is no reply to the recovery operation, a display of an error is carried out, thereby urging user re-operation (the step S7005).

By carrying out this determination process, even if the calling process of the anomaly reset information is not carried out according to the configuration of the gas meter, it becomes possible to change the display of details of the anomaly to the information of reset of the anomaly, or to remove the display.

Next, an operation and a function in case of resetting the display of the anomaly from the server 6303 will be described using FIG. 71. The description of the same operations as the process of FIG. 68 will not be repeated. When the information terminal 6302 performs display of details of the anomaly, on the screen for transmitting control of the meter of the information processing server 6303, a predetermined user is selected and the "reset of display of anomaly" operation is carried out. Then, the information terminal 6302 receives said electronic text relating to resetting the display of the anomaly from the information processing server 6303 via the Internet (the step S7101).

Then, the information terminal 6302 carries out a determination process upon receiving the electronic text relating to resetting the display of anomaly from the server 6303 (the step S7102).

Note that the electronic text relating to resetting the display of the anomaly is electronic text for communication, which enables resetting of stoppage of the other service functions (e.g., browsing daily information, configuring security apparatus) by remote-control, and for carrying out reset of the display of the details in the information terminal 6302.

The information terminal 6302, which has received said electronic text relating to resetting the display of the anomaly, forcibly removes the displayed pop-up for "display of details of anomaly" (the step S7103).

However the gas anomaly is not reset by this operation, the function of re-notification after a predetermined period of time (e.g., one hour later) based on the anomaly flag stored in the information terminal 6302 is provided, thereby preventing the user from forgetting the reset process of the gas anomaly. The predetermined period of time is determined by the system, and is changeable.

Figure 72:
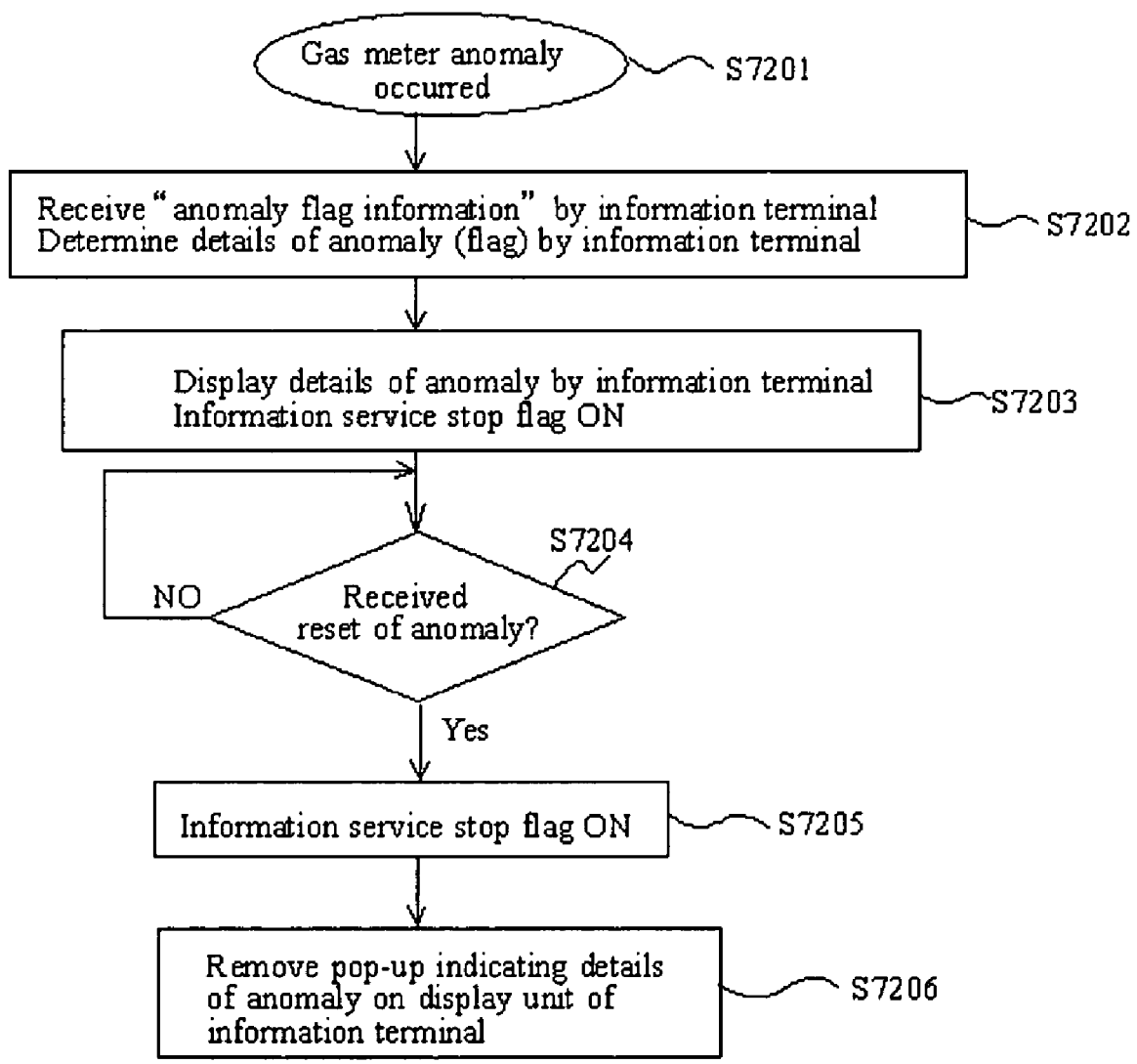
FIG. 72 is a flow chart of operations of an information terminal upon displaying gas anomaly of the example of the present invention.

Next, an operation and a function in the case of stopping the service function provided by the information terminal 6302 upon receipt of the anomaly flag from the gas meter will be described using the flow chart of FIG. 72.

Similar to said description, if the anomaly occurs in the gas meter 6301, a calling process by wireless communication is carried out (the step S7201).

Then, if the details of the gas anomaly are determined by the wireless communication signal received by the information terminal 6302, the information terminal 6302 displays the details of the anomaly of the anomaly flag information (the step S7202).

Then, in conjunction with displaying the details of the anomaly by the information terminal 6302, the "information service stop flag," which is one of the management flags and is stored in the information terminal 6302, is turned ON (the step S7203).

The management flag is stored in the information storage unit 6502 or in the secondary information storage unit 6503. This information service stop flag stops the information service function by utilizing the display function of the information terminal 6302 until resetting of the gas anomaly is carried out, thereby preventing operational error, etc., by using the information display service before the reset of the gas anomaly. Moreover, control functions from mobile phones or personal computers, except from the company, are also stopped.

Then, the information terminal 6302 goes into a waiting state for the anomaly reset information after resetting of the gas anomaly (the recovery process) is carried out. Then, the recovery process of the gas anomaly event is carried out by the user's operation or by the server 6303, and the information terminal 6302 receives the anomaly reset information and carries out a determination process (the step S7204).

As a result of the determination, if the information corresponds to the anomaly reset information, the "information service stop flag," which is management information in the information terminal 6302, is turned OFF (the step S7205).

Then, in the display unit 6506 of the information terminal 6302, the pop-up for displaying details of the anomaly is removed or changed to the display indicating the reset of the anomaly (the step S7206).

Thus, usage of the other information service during the display of the anomaly is stopped, and the display of the details of the gas anomaly is surely notified to the user, thereby preventing the user from forgetting the occurrence of the anomaly.

Note that, in the third example, although the case of a specified low power communication (400 MHz band), which is a low-speed wireless communication, has been described, the third example is not limited thereto, and may be embodied by utilizing a power line communication, Bluetooth®, or wireless communication.

In addition, although not illustrated, it has been described that the information terminal 6302 comprises the display unit, the configuration, of which includes a display apparatus and a communication gateway apparatus being separated.

In addition, although it has been described that the information terminal 6302 and the information processing server 6303 are connected via the Internet 6311, the configuration is not limited to the above, and the communication line may be a customer access line (telephone line), ISDN, ADSL, CATV, FTTH (optical cable), wireless LAN, or exclusive line etc.

Moreover, concrete configurations of the respective component are not limited to the above, and may be embodied in various forms without departing from the scope of the present invention.

As described above, in the third example, when the details of the anomaly of gas apparatus are displayed by pop-up in the information terminal 6302, the reset information is received, so that it becomes possible to change to the display indicating the reset of the anomaly, or to remove the pop-up, thereby making it easy for user to understand the reset of the gas anomaly, and improving the safety of gas usage and user-friendliness.

In addition, in the third example, when the details of the anomaly are displayed at the information terminal, the user carries out operation of reset of the anomaly, and if there is no re-notification of the anomaly during a predetermined period of time, the details of said pop-up are changed to a display indicating the reset of the anomaly, or the display is removed; so that even if the gas apparatus does not provide notification of the reset information of the anomaly, it becomes possible to display the reset of the anomaly within an effective time, thereby providing the display of details of the anomaly and the display indicating the reset of the anomaly in a user-friendly manner. Furthermore, it becomes possible to remove the display indicating the reset of the anomaly or the display of the details of the anomaly without depending on the configuration of the gas apparatus.

In addition, in the third example, the control of the reset of the anomaly for the gas apparatus is carried out from the server via the information terminal, and if the reply to said reset of the anomaly, which indicates the success thereof, is received, the details of said pop-up are changed to the display indicating the reset of the anomaly, or the display is removed, thereby enabling the display indicating the reset of the anomaly within an effective time, and improving service and user-friendliness of the monitoring service for gas safety.

In addition, in the third example, the electronic text relating to resetting of the anomaly is provided by the information processing server to the information terminal, so that it becomes possible to forcibly reset the display of the details of the anomaly in the information terminal under the management of the service company, thereby making the other information services available in urgent cases before the operation of resetting the display of details of the anomaly, and providing a system of high serviceability with safety by the display of the details of the anomaly.

In addition, in the third example, when the details of the anomaly are displayed at the information terminal, the information service stop flag, which indicates the details of the anomaly are occurring inside the information terminal, is turned ON, thereby stopping the other information service functions, ensuring the display of the details of the gas anomaly, and enabling reset and recovery from the gas anomaly in a safe and secure manner.

In addition, the third example may be similarly configured as all or one portion of the method of the information terminal, or as a program for operating computer. By being configured as a program, it is possible to be performed as one of the functions of a micro computer, a personal computer, or other apparatus; thereby improving user-friendliness and versatility thereof, and enabling easy configuration of the system. Moreover, by recording on the recording medium, or by distributing the program via the communication line, it becomes easy to distribute or install the program.

INDUSTRIAL APPLICABILITY

In the present invention, the information about an anomaly occurring in an apparatus, such as home appliances or equipment is determined by the server, the details of anomaly and/or a coping method thereto is provided in reply, and in cases where the anomaly of the apparatus is reset, the pop-up is removed, thereby enabling easy response to newly installed apparatuses, or update of the control program of apparatuses, as well as improving user-friendliness regarding anomaly notification.

What is claimed is:

1. A system for processing an anomaly, comprising:
an information terminal which communicates with an apparatus of one of a home appliance and a facility equipment, and thereby receives and processes anomaly information indicating an anomaly of the apparatus; and
a server which receives the anomaly information from said information terminal via a communication network, and causes said information terminal to perform processing based on the anomaly information,
wherein said information terminal comprises:
a terminal transmitter for anomaly information which transmits the anomaly information received from the apparatus to said server, the transmitted anomaly information associated with an anomaly identifier;
a receiver for reply which receives a reply to the transmitted anomaly information from said server, the reply including one of an instruction to execute notification and an instruction to not execute notification, the instruction to execute notification including details of at least one of the anomaly and a coping method for the anomaly;
a memory that stores the reply received from the server in association with the anomaly identifier of the anomaly information received from the apparatus; and
a notifier which provides notification of the details of the at least one of the anomaly and the coping method when the reply includes the instruction to execute notification, and does not provide the notification when the reply includes the instruction to not execute notification,
wherein said server comprises:
a server receiver for anomaly information which receives the anomaly information transmitted from said information terminal;
a notification determiner which determines whether or not to provide the notification by said information terminal based on the anomaly information received by said server receiver for anomaly information; and
a replier which transmits the reply including the instruction to execute notification to said information terminal when said notification determiner determines to provide the notification, and transmits the reply including the instruction to not execute notification to said information terminal when said notification determiner determines not to provide the notification, and
wherein the information terminal is configured to determine whether the reply includes the one of the instruction to execute notification and the instruction to not execute notification from the memory based on the anomaly identifier when the reply is stored in the memory in association with the anomaly identifier.

2. An information terminal, which communicates with an apparatus of one of a home appliance and a facility equipment and thereby receives anomaly information indicating an anomaly of the apparatus, and which transmits the anomaly information to a server for processing, wherein said information terminal comprises:
a terminal transmitter for anomaly information which transmits the anomaly information received from the apparatus to the server, the transmitted anomaly information associated with an anomaly identifier;
a receiver for reply which receives a reply to the transmitted anomaly information from the server, the reply including one of an instruction to execute notification and an instruction to not execute notification, the instruction to execute notification including details of at least one of the anomaly and a coping method for the anomaly;
a memory that stores the reply received from the server in association with the anomaly identifier of the anomaly information received from the apparatus; and
a notifier which provides notification of the details of the at least one of the anomaly and the coping method when the reply includes the instruction to execute notification, and does not provide the notification when the reply includes the instruction to not execute notification,
wherein the information terminal is configured to determine whether the reply includes the one of the instruction to execute notification and the instruction to not execute notification from the memory based on the anomaly identifier when the reply is stored in the memory in association with the anomaly identifier.

3. A server, which communicates with an information terminal, which in turn communicates with an apparatus of one of a home appliance and a facility equipment and thereby receives anomaly information indicating an anomaly of the apparatus, wherein said server comprises:
a server receiver for anomaly information which receives the anomaly information transmitted from the information terminal, the anomaly information associated with an anomaly identifier;
a notification determiner which determines whether to provide notification by the information terminal based on the anomaly information received by said server receiver for anomaly information; and
a replier which transmits a reply including an instruction to execute notification to the information terminal when said notification determiner determines to provide the notification, and transmits the reply including an instruction to not execute notification to the information terminal when said notification determiner determines not to provide the notification, the instruction to execute notification including details of at least one of the anomaly and a coping method for the anomaly,
wherein the details of the at least one of the anomaly and the coping method are determined based on the anomaly identifier.

4. A method of processing an anomaly of an apparatus of one of a home appliance and a facility equipment with an information terminal and a server, the information terminal in communication with the apparatus, the method comprising:
receiving, by the information terminal, anomaly information indicating the anomaly of the apparatus;
transmitting, from the information terminal to the server via a communication network, the anomaly information received by the information terminal from the apparatus, the transmitted anomaly information associated with an anomaly identifier;
receiving, by the server via the communication network, the anomaly information transmitted from the information terminal;
determining, by the server and based on the anomaly information received from the information terminal, whether to provide notification by the information terminal;
replying, from the server to the information terminal, with a reply including an instruction to execute notification when the server determines to provide the notification, and with the reply including an instruction to not execute the notification when the server determines not to provide the notification, the instruction to execute notification including details of at least one of the anomaly and a coping method for the anomaly;

storing, by the information terminal in a memory, the reply received from the server in association with the anomaly identifier of the anomaly information received from the apparatus;

determining, by the information terminal from the memory based on the anomaly identifier, whether the reply includes the one of the instruction to execute notification and the instruction to not execute notification when the reply is stored in the memory in association with the anomaly identifier; and one of providing, by the information terminal, the notification including the details of the at least one of the anomaly and the coping method when the reply includes the instruction to execute notification and not providing the notification when the reply includes the instruction to not execute notification.

5. A non-transitory computer readable medium storing a program executable by a computer for communicating with an apparatus of one of a home appliance and a facility equipment and thereby receiving anomaly information indicating an anomaly of the apparatus, and for transmitting the received anomaly information to a server for processing, said computer readable medium comprising:

a transmitting code segment that transmits the received anomaly information to the server, the transmitted anomaly information associated with an anomaly identifier;

a receiving code segment that receives a reply to the transmitted anomaly information from the server, the reply including one of an instruction to execute notification and an instruction to not execute notification, the instruction to execute notification including details of at least one of the anomaly and a coping method for the anomaly;

a storing code segment that stores, in a memory, the reply received form the server in association with the anomaly identifier of the anomaly information received from the apparatus; and a notifying code segment that provides notification of the details of the at least one of the anomaly and the coping method when the reply includes the instruction to execute notification, and does not provide the notification when the reply includes the instruction to not execute notification, wherein the notifying code segment is configured to determine whether the reply includes the one of the instruction to execute notification and the instruction to not execute notification from the memory based on the anomaly identifier when the reply is stored in the memory in association with the anomaly identifier.

6. A non-transitory computer readable medium storing a program executable by a computer for communicating with an information terminal, which in turn communicates with an apparatus of one of a home appliance and a facility equipment, and thereby receiving anomaly information indicating an anomaly of the apparatus, said computer readable medium comprising:

a receiving code segment that receives the anomaly information transmitted from the information terminal, the anomaly information associated with an anomaly identifier;

a determining code segment that determines whether to provide notification by the information terminal based on the anomaly information received by said receiving code segment; and a replying code segment that transmits a reply including an instruction to execute notification to the information terminal when said determining code segment determines to provide the notification, and transmits the reply including an instruction to not execute notification to the information terminal when said determining code segment determines not to provide the notification, the instruction to execute notification including details of at least one of the anomaly and a coping method for the anomaly, wherein the details of the at least one of the anomaly and the coping method are determined based on the anomaly identifier.

* * * * *